(12) United States Patent
Kusukame et al.

(10) Patent No.: US 11,711,235 B2
(45) Date of Patent: **\*Jul. 25, 2023**

(54) INFORMATION PROVIDING METHOD AND INFORMATION PROVIDING APPARATUS

(71) Applicant: Panasonic Intellectual Property Corporation of America, Torrance, CA (US)

(72) Inventors: Koichi Kusukame, Osaka (JP); Kazuki Funase, Osaka (JP); Tetsuji Fuchikami, Osaka (JP)

(73) Assignee: PANASONIC INTELLECTUAL PROPERTY CORPORATION OF AMERICA, Torrance, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/856,378

(22) Filed: Jul. 1, 2022

(65) Prior Publication Data

US 2022/0337446 A1    Oct. 20, 2022

Related U.S. Application Data

(62) Division of application No. 17/023,758, filed on Sep. 17, 2020, now Pat. No. 11,411,764, which is a
(Continued)

(30) Foreign Application Priority Data

Nov. 15, 2012  (JP) ................................ 2012-251356
Mar. 4, 2013   (JP) ................................ 2013-041953

(51) Int. Cl.
*G10H 3/00*     (2006.01)
*H04L 12/28*    (2006.01)
(Continued)

(52) U.S. Cl.
CPC ....... *H04L 12/2825* (2013.01); *G05D 23/193* (2013.01); *G05D 23/1917* (2013.01);
(Continued)

(58) Field of Classification Search
CPC .... H05B 47/105; H05B 47/19; G05D 23/193; G05D 23/1917; H04L 12/2825; G08B 17/12
(Continued)

(56) References Cited

U.S. PATENT DOCUMENTS 6,983,306 B1   1/2006  Sameshima et al.
7,222,153 B2   5/2007  Ando et al.
(Continued)

FOREIGN PATENT DOCUMENTS

JP    10-224760     8/1998
JP    2001-92762    4/2001
(Continued)

OTHER PUBLICATIONS

U.S. Office Action dated Dec. 18, 2019 in U.S. Appl. No. 15/904,639.
(Continued)

*Primary Examiner* — Md S Elahee
(74) *Attorney, Agent, or Firm* — Wenderoth, Lind & Ponack, L.L.P.

(57) ABSTRACT

A cloud server (104) receives environmental information of respective installation sites of a plurality of appliances (101*a*, 101*b*, 101*c*, 102*a*, 102*b*) via a network (1000), and determines one or more appliances that are installed in a same room among the plurality of appliances (101*a*, 101*b*, 101*c*, 102*a*, 102*b*), based on the received environmental information.

16 Claims, 42 Drawing Sheets

Related U.S. Application Data division of application No. 15/904,639, filed on Feb. 26, 2018, now Pat. No. 10,809,748, which is a division of application No. 14/371,310, filed as application No. PCT/JP2013/006600 on Nov. 8, 2013, now Pat. No. 9,946,273.

(51) Int. Cl.
*H05B 47/19* (2020.01)
*H05B 47/105* (2020.01)
*G05D 23/19* (2006.01)
*G08B 17/12* (2006.01)

(52) U.S. Cl.
CPC .......... *H05B 47/105* (2020.01); *H05B 47/19* (2020.01); *G08B 17/12* (2013.01)

(58) Field of Classification Search
USPC .......................................... 379/373.01–374.2
See application file for complete search history.

(56) References Cited

U.S. PATENT DOCUMENTS

| | | | |
|---|---|---|---|
| 7,298,871 | B2 | 11/2007 | Lee et al. |
| 8,386,079 | B1 | 2/2013 | Kohler et al. |
| 8,676,273 | B1 | 3/2014 | Fujisaki |
| 9,126,114 | B2 | 9/2015 | Kuroume |
| 9,218,454 | B2 | 12/2015 | Kiani |
| 2002/0091812 | A1 | 7/2002 | Ando et al. |
| 2003/0227439 | A1 | 12/2003 | Lee et al. |
| 2004/0199272 | A1 | 10/2004 | Yamamoto et al. |
| 2005/0159823 | A1 | 7/2005 | Hayes et al. |
| 2009/0030654 | A1 | 1/2009 | Koike et al. |
| 2013/0190943 | A1 | 7/2013 | Wester et al. |
| 2015/0156031 | A1 | 6/2015 | Fadell et al. |

FOREIGN PATENT DOCUMENTS

| | | |
|---|---|---|
| JP | 2001-145174 | 5/2001 |
| JP | 2001-145180 | 5/2001 |
| JP | 2002-027142 | 1/2002 |
| JP | 2002-189648 | 7/2002 |
| JP | 2003-37604 | 2/2003 |
| JP | 2004-23757 | 1/2004 |
| JP | 2005-529548 | 9/2005 |
| JP | 2005-273937 | 10/2005 |
| JP | 2005-341245 | 12/2005 |
| JP | 2007-221194 | 8/2007 |
| JP | 2007-329943 | 12/2007 |
| JP | 2009-282778 | 12/2009 |
| JP | 2012-169972 | 9/2012 |

OTHER PUBLICATIONS

U.S. Final Office Action dated Mar. 3, 2020 in U.S. Appl. No. 15/904,639.
U.S. Advisory Action dated Jun. 5, 2020 in U.S. Appl. No. 15/904,639.
U.S. Office Action dated Feb. 9, 2017 in U.S. Appl. No. 14/371,310.
U.S. Final Office Action dated Jul. 11, 2017 in U.S. Appl. No. 14/371,310.
International Search Report dated Jan. 28, 2014 in International (PCT) Application No. PCT/JP2013/006600.
U.S. Office Action dated Dec. 21, 2021 in U.S. Appl. No. 17/023,758.

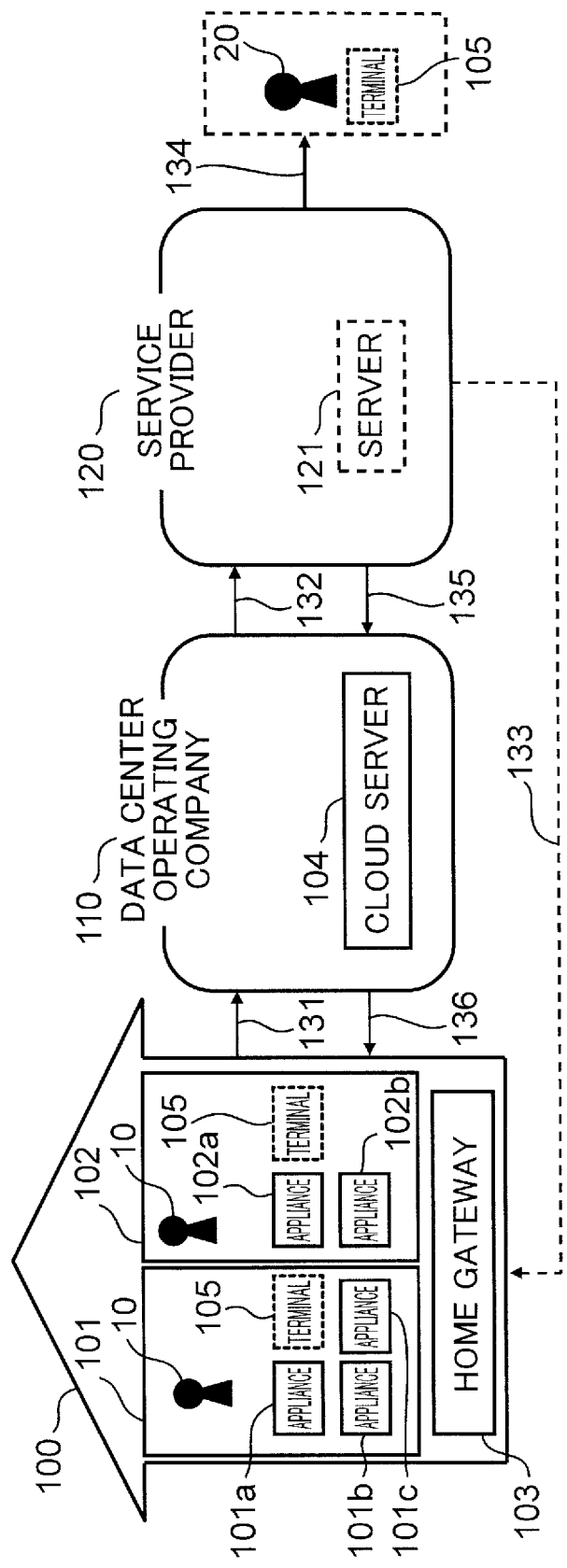
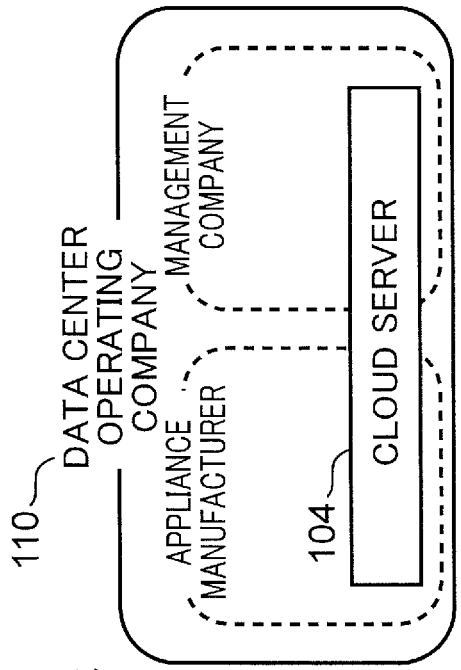
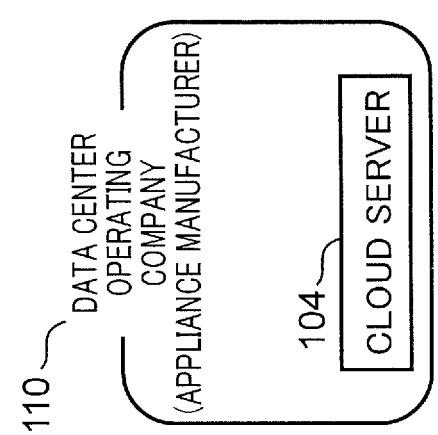

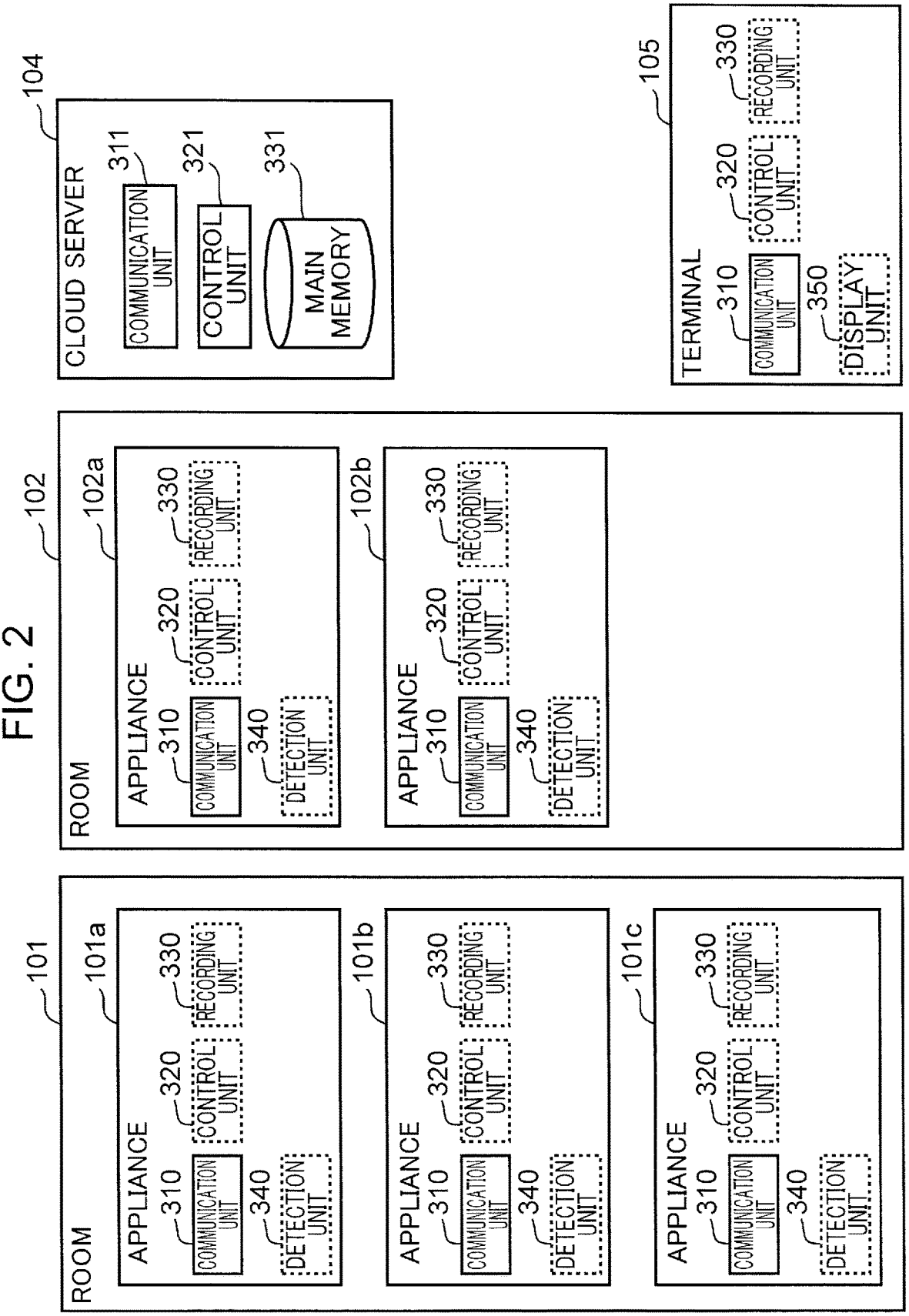

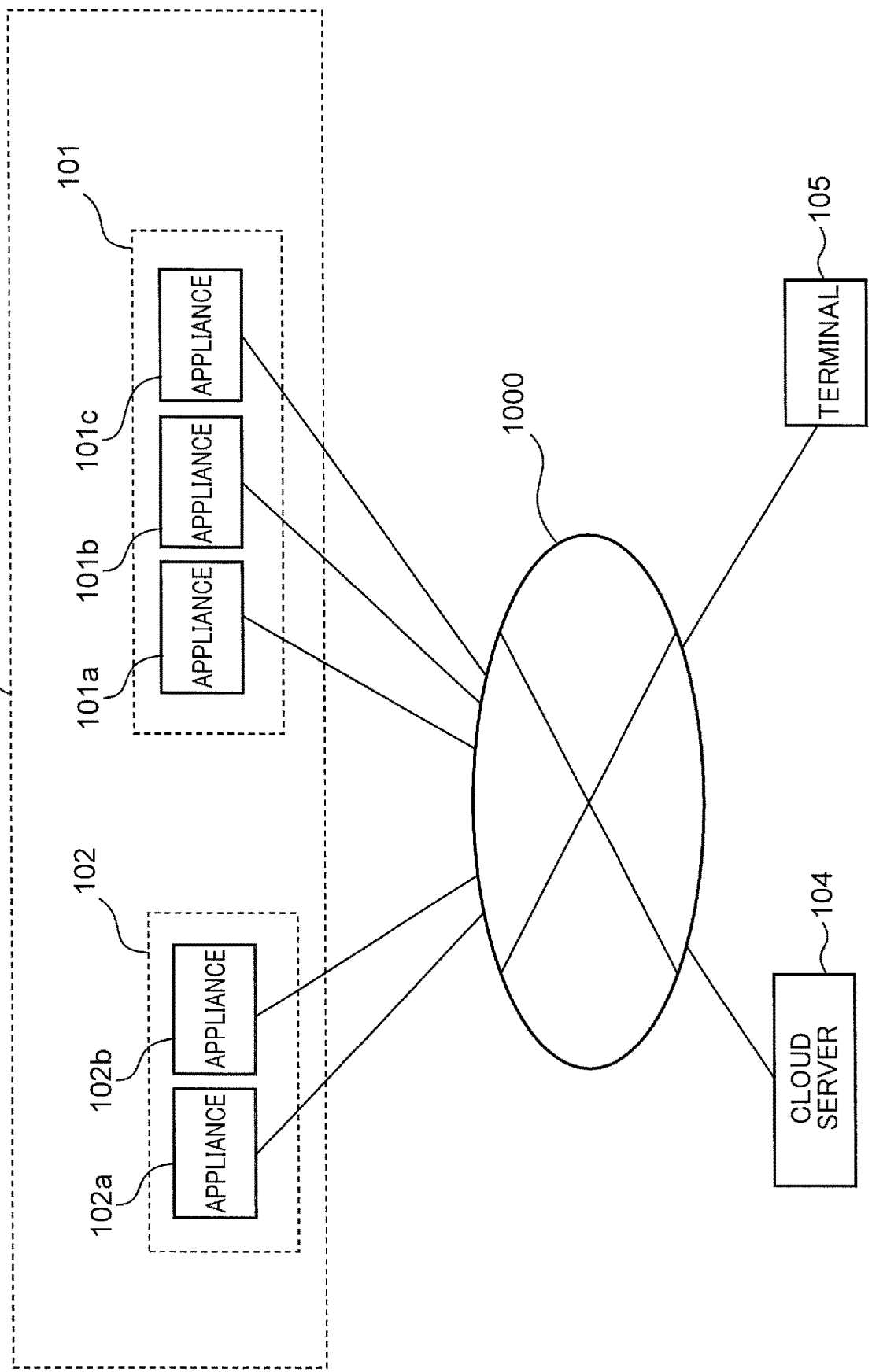

FIG. 7

|  | LIGHT INTENSITY CHANGE TIME |
|---|---|
| APPLIANCE 101a | 07 : 15 |
| APPLIANCE 101b | 07 : 15 |
| APPLIANCE 101c | 07 : 15 |
| APPLIANCE 102a | 08 : 23 |
| APPLIANCE 102b | 08 : 23 |

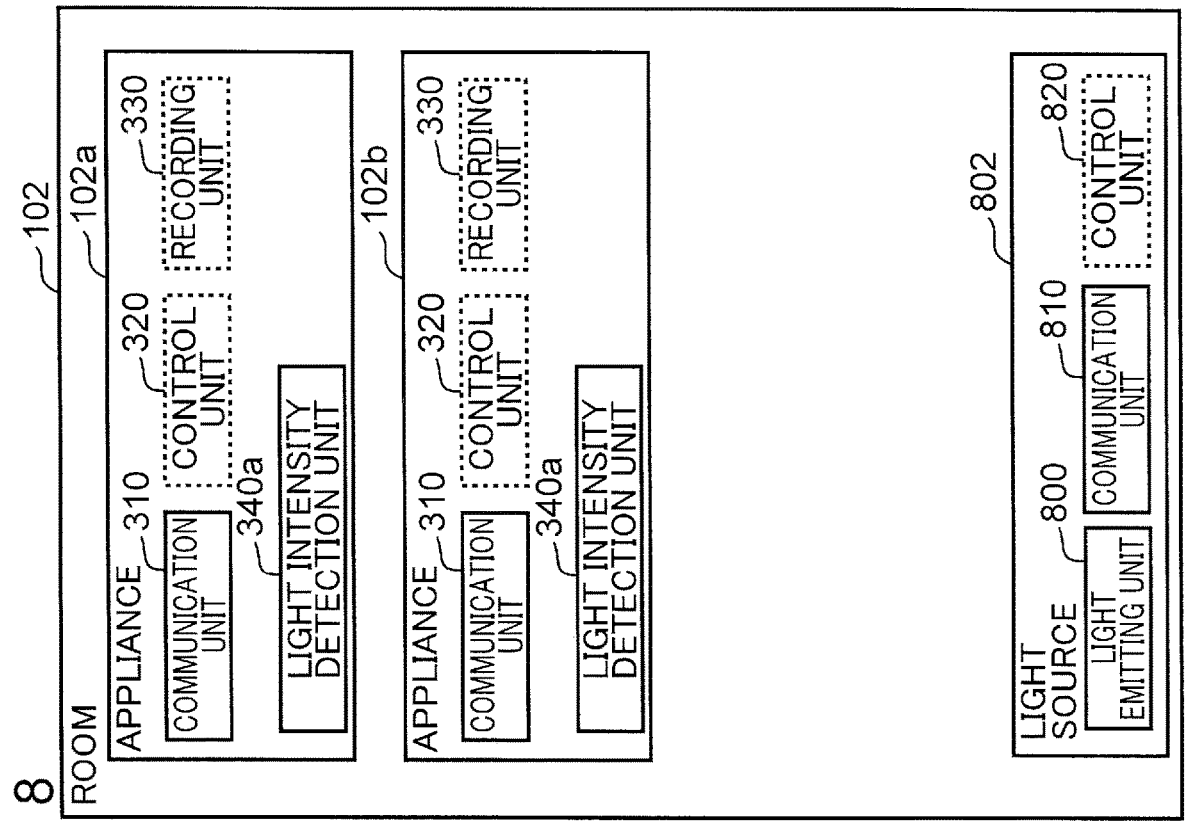
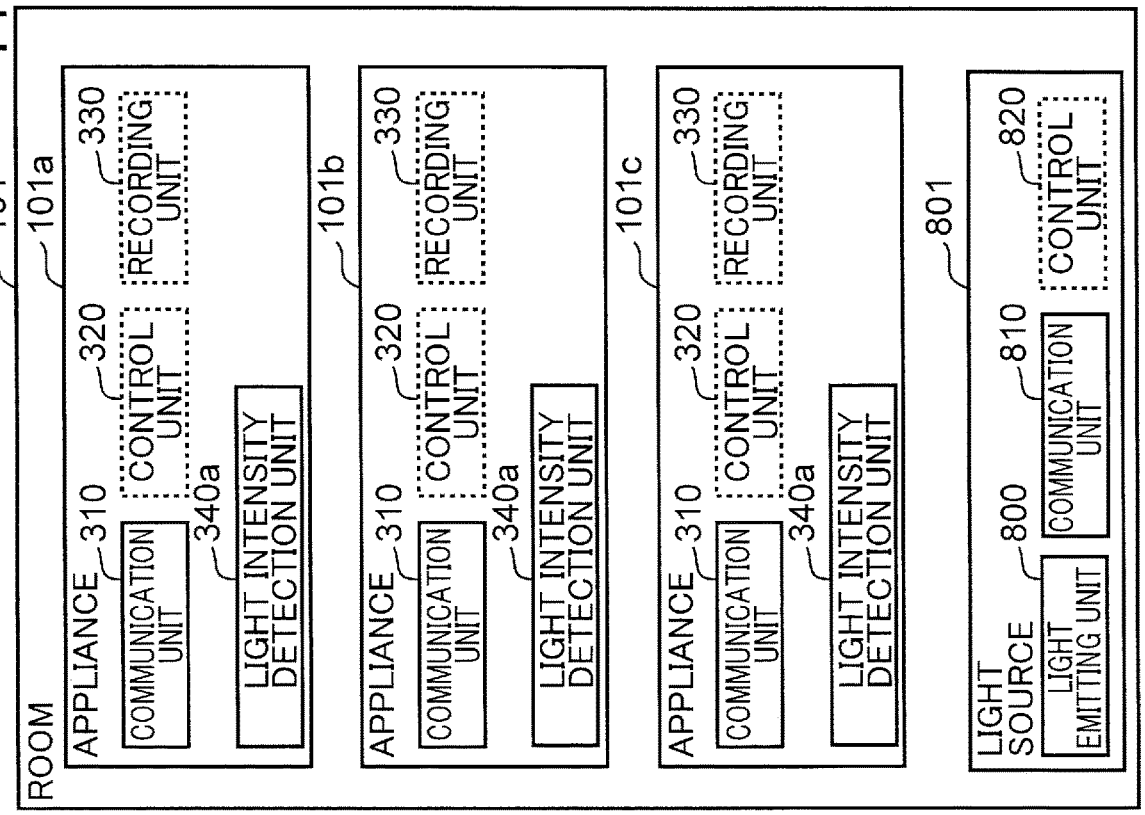
FIG. 8

FIG. 16

|  | SOUND CHANGE TIME |
|---|---|
| APPLIANCE 101a | 07·15:32:40 |
| APPLIANCE 102a | 07·15:32:52 |

FIG. 32A

|  | ROOM INFORMATION | DISPLAY AREA |
|---|---|---|
| APPLIANCE 101a | 1 | 3303a |
| APPLIANCE 101b | 1 | 3303a |
| APPLIANCE 101c | 1 | 3303a |
| APPLIANCE 102a | 2 | 3303b |
| APPLIANCE 102b | 2 | 3303b |

FIG. 32B

|  | ROOM INFORMATION |
|---|---|
| APPLIANCE 101a | 1 |
| APPLIANCE 101b | 1 |
| APPLIANCE 101c | 1 |
| APPLIANCE 102a | 2 |
| APPLIANCE 102b | 2 |

INFORMATION PROVIDING METHOD AND INFORMATION PROVIDING APPARATUS

TECHNICAL FIELD

The present invention relates to an information providing method and an information providing apparatus for providing information relating to a plurality of appliances connected to a network.

BACKGROUND ART

In recent years, research is being conducted for improving the user-friendliness by controlling, from outdoors, appliances that are installed indoors and connected to a network (for example, refer to Patent Literature 1).

Nevertheless, conventional appliance control of controlling indoor appliances from outdoors gives no consideration to the appliance control that takes into account the installation site of the appliances installed indoors.

CITATION LIST

Patent Literature

Patent Literature 1: Japanese Patent Application Publication No. 2005-273937

SUMMARY OF THE INVENTION

The present invention was devised to resolve the foregoing problem, and an object of this invention is to provide an information providing method capable of providing information relating to the installation site of the appliances that are connected to a network and installed within the same building, and thereby improving the user-friendliness.

A communication management method according to one aspect of the present invention comprises receiving an environmental information of respective installation sites of a plurality of appliances via a network, and determining one or more appliances that are installed in a same room among the plurality of appliances based on the received environmental information.

Further improvement can be realized based on the foregoing aspect.

BRIEF DESCRIPTION OF THE DRAWINGS

FIG. 1A is a diagram showing the overall image of the service provided by the information providing system in the present embodiment, FIG. 1B is a diagram showing an example where the appliance manufacturer corresponds to the data center operating company, and FIG. 1C is a diagram showing an example where the appliance manufacturer and/or the management company corresponds to the data center operating company.

FIG. 2 is a diagram showing the configuration of the respective appliances in the respective rooms, the configuration of the cloud server and the configuration of the terminal shown in FIG. 1.

FIG. 3 is a diagram showing the overall configuration of the information providing system in embodiment 1.

FIG. 7 is a diagram showing an example of the time information that is sent to the cloud server.

FIG. 8 is a diagram showing the configuration of the information providing system in a first modified example of embodiment 1.

FIG. 16 is a diagram showing an example of the time information that is sent to the cloud server.

FIG. 32A is a diagram showing an example of the information that is sent from the cloud server to the terminal, and FIG. 32B is another example of the information that is sent from the cloud server to the terminal.

DESCRIPTION OF EMBODIMENTS (Findings that Formed the Basis of the Present Invention)

Figure 6:
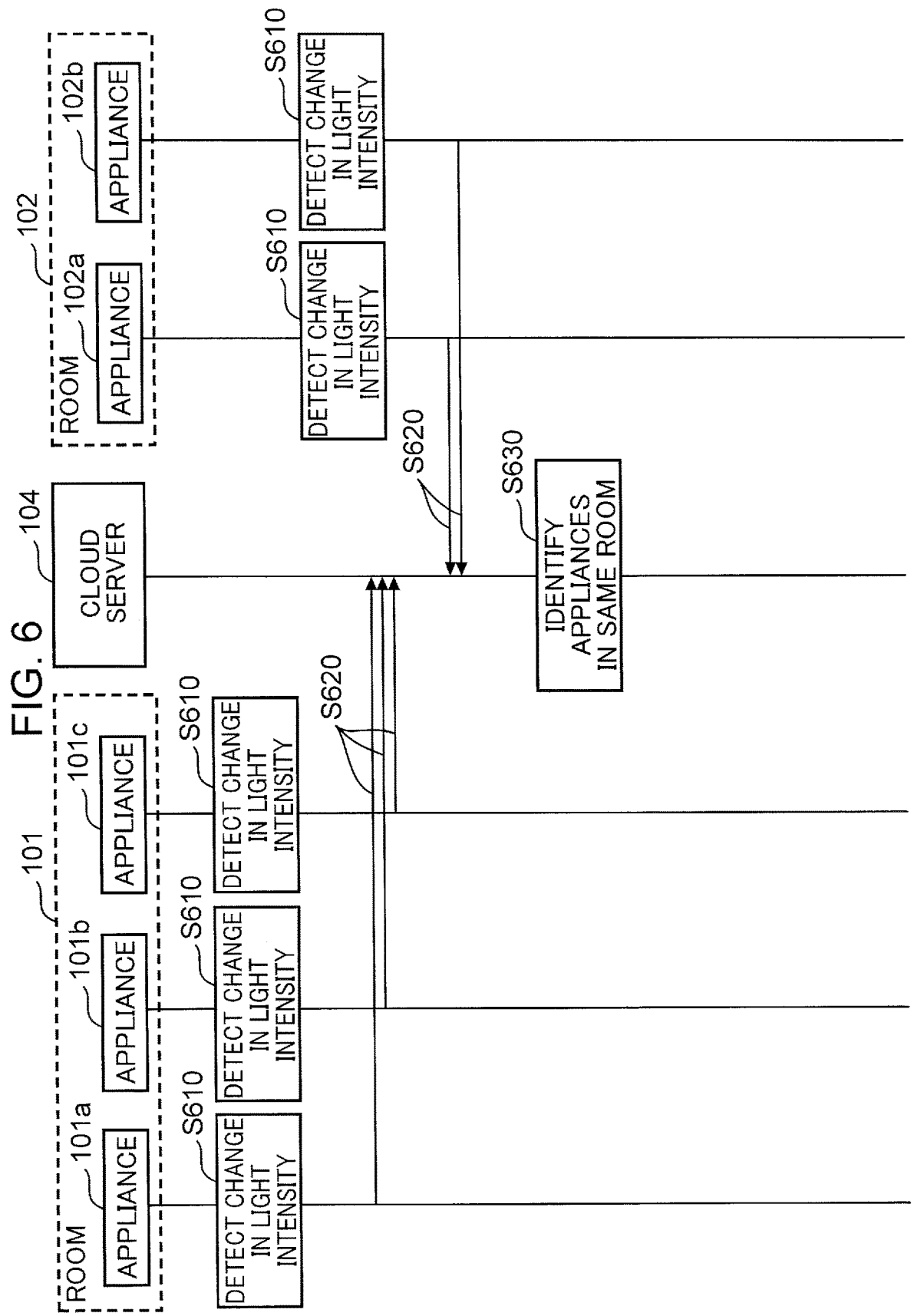
FIG. 6 is a sequence diagram showing the operation of the information providing system for identifying the appliances in the same room by detecting the light intensity.

Patent Literature 1 describes a method in which a user assesses the open/close status of windows or doors in one's home, and operates an air-conditioner in one's home by using a portable terminal appliance from outdoors. Patent Literature 1 discloses a method of displaying, on a display unit of the air-conditioner, a message urging that the air-conditioner should be operated upon closing the window (door) in consideration of energy-saving efficiency when the window (door) is open (FIG. 3). Moreover, Patent Literature 1 discloses a method of similarly displaying, on a display unit of the portable terminal appliance, a message urging that the air-conditioner should be operated upon closing the window (door) even in cases of controlling the air-conditioner by using a portable terminal appliance from outdoors (FIG. 6).

Nevertheless, with the technology disclosed in Patent Literature 1, no consideration is given to cases when there are a plurality of rooms in a home, when there are a plurality of air-conditioners, or when there are a plurality of windows. In other words, the user is unable to assess which air-condition in which room is being controlled. Moreover, the user is unable to specify which window is open and causing the message to be displayed.

In other words, upon providing a system of controlling a plurality of appliances, it is necessary to detect which appliance is installed in which room in the home.

Furthermore, with regard to mobile appliances such as a portable terminal (smartphone) or a vacuum cleaner (robotic cleaner) or appliances that are not connected to a specific circuit breaker other than the foregoing appliances (air-conditioners or windows, for example) that are fixed in each room, it is more difficult to specify the location of that appliance or to assess information regarding which appliance exists in which room.

The present inventors devised the present invention pertaining the following aspects in order to resolve the foregoing problems.

A communication management method according to one aspect of the present invention comprises receiving an environmental information of respective installation sites of a plurality of appliances via a network, and determining one or more appliances that are installed in a same room among the plurality of appliances based on the received environmental information.

It is thereby possible to identify the appliances that are installed for each room. In other words, it becomes possible to identify which appliance is installed in which room even for appliances that can move between a plurality of rooms or appliances that are not connected to a circuit breaker. Thus, the operation of a user or a service provider pre-registering, in a system, information relating to a plurality of appliances or location of the room where a plurality of appliances are installed, is no longer required.

Accordingly, it is possible to provide information relating to the installation site of appliances which are connected to a network and located within the same building, and improve the user-friendliness.

Moreover, in the foregoing aspect, for example, information relating to the one or more appliances may be provided to a specific appliance among the plurality of appliances or to an information terminal other than the plurality of appliances.

Moreover, in the foregoing aspect, for example, a list of the one or more appliances that have been determined as being installed in the same room may be created, operating information of a first appliance included in the created list may be received, a control description of a second appliance which is included in the list and operates in coordination with the first appliance may be determined based on a coordinated operation database for associating and storing an operation of one appliance among the plurality of appliances and an operation of another appliance that operates in coordination with the one appliance, and a control signal for controlling the second appliance based on the determined control description may be sent to the second appliance.

Moreover, in the foregoing aspect, for example, information for confirming an intention of a user may be sent to a user's portable terminal before the control signal is sent to the second appliance.

Moreover, in the foregoing aspect, for example, position specifying information for specifying the location of the plurality of appliances in a predetermined room and specifying the location of a user in the room may be received via a network, the location of the plurality of appliances in the room may be specified and the location of the user in the room may be specified based on the received position specifying information, a user who is using one or more appliances among the plurality of appliances in the room may be specified based on the specified location of the plurality of appliances and the specified location of the user, and information relating to the user may be provided to a service providing apparatus which provides an arbitrary service to the specified user and to family members of the user.

Moreover, in the foregoing aspect, for example, the position specifying information may include an image within a room captured by an imaging device, and the location of the plurality of appliances in the room may be specified and the location of the user in the room may be specified based on the captured image.

Moreover, in the foregoing aspect, for example, the position specifying information may include a thermal radiation distribution within a room measured with a thermal radiation distribution measuring device, and the location of the plurality of appliances in the room may be specified and the location of the user in the room may be specified based on the measured thermal radiation distribution.

Moreover, in the foregoing aspect, for example, information relating to a body shape of the user measured with a body shape measuring device may be received, and a user who is using one or more appliances among the plurality of appliances in the room may be specified based on the information relating to the body shape of the user, the location of the plurality of appliances, and the location of the user.

Moreover, in the foregoing aspect, for example, air of a temperature that is different from a room temperature may be blown toward an arbitrary appliance.

Moreover, in the foregoing aspect, for example, one or more appliances installed in a first room among the plurality of appliances may be determined based on the received environmental information, one or more appliances installed in a second room that is different from the first room among the plurality of appliances may be determined based on the received environmental information, and a command for respectively displaying, in different display areas of a display unit equipped in a specific appliance among the plurality of appliances or in an information terminal other than the plurality of appliances, first information relating to the one or more appliances that have been determined as being installed in the first room, and second information relating to the one or more appliances that have been determined as being installed in the second room may be sent.

Moreover, in the foregoing aspect, for example, the environmental information may include information relating to a time that the plurality of appliances have detected a change in light, and one or more appliances, among the plurality of appliances, in which the time that the change in light has been detected is the same may be determined as appliances that are installed in the same room.

Moreover, in the foregoing aspect, for example, a plurality of light sources respectively disposed in a plurality of rooms within a building may be each lit according to a predetermined lighting pattern, and one or more appliances, among the plurality of appliances, for which a same lighting pattern has been detected may be determined as appliances that are installed in the same room.

Moreover, in the foregoing aspect, for example, the environmental information may include information relating to a time that the plurality of appliances have detected a change in sound, and one or more appliances, among the plurality of appliances, in which the time that the change in sound has been detected is the same may be determined as appliances that are installed in the same room.

Moreover, in the foregoing aspect, for example, a mobile appliance that moves between a plurality of rooms within a building may be caused to output sound, the environmental information may include information relating to a time that the plurality of appliances have detected a change in the sound output by the mobile appliance, and one or more appliances, among the plurality of appliances, in which the time that the change in sound has been detected is the same may be determined as appliances that are installed in the same room.

Moreover, in the foregoing aspect, for example, the environmental information may include information relating to a time that the plurality of appliances have detected a change in temperature, and one or more appliances, among the plurality of appliances, in which the time that the change in temperature has been detected is the same may be determined as appliances that are installed in the same room.

The communication management apparatus according to another aspect of the present invention comprises a communication unit for receiving environmental information of respective installation sites of a plurality of appliances via a network, and a control unit for determining one or more appliances that are installed in a same room among the plurality of appliances based on the received environmental information.

Moreover, in the foregoing aspect, for example, the environmental information may include information relating to a time that the plurality of appliances have detected a change in light, and the control unit may determine one or more appliances, among the plurality of appliances, in which the time that the change in light has been detected is the same, as appliances that are installed in the same room.

Moreover, in the foregoing aspect, for example, a plurality of light sources respectively disposed in a plurality of rooms within a building may be each lit according to a predetermined lighting pattern, and the control unit may determine one or more appliances, among the plurality of appliances, for which a same lighting pattern has been detected, as appliances that are installed in the same room.

Moreover, in the foregoing aspect, for example, the environmental information may include information relating to a time that the plurality of appliances have detected a change in sound, and the control unit may determine one or more appliances, among the plurality of appliances, in which the time that the change in sound has been detected is the same, as appliances that are installed in the same room.

Moreover, in the foregoing aspect, for example, a mobile appliance that moves between a plurality of rooms within a building may be caused to output sound, the environmental information may include information relating to a time that the plurality of appliances have detected a change in the sound output by the mobile appliance, and the control unit may determine one or more appliances, among the plurality of appliances, in which the time that the change in sound has been detected is the same, as appliances that are installed in the same room.

Moreover, in the foregoing aspect, for example, the environmental information may include information relating to a time that the plurality of appliances have detected a change in temperature, and the control unit may determine one or more appliances, among the plurality of appliances, in which the time that the change in temperature has been detected is the same, as appliances that are installed in the same room.

Embodiments of the present invention are now explained with reference to the appended drawings. Note that the ensuing embodiments are merely an example of materializing the present invention, and are not intended to limit the technical scope of the present invention in any way.

(Overall Image of Service to be Provided)

The overall image of the service to be provided by the information providing system in this embodiment is foremost explained.

FIG. 1A is a diagram showing the overall image of the service provided by the information providing system in the present embodiment. The information providing system comprises a group 100, a data center operating company 110 and a service provider 120.

The group 100 is, for example, a corporation, an organization or a home, regardless of its size. The group 100 includes a room 101 and a room 102. Moreover, the group 100 includes a home gateway 103. The home gateway 103 may exists in either the room 101 or the room 102, or exists in a space that is outside the room 101 and the room 102.

The room 101 includes the plurality of appliances 101a, 101b, 101c, and the room 102 includes a plurality of appliances 102a, 102b. Note that, here, while the plurality of appliances 101a, 101b, 101c, 102a, 102b are indicated, the number of appliances to be installed in the room 101 and the room 102 is not limited thereto, and a plurality of appliances are disposed in the respective rooms 101, 102. The configuration of each appliance will be described later. Moreover, the number of rooms included in the group 100 is not limited to two rooms, and the group 100 may also include three or more rooms.

The plurality of appliances 101a, 101b, 101c, 102a, 102b include appliances that can be connected to the internet (for example, smartphone, personal computer (PC) or TV), and appliances that cannot be directly connected to the internet (for example, lighting apparatus, washing machine or refrigerator). The plurality of appliances 101a, 101b, 101c, 102a, 102b may be appliances that cannot be directly connected to the internet, or include apparatuses that can be connected to the internet via the home gateway 103.

Moreover, a user 10 uses the plurality of appliances 101a, 101b, 101c, 102a, 102b in the group 100.

Moreover, the group 100 may also include a mobile terminal 105 separate from the plurality of appliances 101a, 101b, 101c, 102a, 102b. The terminal 105 may also be in the possession of an outside user 20.

The data center operating company 110 comprises a cloud server 104. The cloud server 104 is a virtualized server that coordinates with various appliances via the internet. The cloud server 104 mainly manages vast data (big data) which is difficult to handle with standard database management tools. The data center operating company 110 manages data, manages the cloud server 104, and manages the data center that performs such management. The services provided by the data center operating company 110 will be described in detail later.

Here, the data center operating company 110 is not limited to a company that is only engaged in the management of data and the operation of the cloud server 104. For example, as shown in FIG. 1B, when an appliance manufacturer that is developing and manufacturing one appliance among the plurality of appliances 101a, 101b, 101c, 102a, 102b is managing data or operating the cloud server 104, that appliance manufacturer corresponds to the data center operating company 110. Moreover, the data center operating company 110 is not limited to one company. For example, as shown in FIG. 1C, when an appliance manufacturer and another management company are jointly managing data or operating the cloud server 104 or sharing the duties thereof, the appliance manufacturer and/or the other management company corresponds to the data center operating company 110.

The service provider 120 comprises a server 121. The server 121 as referred to herein includes, for example, a memory in a PC or the like, regardless of its size. Moreover, there may be cases where the service provider 120 does not comprise the server 121.

Note that, in the foregoing service, the home gateway 103 is optional. For example, when the cloud server 104 is managing all data, the home gateway 103 may be omitted. Moreover, in cases where all appliances in the home are connected to the internet, there may be cases where there are no appliances that cannot be directly connected to the internet. Moreover, an appliance such as the home gateway 103 that is installed indoors may perform all of the processing in all embodiments explained below. Moreover, it is also possible to install an indoor processing device (not shown) separately from the home gateway 103 and cause that indoor processing device to perform all of the processing in the embodiments explained below. In other words, all of the processing performed by the cloud server 104 or the server 121 in all embodiments explained below may be substituted with the indoor processing device. In the foregoing case, the cloud server 104 or the server 121 is not a requisite configuration.

The flow of information in the foregoing service is now explained.

Foremost, the plurality of appliances 101a, 101b, 101c, 102a, 102b of the group 100 send their respective log information to the cloud server 104 of the data center operating company 110. The cloud server 104 accumulates the log information of the plurality of appliances 101a, 101b, 101c, 102a, 102b (arrow 131 of FIG. 1A). Here, the log information is, for example, information indicating the operating condition or the operated date/time of the plurality of appliances 101a, 101b, 101c, 102a, 102b. For example, the log information includes, but is not limited to, viewing history of a TV, recording reservation information of a recorder, operated date/time of a washing machine, amount of laundry to be washed, date/time that a refrigerator was opened/closed, and number of times that a refrigerator was opened/closed, and may also include various types of information that can be acquired from the various appliances.

Note that the log information may also be provided to the cloud server 104 directly from the plurality of appliances 101a, 101b, 101c, 102a, 102b via the internet. Moreover, the log information may also be once accumulated in the home gateway 103 from the plurality of appliances 101a, 101b, 101c, 102a, 102b, and then provided from the home gateway 103 to the cloud server 104.

Subsequently, the cloud server 104 of the data center operating company 110 provides the accumulated log information to the service provider 120 in a given unit. Here, a given unit may be a unit in which the information accumulated by the data center operating company 110 can be organized and provided to the service provider 120, or a unit that is requested by the service provider 120. Moreover, while the foregoing explanation is providing the accumulated log information in a given unit, the provision is not limited to a given unit, and the amount of information to be provided may be changed in accordance with the circumstances. The log information is stored in the server 121 equipped in the service provider 120 as needed (arrow 132 of FIG. 1A).

In addition, the service provider 120 organizes the log information as information that is suitable for the service to be provided to the user, and then provide the organized information to the user. The user to receive the service may be the user 10 to use the plurality of appliances 101a, 101b, 101c, 102a, 102b, or the outside user 20. As the method of providing the service to the users 10, 20, for example, the service may be provided directly from the service provider 120 to the users 10, 20 (arrows 133, 134 of FIG. 1A). Moreover, as the method of providing the service to the user 10, for example, the server may be provided to the user 10 by once again going through the cloud server 104 of the data center operating company 110 (arrows 135, 136 of FIG. 1A). Moreover, the cloud server 104 of the data center operating company 110 may organize the log information as information that is suitable for the service to be provided to the user, and then provide the organized information to the service provider 120.

Moreover, as the service providing method, the service may be provided to the user by feeding back the service contents to the plurality of appliances 101a, 101b, 101c, 102a, 102b, or the service may be provided to the user by displaying the service contents on the terminal 105 that is being used by the user 10 in the group 100 or by the outside user 20.

Note that the user 10 may be different from, or the same as, the user 20.

The overall image of the service to be provided by the information providing system was explained above, but this is merely an example, and there are various types of service providing methods. As evident from the ensuing embodiments describing various types of service providing methods, the present information providing system can be applied to all types of services.

(Configuration of Respective Devices)

The configuration of the respective devices shown in FIG. 1 is now explained with reference to FIG. 2.

FIG. 2 is a diagram showing the configuration of the respective appliances 101a, 101b, 101c, 102a, 102b in the respective rooms 101 and 102 shown in FIG. 1, the configuration of the cloud server 104 and the configuration of the terminal 105. The appliances 101a, 101b, 101c, 102a, 102b respectively comprise a communication unit 310. Moreover, the appliances 101a, 101b, 101c, 102a, 102b may also comprise a control unit 320, a recording unit 330 and a detection unit 340 as needed.

The communication unit 310 has a wireless or wired communication function, and is connected to a network 1000 such as the internet. For example, wireless communication is performed using Bluetooth (registered trademark), a wireless LAN (Local Area Network) or the like. Here, the appliances 101a, 101b, 101c, 102a, 102b include appliances that can be connected to the internet (for example, smartphone, PC or TV), and appliances that cannot be directly connected to the internet (for example, lighting apparatus, washing machine or refrigerator).

The control unit 320 performs the various control related to the respective appliances 101a, 101b, 101c, 102a, 102b. There is no particular limitation regarding the control unit 320. For example, the control unit 320 may be configured from a CPU (Central Processing Unit) or a microcomputer.

The recording unit 330 accumulates information. There is no particular limitation regarding the recording unit 330. The recording unit 330 is configured from an electronic component or a chip comprising a recording function that is built into the appliance. When the appliance includes a connecting unit for connecting with an external recording medium, then that connecting unit is included in the recording unit 330.

Moreover, the appliances 101a, 101b, 101c, 102a, 102b preferably comprise the detection unit 340 as needed. The detection unit 340 includes a sensor for detecting sound, light, temperature or heat, or a detection unit for detecting an image. There is no particular limitation regarding the details of the detection unit 340. Moreover, not all appliances need to comprise the detection unit 340. Details regarding the detection unit 340 will be explained in the respective embodiments.

The configuration of the cloud server 104 is now explained. The cloud server 104 comprises a communication unit 311, a control unit 321 and a main memory 331. The control unit 321 is configured, for example, from a CPU (Central Processing Unit). Moreover, in multi-processing, the control unit 321 may be configured from a plurality of CPUs. The communication unit 311 communicates with the respective appliances via the internet. There is no limitation regarding the communication method of the communication unit 311. The main memory 331 is a recording device capable of storing large-capacity data (big data). Moreover, the cloud server 104 may also comprise a bus line for carrying data to a plurality of locations, a BIOS (Basic Input Output System) for recording programs to be executed by the CPU when the server is activated, an I/O controller for connecting a storage device such as a hard disk or an optical disk drive, a display device, or an input device. Moreover, since the configuration of the server 121 is the same as the configuration of the cloud server 104, the explanation thereof is omitted.

The terminal 105 comprises, for example, the communication unit 310. Moreover, the terminal 105 comprises the control unit 320, the recording unit 330 and the display unit 350 as needed.

The home gateway 103 comprises, for example, a communication unit 311, a control unit 321 and a main memory 331 (not shown). Since the configuration of the home gateway 103 is the same as the configuration of the cloud server 104, the explanation thereof is omitted. Moreover, the home gateway 103 is not required to include the main memory 331.

Embodiment 1

Embodiment 1 shows an information providing system capable of detecting the location of appliances in a home.

FIG. 3 is a diagram showing the overall configuration of the information providing system in embodiment 1. With the information providing system of this embodiment, as shown in FIG. 3, the appliances 101a, 101b, 101c, 102a, 102b are desirably connected to the cloud server 104 via the network 1000. Moreover, desirably, the respective appliances also send, as needed, the operating information of the appliances or the output of the various sensors equipped in the appliances from the communication unit 310 to the cloud server 104 via the network 1000. Note that, while not described in detail in this embodiment, the terminal 105 also comprises, as with the appliances, the communication unit 310 for communicating with the cloud server 104 via the network 1000.

(Configuration of Information Providing System)

Figure 4:
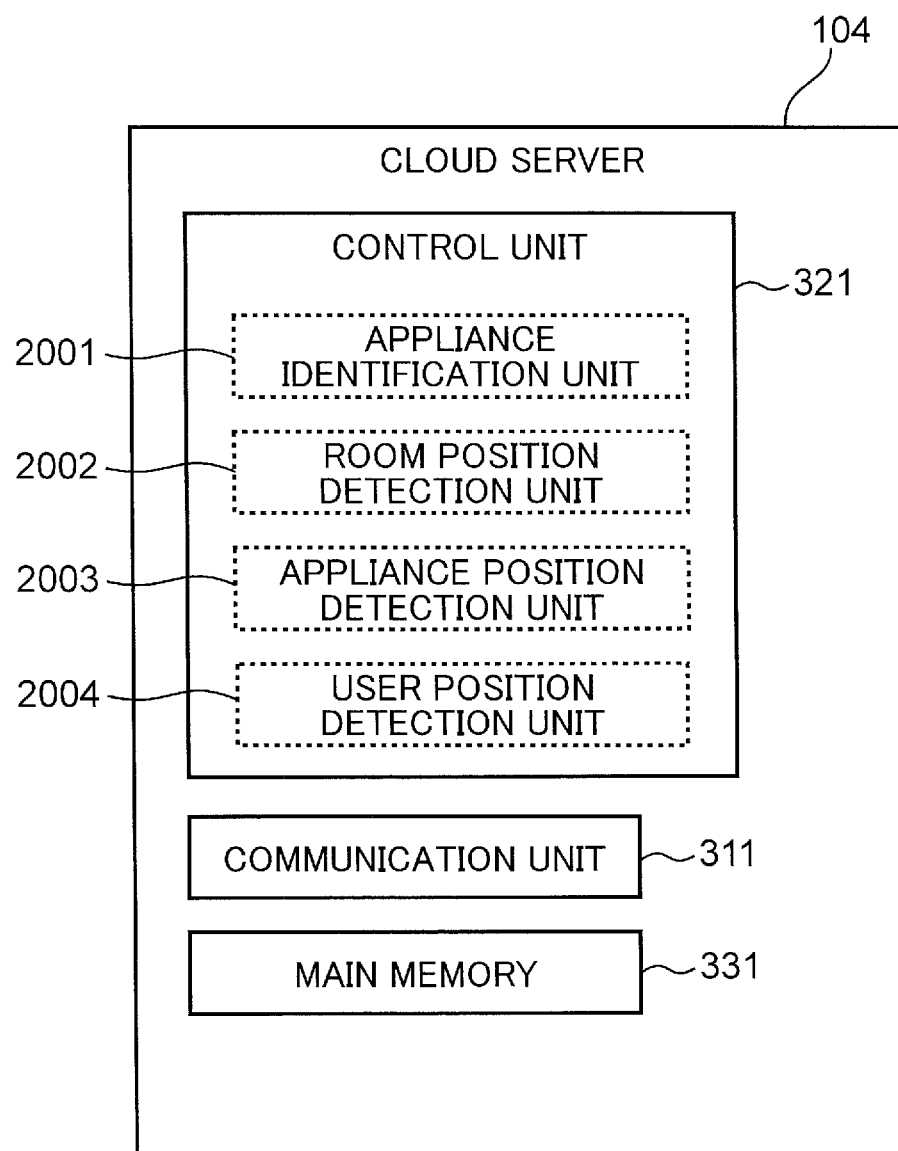
FIG. 4 is a diagram showing the detailed configuration of the control unit of the cloud server in embodiment 1.

FIG. 4 is a diagram showing the detailed configuration of the control unit 321 of the cloud server 104 in embodiment 1. As shown in FIG. 4, the control unit 321 of the cloud server 104 in this embodiment comprises an appliance identification unit 2001, a room position detection unit 2002, an appliance position detection unit 2003, and a user position detection unit 2004. However, the control unit 321 in this embodiment does not necessarily have to comprise all of these detection units. In other words, the control unit 321 in this embodiment may be lacking one or more detection units.

Moreover, in this embodiment, the appliance identification unit 2001, the room position detection unit 2002, the appliance position detection unit 2003, and the user position detection unit 2004 respectively yield the same effect even when used independently.

The appliance identification unit 2001, the room position detection unit 2002, the appliance position detection unit 2003 and the user position detection unit 2004 are now explained in detail.

(Appliance Identification Unit 2001)

In the ensuing explanation, the appliance identification unit 2001 in the control unit 321 of the cloud server 104 is foremost explained. The appliance identification unit 2001 assesses the appliance group that is installed in the same room. It is thereby possible to control the appliances for each room.

The communication unit 311 of the cloud server 104 receives environmental information of respective installation sites of a plurality of appliances via the network 1000.

The appliance identification unit 2001 determines one or more appliances that are installed in a same room among the plurality of appliances based on the environmental information received by the communication unit 311. Moreover, the appliance identification unit 2001 may also provide information relating to the one or more appliances to a specific appliance among the plurality of appliances or to the terminal 105 other than the plurality of appliances.

The appliance identification unit 2001 includes an appliance identification unit 2001a, an appliance identification unit 2001b, an appliance identification unit 2001c and an appliance identification unit 2001d.

Here, several methods (appliance identification unit 2001a, appliance identification unit 2001b, appliance identification unit 2001c and appliance identification unit 2001d) for detecting devices in the same room are explained.

(Appliance Identification Unit 2001a)

Figure 5:
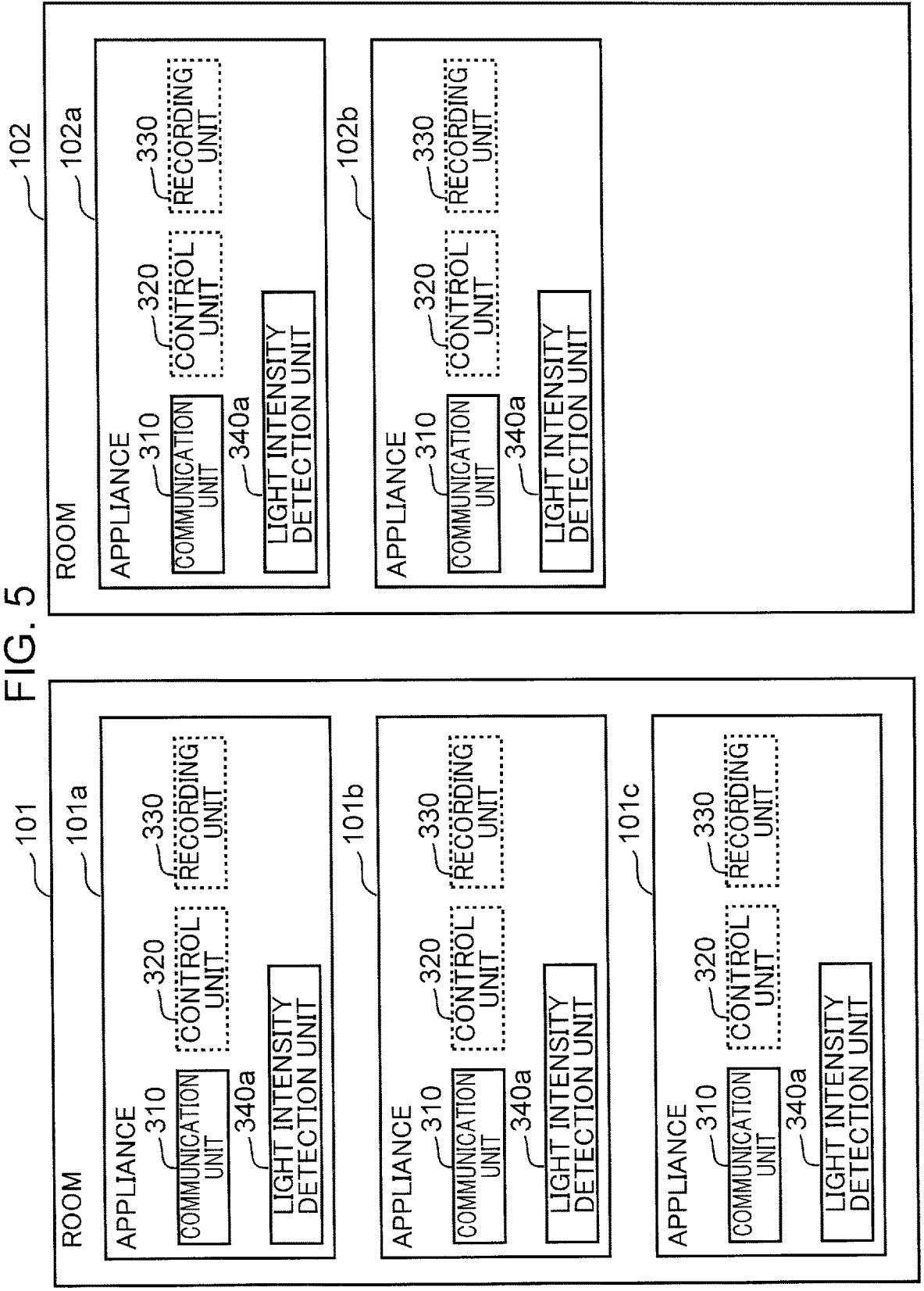
FIG. 5 is a diagram showing the configuration of the respective appliances in a case where the control unit of the cloud server comprises the appliance identification unit.

FIG. 5 is a diagram showing the configuration of the respective appliances in a case where the control unit 321 of the cloud server 104 comprises the appliance identification unit 2001a. The appliances 101a, 101b, 101c, 102a, 102b disposed in the room 101 and the room 102 respectively comprise a light intensity detection unit 340a as the detection unit 340.

The light intensity detection unit 340a of the appliances 101a, 101b, 101c detects the brightness (light intensity) in the room 101 as the environmental information of the room 101. Moreover, the light intensity detection unit 340a of the appliances 102a, 102b detects the brightness (light intensity) in the room 102 as the environmental information of the room 102. The light intensity detection unit 340a is configured, for example, from a phototransistor, a photodiode, or a photodiode with an amplifier circuit added thereto. Consequently, by comparing the time change of the light intensity detected by the plurality of appliances 101a, 101b, 101c in the room 101, the appliance identification unit 2001a can identify (detect) that the respective appliances 101a, 101b, 101c are appliances that are installed in the same room.

The environmental information includes information relating to the time that the plurality of appliances have detected a change in light. The appliance identification unit 2001a determines one or more appliances, among the plurality of appliances, in which the time that the change in light has been detected is the same, as appliances that are installed in the same room.

The method of the appliance identification unit 2001a detecting devices in the same room is now explained in detail.

FIG. 6 is a sequence diagram showing the operation of the information providing system for identifying the appliances in the same room by detecting the light intensity.

Foremost, in step S610, the light intensity detection unit 340a of the respective appliances 101a, 101b, 101c, 102a, 102b detects the change in the light intensity. The timing that the light intensity detection unit 340a detects the change in the light intensity may be any timing. For example, the light intensity detection unit 340a may detect the timing that the value of change in the light intensity exceeds a predetermined threshold within a given period of time. Moreover, for appliances that comprise the control unit 320, the light intensity detection unit 340a may detect the light intensity for each given period of time, and the control unit 320 may create a table relating to the time that the light intensity has been detected and the transition of the detected light intensity.

Subsequently, in step S620, the communication unit 310 of the respective appliances 101a, 101b, 101c, 102a, 102b sends, to the cloud server 104, time information regarding the timing that the value of change in the light intensity exceeded a predetermined threshold. Here, there is no particular limitation in the timing of sending the time information. For example, the communication unit 310 may send the time information to the cloud server 104 immediately after detecting the change in the light intensity in step S610. Moreover, the communication unit 310 may also send information regarding whether was any change in the light intensity and the time information to the cloud server 104 for each given period of time. In other words, this timing is not necessarily the same as the timing that the respective appliances sent the time information to the cloud server 104 in step S620. Moreover, the method of sending the time information from the appliances at a predetermined timing as shown in FIG. 6 does not have to be adopted. For example, the cloud server 104 may send to the respective appliances, for each given period of time, an instruction for sending the information regarding whether was any change in the light intensity and the time information.

Subsequently, in step S630, the appliance identification unit 2001a of the cloud server 104 identifies the appliances that are located in the same room based on the time information sent from the respective appliances.

FIG. 7 is a diagram showing an example of the time information that is sent to the cloud server 104. In the example of the time information shown in FIG. 7, the light intensity detection unit 340a of the appliance 101a detected a change in the light intensity at 07:15, the light intensity detection unit 340a of the appliance 101b detected a change in the light intensity at 07:15, the light intensity detection unit 340a of the appliance 101c detected a change in the light intensity at 07:15, the light intensity detection unit 340a of the appliance 102a detected a change in the light intensity at 08:23, and the light intensity detection unit 340a of the appliance 102b detected a change in the light intensity at 08:23, respectively.

The appliance identification unit 2001a of the cloud server 104 identifies the appliance 101a, the appliance 101b and the appliance 101c, in which the time that the change in the light intensity has been detected is the same, as the appliances that are disposed in the same room based on the time information shown in FIG. 7. Similarly, the appliance identification unit 2001a identifies the appliance 102a and the appliance 102b, in which the time that the change in the light intensity has been detected is the same, as the appliances that are disposed in the same room.

As a result of the appliance identification unit 2001a identifying the appliances existing in the same room based on the light intensity as described above, it is possible to identify that appliances such as a mobile phone or a robotic cleaner capable of moving between a plurality of rooms or appliances that are not connected to a circuit breaker exist in the same room. Moreover, the operation of a user or a service provider pre-registering, in a system, information relating to a plurality of appliances or location of the room where a plurality of appliances are installed, is no longer required. Since light does not easily leak to the adjacent room, the identification method using light is an effective means upon identifying the appliances belonging to the respective rooms.

Here, while the respective appliances directly sent the time information to the cloud server 104 in step S620, the present invention is not limited thereto. The respective appliances may also send the time information to the home gateway 103, and the home gateway 103 may send the time information to the cloud server 104. Moreover, here, the home gateway 103 may organize the time information, and send the organized time information to the cloud server 104.

Moreover, it would be even more desirable to install a light source for generating light within the room 101. Since it will thereby be possible to identify the appliances in which the measured light intensity increased (decreased) at the time that the light source was turned on (turned off) as the appliances located in the room 101, it will be possible to more accurately identify the appliances existing in the room 101. The light source to generate light may be configured, for example, from a generally used lighting apparatus such as an LED (Light Emitting Diode), an OLED (Organic Light Emitting Diode) or a fluorescent light.

FIG. 8 is a diagram showing the configuration of the information providing system in a first modified example of embodiment 1. As shown in FIG. 8, the information providing system may also comprise light sources 801, 802 for generating light. The light sources 801, 802 comprise a communication unit 810 connected to the cloud server 104 via the network 1000, a control unit 820, and a light emitting unit 800 that emits light. Here, the light source 801 is disposed in the room 101, and the light source 802 is disposed in the room 102, which is different from the room 101.

The appliance identification unit 2001a causes each of the plurality of light sources, which are respectively disposed in a plurality of rooms within a building, to be lit at a predetermined lighting pattern. The appliance identification unit 2001a determines one or more appliances, among the plurality of appliances, for which a same lighting pattern has been detected, as appliances that are installed in the same room.

Figure 9:
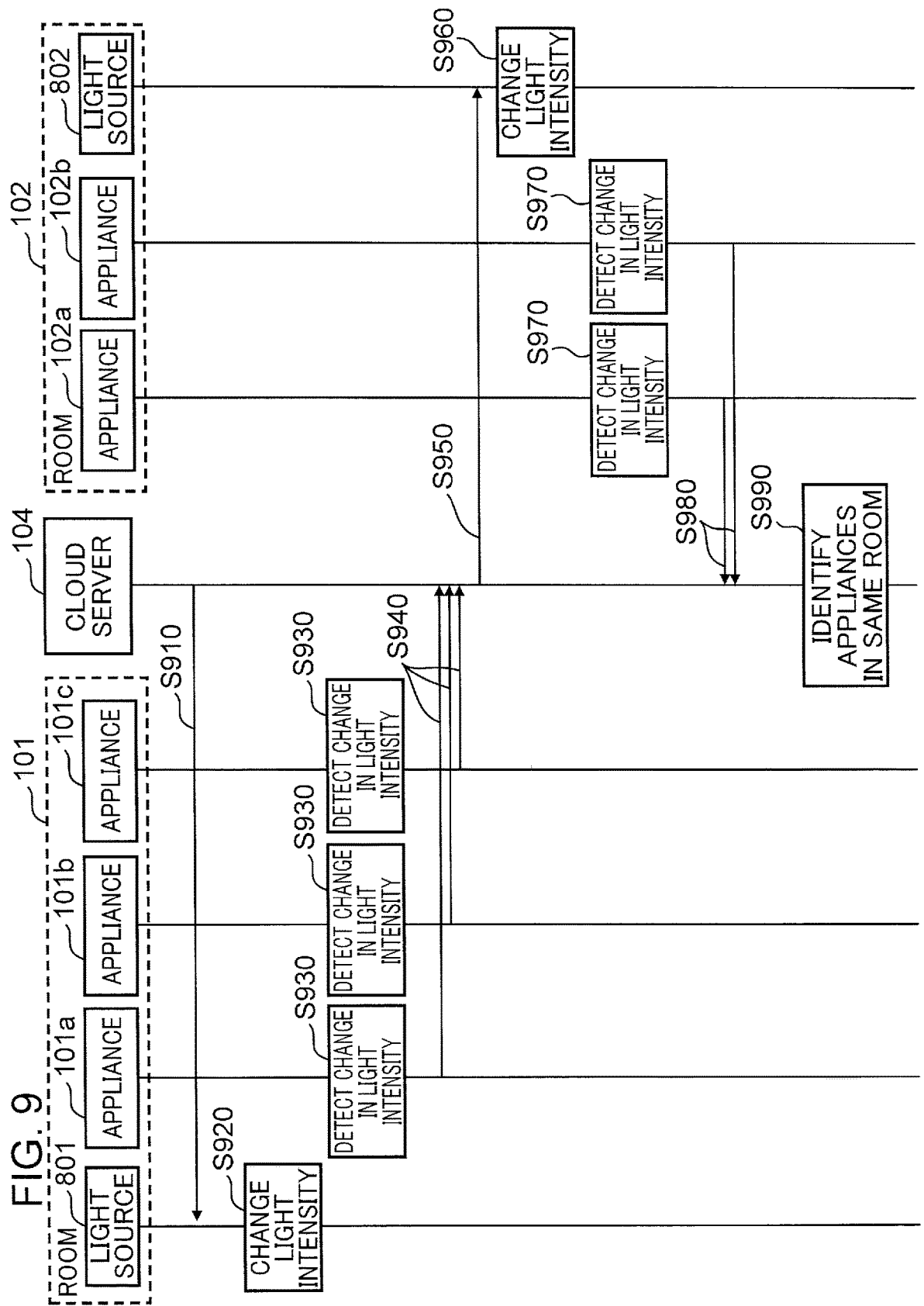
FIG. 9 is a sequence diagram showing the operation of the information providing system shown in FIG. 8.

FIG. 9 is a sequence diagram showing the operation of the information providing system shown in FIG. 8.

Foremost, in step S910, the cloud server 104 receives some kind of interaction from the user, and sends a command to the light source 801 for changing the light intensity. Here, some kind of interaction refers to an instruction for controlling the light source 801 via the cloud server 104 that is given from the user by using some kind of terminal that is connected to the network 1000.

Subsequently, in step S920, the communication unit 810 of the light source 801 receives a command for changing the light intensity, and the control unit 820 of the light source 801 changes the light intensity of the light emitting unit 800.

Since the processing of step S930 and step S940 is each the same as the processing of step S610 and step S620 in FIG. 6, the explanation thereof is omitted.

Subsequently, in step S950, as with step S910, the cloud server 104 receives some kind of interaction from the user and sends a command to the light source 802 for changing the light intensity.

Subsequently, in step S960, as with step S920, the communication unit 810 of the light source 802 receives the command for changing the light intensity, and the control unit 820 of the light source 802 changes the light intensity of the light emitting unit 800.

Since the subsequent processing of step S970, step S980 and step S990 is each the same as the processing of step S610, step S620 and step S630 in FIG. 6, the explanation thereof is omitted.

Consequently, it becomes possible to turn on (turn off) the light sources 801, 802 at an arbitrary time that is instructed from an appliance such as the cloud server 104 via the network 1000. Thus, it is possible to identify the appliances existing in the same room at an arbitrary time and an arbitrary frequency. Moreover, it is also possible for the user to instruct the time of turning on the light sources 801, 802 via the network 1000.

Note that the light sources 801, 802 are desirably installed on the ceiling of the rooms 101, 102. Since this will enable more appliances in the same room to detect light, it will be possible to identify more appliances as appliances existing in the same room.

Moreover, desirably, a plurality of light sources are installed at a plurality of locations in the rooms 101, 102. It is thereby possible to identify more appliances as appliances existing in the same room. Moreover, desirably, among the plurality of light sources, at least one light source is installed on the ceiling of the room 101 and at least another light source is installed on the floor of the room 101. It is thereby possible to identify more appliances as appliances existing in the same room.

Moreover, desirably, a plurality of light sources that respectively emit light of different wavelengths are installed in the room 101. It is thereby possible to identify more appliances as appliances existing in the same room even in cases where the wavelength of light that can be detected by each appliance is different.

Moreover, desirably, the plurality of light sources installed at a plurality of locations are turned on or turned off in sync. Since the intensity of light that can be obtained by the respective appliances in the same room will increase, appliances existing in the same room can be more accurately identified. Thus, each of the plurality of light sources installed at a plurality of locations are desirably the light source 801 comprising the light emitting unit 800, the communication unit 810, and the control unit 820, respectively. Moreover, the light source 801 and the light source 802 are desirably connected to the cloud server 104 via the network 1000. It is thereby possible to facilitate the control of turning on or turning off the light sources in sync.

Moreover, when the information providing system comprises the light source 801 and the light source 802, desirably, the light sources 801, 802 temporally change the light intensity. It is thereby possible to identify the appliances existing in the same room more accurately.

Figure 20:
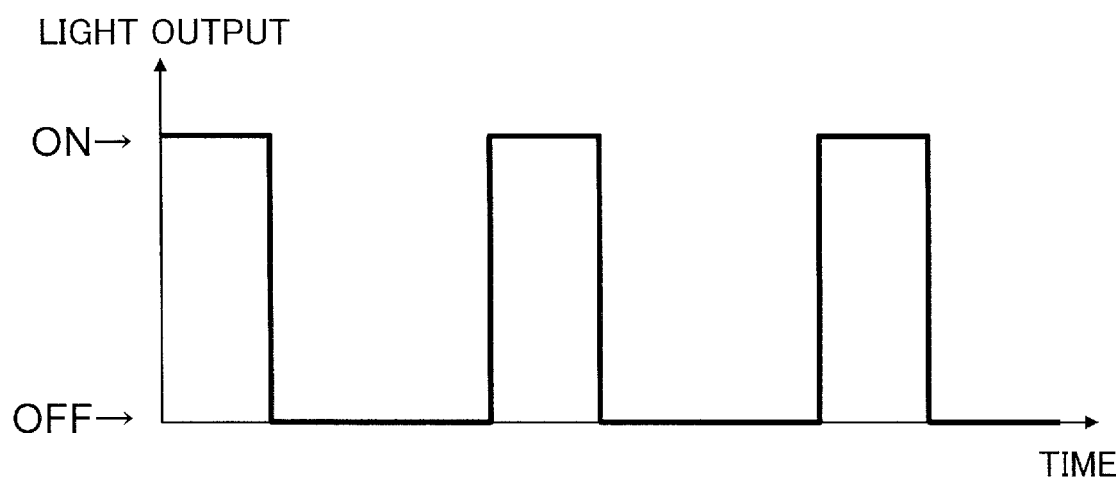
FIG. 20 is a diagram showing an example of the intermittent pattern of causing the light emitting unit to emit light intermittently.
Figure 21:
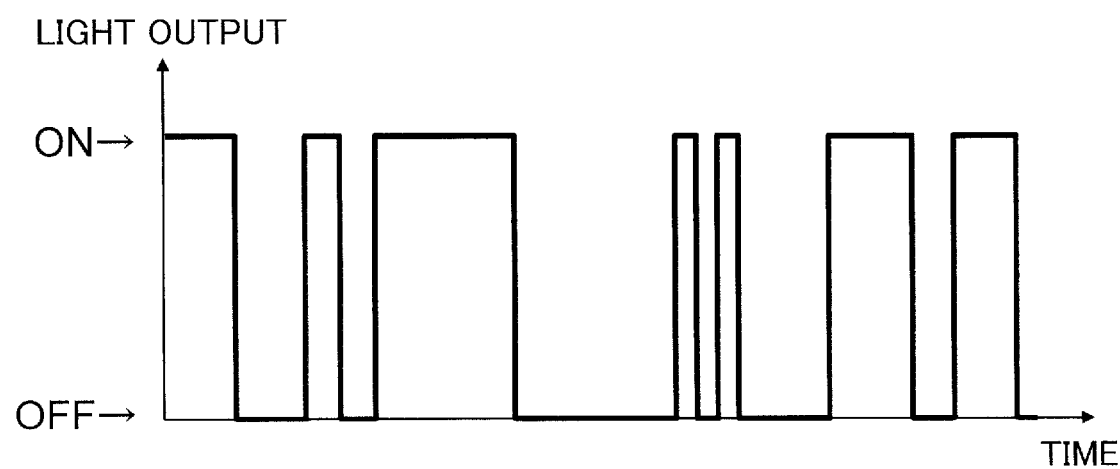
FIG. 21 is a diagram showing another example of the intermittent pattern of causing the light emitting unit to emit light intermittently.

Moreover, the light sources 801, 802 may be lit intermittently. It is thereby possible to identify the appliances existing in the same room even more accurately. Here, intermittent lighting is, for example, as shown in FIG. 20 and FIG. 21 described later, to temporally change the light output upon lighting the light sources (blinking drive).

Moreover, upon temporally changing the light intensity of the light sources 801, 802, it is desirable to change the light intensity of the light sources 801, 802 periodically, and also to change the cycle thereof. Moreover, upon intermittently lighting the light sources 801, 802, it is desirable to intermittently light the light sources 801, 802 periodically, and also to change the cycle thereof. It is thereby possible to prevent the erroneous identification of appliances in the same room caused by, for example, periodically electric noise and optical noise, and it is thereby possible to identify the appliances existing in the same room even more accurately.

Moreover, when visible light is used, the information providing system desirably comprises a light source capable of generating light having a brightness of at least 1 lux or more as the light that will reach the light intensity detection unit 340*a* of the respective appliances. It is thereby possible to identify the appliances existing in the same room even more accurately, and, simultaneously, the user can use the light source as an illumination.

Moreover, the brightness of the light source is desirably 100 lux or more. The light source can thereby also function as an illumination capable of providing to the user a brightness which enables the performance of general home tasks.

Moreover, the brightness of the light source is desirably 10,000 lux or less. It is thereby possible to alleviate the glare that is felt by the user.

Moreover, desirably, at least a part of the ceiling, wall and floor of the room 101 is able to scatter light. Since more appliances can thereby detect light, it is thereby possible to identify more appliances as appliances existing in the same room even. As the surface for scattering light, desirably used is a surface that is subject to patterned indentation treatment of the same level as the optical wavelength, or a surface that contains particles of the same level as the optical wavelength and is subject to antireflection treatment. Since more uniform scattering of light is thereby enabled, it is thereby possible to identify more appliances as appliances existing in the same room.

Moreover, desirably, at least a part of the ceiling, wall and floor of the rooms 101, 102 is provided with a coating for increasing the reflectance of the light emitted from the light sources 801, 802. Since the intensity of light that is detected by the respective appliances can thereby be increased, it is thereby possible to identify the appliances existing in the same room more accurately. Note that, as the coating material, oleaginous silicon or Skill Titanium may be used.

Moreover, desirably, the information providing system comprises a detection unit for detecting the opening/closing of the entrance of light such as the doors or curtains in the rooms 101, 102. Consequently, by the respective appliances detecting the light that enters the room as a result of the door or the curtain being opened, it is thereby possible to identify the appliances existing in the same room more accurately.

Moreover, while the foregoing explanation described a method of identifying the appliances existing in the same room by detecting light (visible light), since light is a type of electromagnetic wave, other electromagnetic waves such as infrared rays, ultraviolet rays or microwaves may also be used for identifying the appliances existing in the same room.

However, visible light, infrared rays or ultraviolet rays are desirably used since the appliances existing in the same room can be identified least expensively and accurately. In particular, the use of visible light is desirable since it is possible to identifying the appliances existing in the same room with minimal power consumption. Moreover, infrared rays or microwaves may also be used, and in such a case appliances existing in the same room can be identified even at a timing when the irradiation of visible light is undesirable such as while the user is sleeping in the room 101.

Moreover, by using infrared rays, since the infrared rays emitted from the human body is detected by the respective appliances at the timing that the user enters the room 101, the light intensity detection unit 340*a* can substitute a pyroelectric sensor for detecting the human body without having to comprise a special light detection unit. This realizes a method of identifying appliances in the same room capable of detecting the human body.

Moreover, the light intensity detection unit 340*a* detects electromagnetic waves of a plurality of wavelengths such as detecting visible light and infrared light, or detecting visible light and microwaves. It is thereby possible to identify more appliances as appliances existing in the same room.

For example, even in cases when the light intensity detection unit 340*a* of the appliance 101*a* only detects infrared rays and the light intensity detection unit 340*a* of the appliance 101*c* only detects visible light, if the light intensity detection unit 340*a* of the appliance 101*b* detects both visible light and infrared rays, the three appliances 101*a*, 101*b*, 101*c* can be identified as appliance existing in the same room.

Moreover, the respective appliances may also detect the infrared rays that are emitted from a remote controller for remotely controlling appliances such as a TV or an optical disc recorder. It is thereby possible to detect appliances existing in the same room less expensively.

(Appliance Identification Unit 2001*b*)

Figure 10:
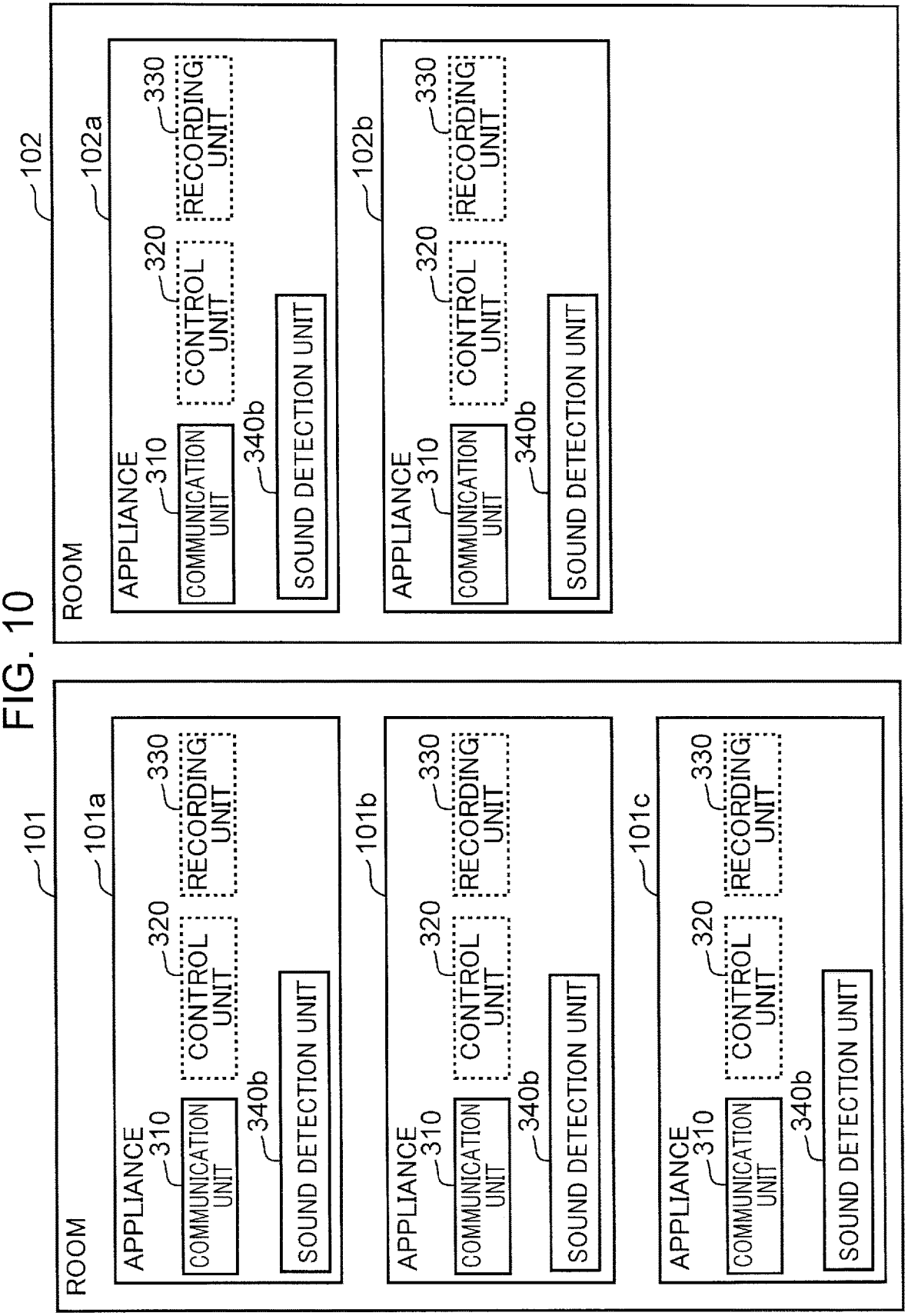
FIG. 10 is a diagram showing the configuration of the respective appliances in a case where the control unit of the cloud server comprises the appliance identification unit.

FIG. 10 is a diagram showing the configuration of the respective appliances in a case where the control unit 321 of the cloud server 104 comprises the appliance identification unit 2001*b*. The appliances 101*a*, 101*b*, 101*c*, 102*a*, 102*b* disposed in the room 101 and the room 102 respectively comprise a sound detection unit 340*b* as the detection unit 340.

The sound detection unit 340b of the appliances 101a, 101b, 101c detects the sound in the room 101 as the environmental information of the room 101. Moreover, the sound detection unit 340b of the appliances 102a, 102b detects the sound in the room 102 as the environmental information of the room 102. The sound detection unit 340b is configured, for example, from a microphone using a coil, a capacitor, or a piezoelectric material. Consequently, by comparing the time change of the frequency characteristics or the sound pressure detected by the respective appliances, the appliance identification unit 2001b can identify (detect) that the respective appliances are appliances that are installed in the same room.

The environmental information includes information relating to the time that the plurality of appliances have detected a change in sound. The appliance identification unit 2001b determines one or more appliances, among the plurality of appliances, in which the time that the change in sound has been detected is the same, as appliances that are installed in the same room.

The method of the appliance identification unit 2001b detecting devices in the same room is now explained in detail.

Figure 11:
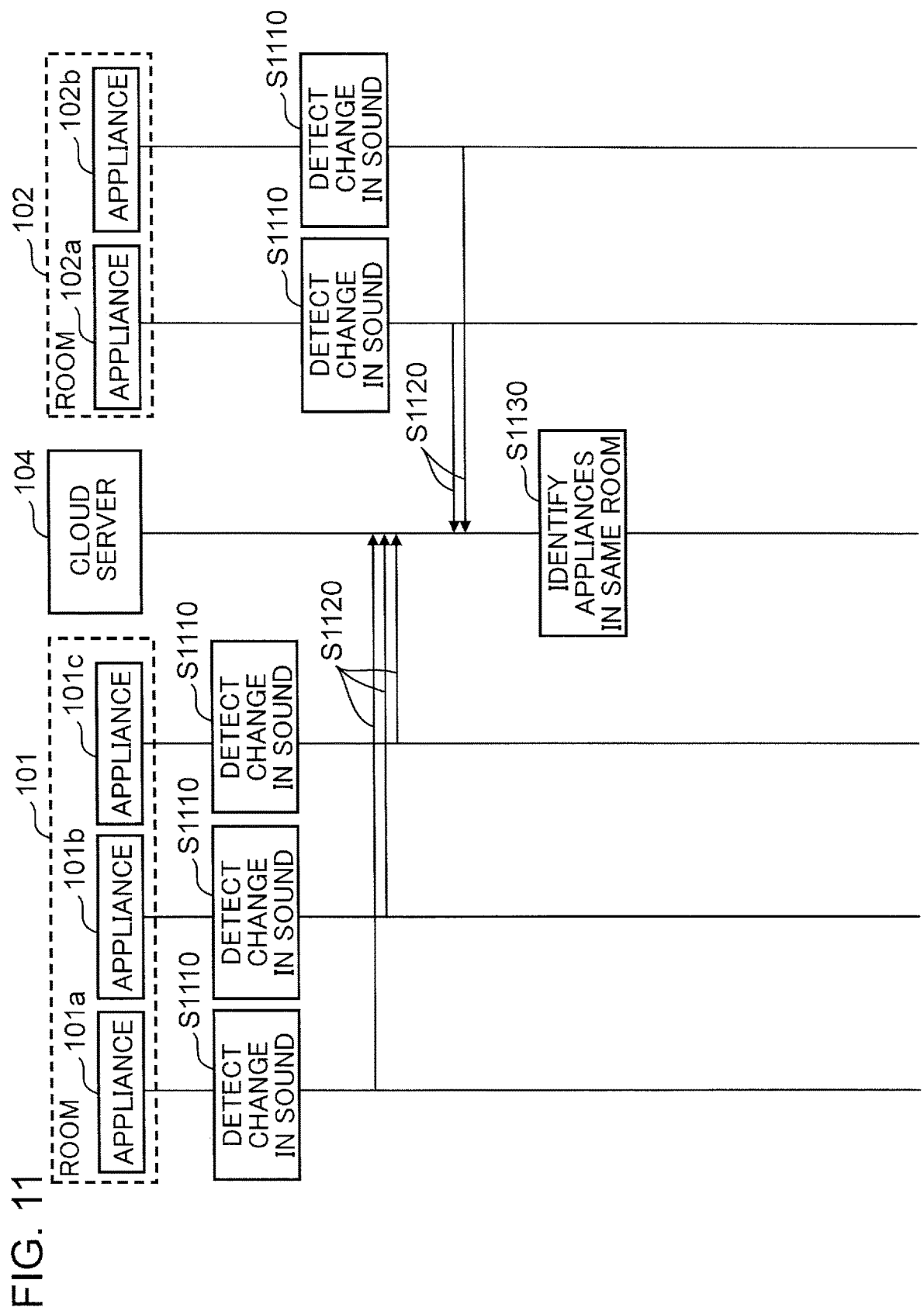
FIG. 11 is a sequence diagram showing the operation of the information providing system for identifying the appliances in the same room by detecting sound.

FIG. 11 is a sequence diagram showing the operation of the information providing system for identifying the appliances in the same room by detecting sound. While the operation of the information providing system shown in FIG. 11 is the same as the operation of the information providing system for identifying appliances in the same room by detecting the light intensity as shown in FIG. 6, the difference is in that, in step S1110, the respective appliances 101a, 101b, 101c, 102a, 102b detect the change in sound.

In step S1110, the sound detection unit 340b of the respective appliances 101a, 101b, 101c, 102a, 102b detects the change in sound. The timing that the sound detection unit 340b detects the change in sound may be any timing. For example, the sound detection unit 340b may detect the timing that the value of change in the sound waveform or frequency exceeds a predetermined threshold within a given period of time. Moreover, for appliances that comprise the control unit 320, the sound detection unit 340b may detect the sound waveform or frequency characteristics for each given period of time, and the control unit 320 may create a table relating to the time that the sound waveform or frequency characteristics were detected and the transition of the detected sound waveform or frequency characteristics.

The processing of step S1120 and step S1130 is the same as the processing of step S620 and step S630 in FIG. 6, and the appliance identification unit 2001b of the cloud server 104 identifies the appliances that are located in the same room based on the time information sent from the respective appliances.

As a result of the appliance identification unit 2001b identifying the appliances existing in the same room based on sound as described above, it is possible to identify that appliances such as a mobile phone or a robotic cleaner capable of moving between a plurality of rooms or appliances that are not connected to a circuit breaker exist in the same room. With the identification method using sound, it is also possible to assess the positional relationship of the respective appliances in the room. This will be explained later during the explanation of the appliance position detection unit 2003.

Moreover, the appliance identification unit 2001b may also identify appliances in which the time that the sound pressure exceeded a predetermined threshold as appliances that are installed in the same room in substitute for comparing the value of change in the sound waveform or frequency.

Moreover, based on a similar reason as in the case of using light (case of the control unit 321 comprising the appliance identification unit 2001a), the information providing system desirably comprises a sound source for generating sound in the room 101 or the room 102.

The sound source desirably includes plurality of sound sources in which the frequency characteristics of the generated sound are different.

In addition, the information providing system may also comprise a mobile appliance that outputs sound and moves between a plurality of rooms within the building. A mobile appliance is, for example, a portable appliance such as a portable terminal (smartphone) or a vacuum cleaner (robotic cleaner). Here, the appliance identification unit 2001a causes the mobile appliance, which moves between a plurality of rooms within the building, to output sound. The environmental information includes information relating to the time that the plurality of appliances have detected a change in the sound output by the mobile appliance. The appliance identification unit 2001a determines one or more appliances, among the plurality of appliances, in which the time that the change in sound has been detected is the same, as appliances that are installed in the same room.

Moreover, the information providing system concurrently use the appliance identification unit 2001a and the appliance identification unit 2001b. For example, when there is an appliance comprising both the light intensity detection unit 340a for detecting the light intensity and the sound detection unit 340b for detecting the sound, even in cases when an appliance comprising only the light intensity detection unit 340a and an appliance comprising only the sound detection unit 340b exist in the same room, it is possible to identify the respective appliances as appliances existing in the same room. For example, even in cases where the appliance 101a comprises only the sound detection unit 340b and the appliance 101c comprises only the light intensity detection unit 340a, as a result of the appliance 101b comprising both the light intensity detection unit 340a and the sound detection unit 340b, the three appliances 101a, 101b, 101c can be identified as existing in the same room.

Needless to say, the information providing system desirably comprises appliances which comprise a plurality of appliance identification units and are connected to the cloud server 104 via the network 1000 such as appliances capable of detecting both microwaves and sound.

(Appliance Identification Unit 2001c)

Figure 12:
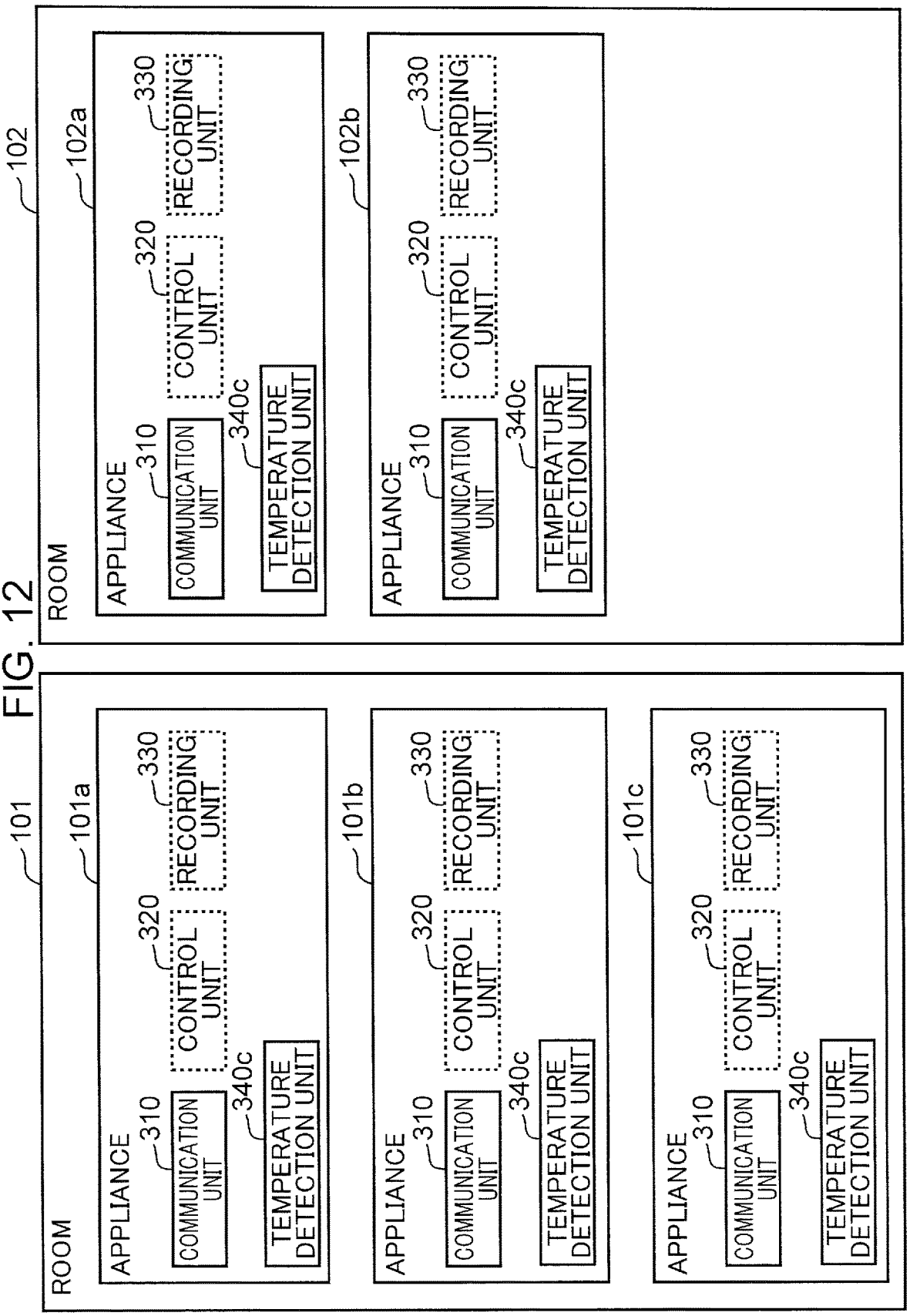
FIG. 12 is a diagram showing the configuration of the respective appliances in a case where the control unit of the cloud server comprises the appliance identification unit.

FIG. 12 is a diagram showing the configuration of the respective appliances in a case where the control unit 321 of the cloud server 104 comprises the appliance identification unit 2001c. The appliances 101a, 101b, 101c, 102a, 102b disposed in the room 101 and the room 102 respectively comprise a temperature detection unit 340c as the detection unit 340.

The temperature detection unit 340c of the appliances 101a, 101b, 101c detects the temperature in the room 101 as the environmental information of the room 101. Moreover, the temperature detection unit 340c of the appliances 102a, 102b detects the temperature in the room 102 as the environmental information of the room 102. The temperature detection unit 340c is configured, for example, from a thermistor or a thermocouple. Consequently, by comparing the time change of the temperature detected by the respective appliances, the appliance identification unit 2001c can identify (detect) that the respective appliances are appliances that are installed in the same room.

The environmental information includes information relating to the time that the plurality of appliances have detected a change in temperature. The appliance identification unit 2001c determines one or more appliances, among the plurality of appliances, in which the time that the change in temperature has been detected is the same, as appliances that are installed in the same room.

The method of the appliance identification unit 2001c detecting devices in the same room is now explained in detail.

Figure 13:
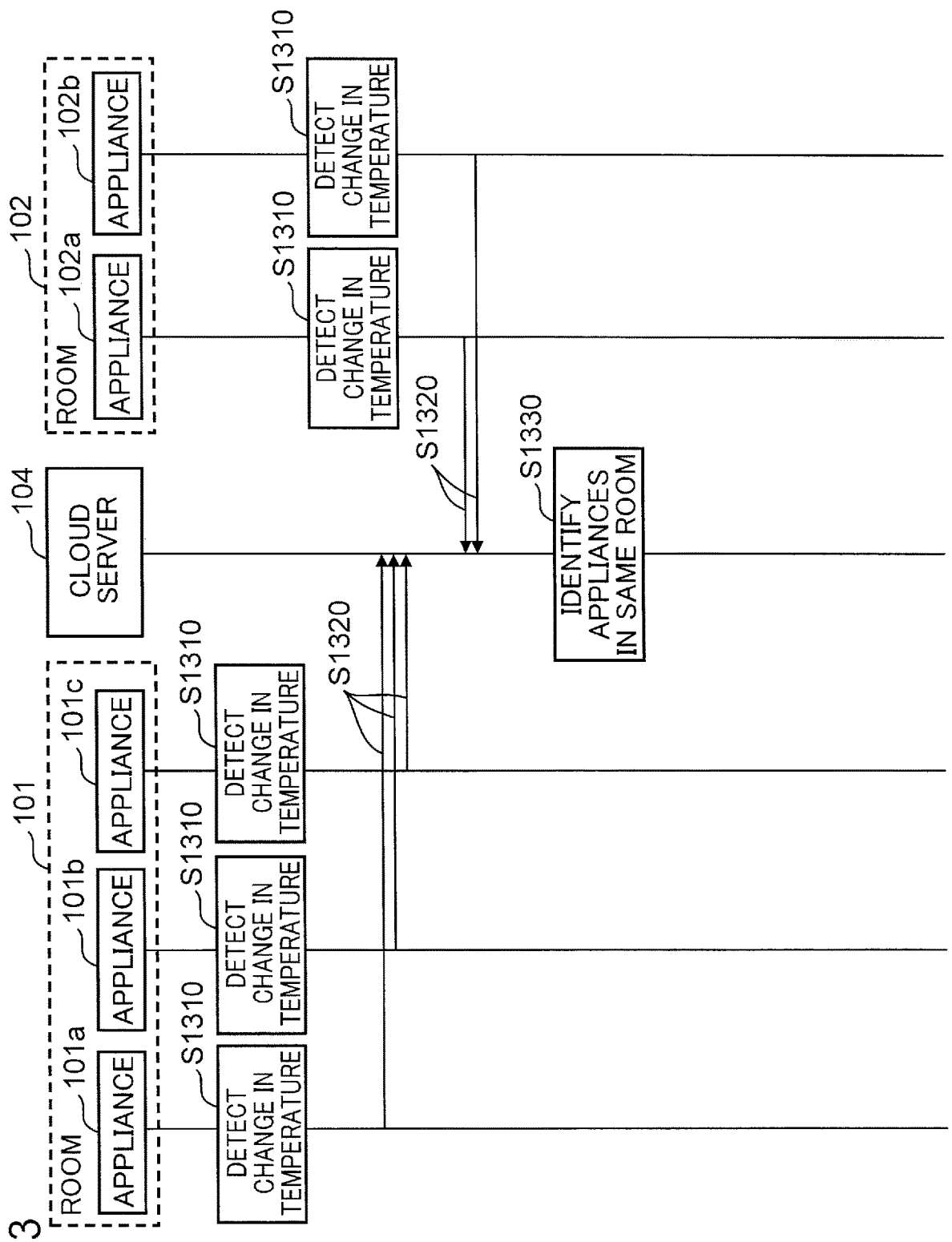
FIG. 13 is a sequence diagram showing the operation of the information providing system for identifying the appliances in the same room by detecting temperature.

FIG. 13 is a sequence diagram showing the operation of the information providing system for identifying the appliances in the same room by detecting temperature. While the operation of the information providing system shown in FIG. 13 is the same as the operation of the information providing system for identifying appliances in the same room by detecting the light intensity as shown in FIG. 6, the difference is in that, in step S1310, the respective appliances 101a, 101b, 101c, 102a, 102b detect the change in temperature.

In step S1310, the temperature detection unit 340c of the respective appliances 101a, 101b, 101c, 102a, 102b detects the change in temperature. The timing that the temperature detection unit 340c detects the change in temperature may be any timing. For example, the temperature detection unit 340c may detect the timing that the value of change in the temperature exceeds a predetermined threshold within a given period of time. Moreover, for appliances that comprise the control unit 320, the temperature detection unit 340c may detect the temperature for each given period of time, and the control unit 320 may create a waveform indicating the time change of the detected temperature.

The processing of step S1320 and step S1330 is the same as the processing of step S620 and step S630 in FIG. 6, and the appliance identification unit 2001c of the cloud server 104 identifies the appliances that are located in the same room based on the time information sent from the respective appliances.

As a result of the appliance identification unit 2001c identifying the appliances existing in the same room based on temperature as described above, it is possible to identify that appliances such as a mobile phone or a robotic cleaner capable of moving between a plurality of rooms or appliances that are not connected to a circuit breaker exist in the same room. With the identification method using temperature, appliances in the same room can be detected less expensively than the identification method using light or sound. Moreover, when temperature is used, detection for a given period of time is required since the change in temperature takes more time in comparison to light or sound.

Moreover, appliances that internally generate heat desirably comprise a plurality of temperature detection units in which the distance from the internal heat generation unit is each different. Since it is thereby possible to measure the temperature of the room more accurately, it is thereby possible to detect appliances existing in the same room more accurately.

For example, the appliances may comprise a first temperature detection unit disposed at a position that is near the heat generation unit, and a second temperature detection unit disposed at a position in which the distance from the heat generation unit is farther than the first temperature detection unit. In the foregoing case, by setting (storing) in advance (1) the thermal resistance between the heat generation unit and the first temperature detection unit, (2) the thermal resistance between the first temperature detection unit and the indoor environment, (3) the thermal resistance between the heat generation unit and the second temperature detection unit, and (4) the thermal resistance between the second temperature detection unit and the indoor environment, the indoor temperature can be measured more accurately even when the appliances internally comprise a heat generation unit.

Moreover, based on a similar reason as in the case of using light or sound, the information providing system desirably comprises a device for changing the room temperature in the room 101. It is thereby possible to identify the appliances existing in the same room more accurately. As the device for changing the room temperature, used may be, for example, a heater, an oil stove or an air-conditioner.

Moreover, a blower device for unifying the room temperature in the room is desirably installed in the room 101. It is thereby possible to identify the appliances existing in the same room more accurately.

Moreover, based on the same reasons described above, the appliances comprise both the light intensity detection unit 340a for detecting the intensity of light (electromagnetic waves), and the temperature detection unit 340c. Moreover, the appliances desirably comprise both the sound detection unit 340b and the temperature detection unit 340c. In addition, the appliance desirably comprise the light intensity detection unit 340a, the sound detection unit 340b and the temperature detection unit 340c.

(Room Position Detection Unit 2002)

The room position detection unit 2002 for detecting the positional relationship of the respective rooms is now explained. By assessing the positional relationship of the respective rooms in the building in addition to assessing the appliance group that is installed in the same room, the appliances can be controlled based on the positional relationship of the respective rooms.

Figure 14:
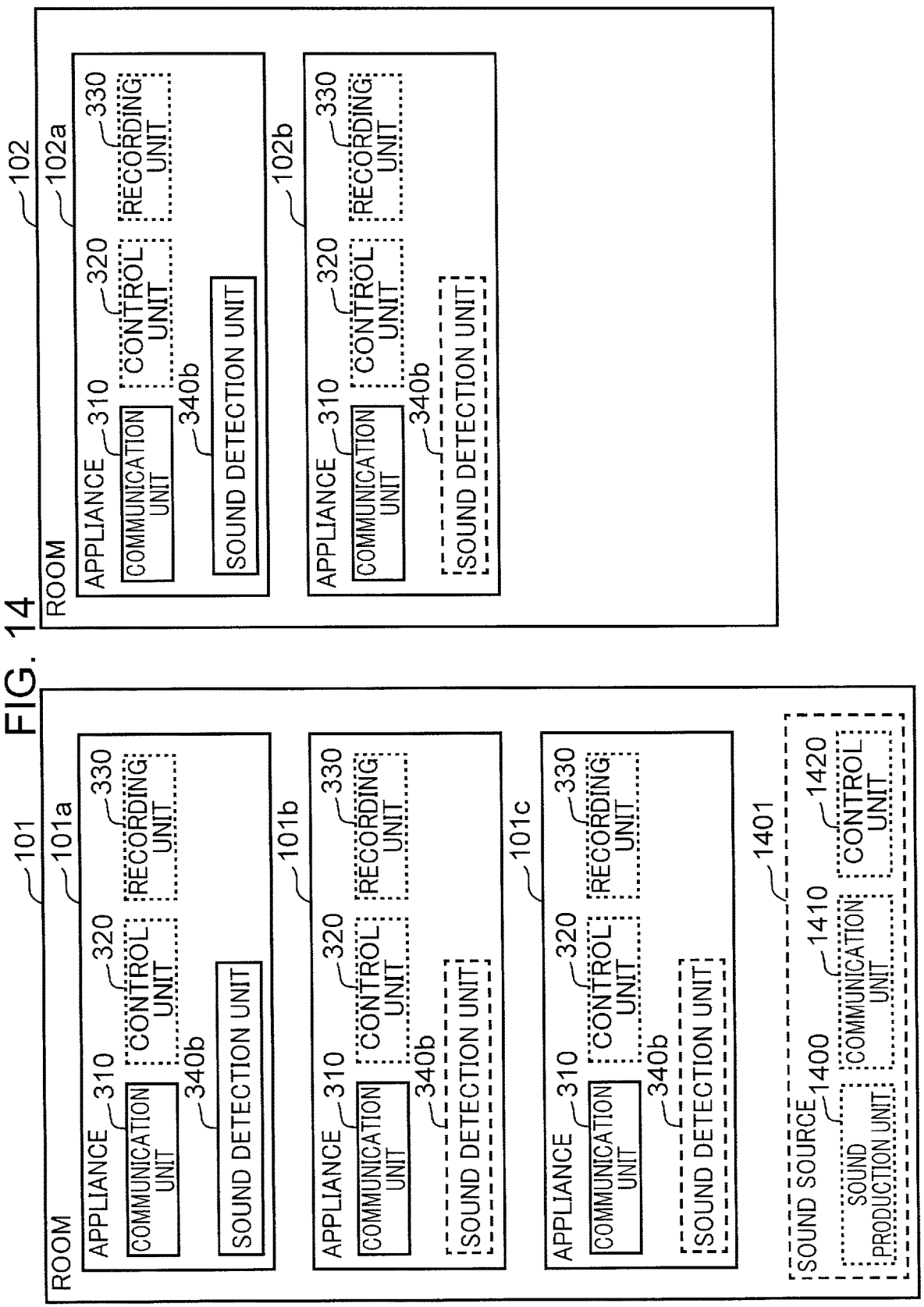
FIG. 14 is a diagram showing the configuration of the information providing system a case where the control unit of the cloud server comprises a room position detection unit.

FIG. 14 is a diagram showing the configuration of the information providing system a case where the control unit 321 of the cloud server 104 comprises a room position detection unit 2002. As shown in FIG. 14, desirably, at least one appliance in each room comprises the communication unit 310 and the sound detection unit 340b. For example, the appliance 101a in the room 101 and the appliance 102a in the room 102 may both comprise the sound detection unit 340b. In the foregoing case, the other appliances 101b, 101c, 102b are not required to include the sound detection unit 340b. Since sound is conveyed beyond the room, so as long as the appliance 101a in the room 101 and the appliance 102a in the room 102 both comprise the sound detection unit 340b, it is possible to know the positional relationship of the room 101 and the room 102. The sound detection unit 340b is configured, for example, from a microphone using a coil, a capacitor or a piezoelectric material.

Moreover, as shown in FIG. 14, desirably, a sound source 1401 is disposed in at least one room of either the room 101 or the room 102. The sound source 1401 may also be disposed in a space outside the room 101 and the room 102. Moreover, the sound source 1401 comprises a sound production unit 1400 for generating sound. Moreover, the sound source 1401 may also comprise a communication unit 1410 and a control unit 1420, and may also be communicably connected to the cloud server 104 via the network 1000. As the sound source 1401, any device comprising a function for generating sound may be used, and, for example, a speaker or a buzzer may be used.

Figure 15:
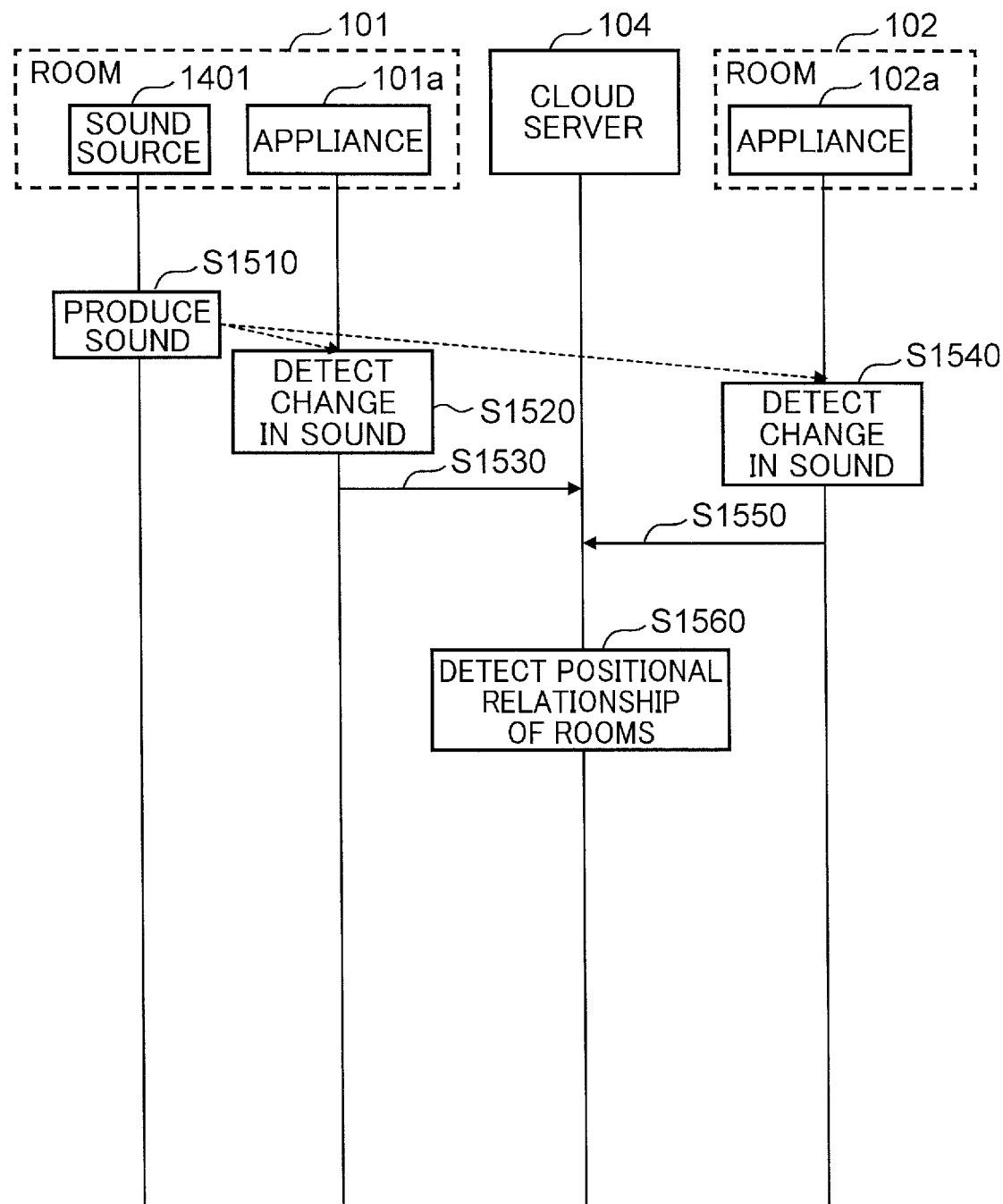
FIG. 15 is a sequence diagram showing the operation of the information providing system for detecting the positional relationship of the respective rooms.

The room position detection unit 2002 is now described in detail. FIG. 15 is a sequence diagram showing the operation of the information providing system for detecting the positional relationship of the respective rooms.

Foremost, in step S1510, the sound production unit 1400 of the sound source 1401 generates sound. The method of the sound production unit 1400 generating sound may be of any method. Moreover, there is no particular limitation in the timing of the sound production unit 1400 generating sound. For example, the communication unit 1410 of the sound source 1401 may receive an instruction for generating sound from the cloud server 104, and the sound production unit 1400 may thereby generate sound according to the instruction from the cloud server 104.

Subsequently, in step S1520, the sound detection unit 340b of the appliance 101a detects the change in sound. The processing of the sound detection unit 340b detecting the change in sound is the same as the processing in step S1110 of FIG. 11.

Subsequently, in step S1530, the communication unit 310 of the appliance 101a sends to the cloud server 104 the time information indicating the time that the change in sound has been detected.

Subsequently, in step S1540, the sound detection unit 340b of the appliance 102a detects the change in sound. The processing of the sound detection unit 340b detecting the change in sound is the same as the processing in step S1110 of FIG. 11.

Subsequently, in step S1550, the communication unit 310 of the appliance 102a sends to the cloud server 104 the time information indicating the time that the change in sound has been detected.

Here, the timing that the appliance 101a detects the change in sound in step S1520 and the timing that the appliance 102a detects the change in sound in step S1540 are different. In other words, when the sound source 1401 is disposed in the room 101, the appliance 101a will detect the change in sound faster than the appliance 102a.

Here, the processing of step S1530 may also be performed after the processing of step S1540.

Subsequently, in step S1560, the room position detection unit 2002 of the cloud server 104 detects the position between the rooms based on the time information sent from the respective appliances.

FIG. 16 is a diagram showing an example of the time information that is sent to the cloud server 104. In the example shown in FIG. 16, the sound detection unit 340b of the appliance 101a detected the change in sound at 07:15:32:40, and the light intensity detection unit 340a of the appliance 102a detected the change in sound at 07:15:32:52.

The room position detection unit 2002 of the cloud server 104 detects the positional relationship of the room 101 and the room 102 based on the time information shown in FIG. 16. In other words, in the foregoing case, since the appliance 101a detected the sound faster than the appliance 102a, it can be calculated that the room 101 where the appliance 101a exists is the same room as where the sound source 1401 exists, and the room 102 where the appliance 102a exists is different from the room where the sound source 1401 exists. The method of the room position detection unit 2002 of the cloud server 104 calculating the position between the rooms is not limited to the foregoing method. For example, the communication unit 1410 of the sound source 1401 may send to the cloud server 104 the sound production time information indicating the sound production time that the sound source 1401 generated the sound, and the room position detection unit 2002 can more accurately calculate the position of the rooms by comparing the received sound production time information with the time information shown in FIG. 16.

Moreover, the room position detection unit 2002 can also calculate the distance between the sound source 1401 and the appliance 101a and the distance between the sound source 1401 and the appliance 102a based on the time that the sound was generated and the time that the change in sound has been detected.

It is thereby possible to clarify the positional relationship of the respective rooms even in a building in which the accuracy of the GPS (Global Positioning System) is low.

Moreover, the sound source 1401 desirably comprises a communication unit 1410 and a control unit 1420. It is thereby possible to identify the appliances existing in the same room at an arbitrary timing via the network 1000.

Moreover, it is also possible to identify whether the respective appliances exist in the same room or different rooms based on the loudness of the sound detected by the respective appliances.

Moreover, the respective appliances desirably comprise timers that are mutually in sync. Since the time that the sound has been detected can be accurately compared, it is thereby possible to assess the positional relationship of the respective rooms more accurately.

Moreover, a plurality of sound sources are desirably installed at mutually different locations within the home (building). Note that the plurality of sound sources are desirably connected to the network 1000. Since the distance from the respective sound sources to the respective appliances can be known, it is thereby assess the positional relationship of the respective appliances (respective rooms) in the home more accurately.

Moreover, the plurality of sound source are desirably disposed at locations of mutually different heights. It is thereby possible to assess the height (which floor the room is on) of the respective appliances (respective rooms) in the home, and also assess the height (floor) of the respective rooms in the home.

Moreover, the plurality of sound sources of different heights are desirably installed in the same appliance. It is thereby possible to assess the height of the respective appliances (respective rooms) more accurately.

Moreover, more desirably, the plurality of sound sources of different heights are positioned closely in the horizontal direction. In order to cause the positions in the horizontal direction to coincide as much as possible, the plurality of sound sources are desirably installed in one appliance in an integrated manner. Moreover, the appliance comprising the plurality of sound sources of different heights is desirably an appliance in which the installation surface is designated so that it is installed in a predetermined direction (vertical direction). It is thereby possible to assess the height of the respective appliances (respective rooms) even more accurately.

Moreover, the appliance comprising the plurality of sound sources of different heights desirably comprises a notification unit for detecting that the designated installation surface is not in contact with the floor and notifying a warning or the like to the user. It is thereby possible to assess the height of the respective appliances more accurately.

Moreover, the information providing system desirably comprises a mobile sound source that moves within the home (building). As a result of the sound source moving from room to room in the home (building) and generating sound, the positional relationship of a plurality of rooms can be more accurately assess with a single sound source.

Moreover, the mobile sound source desirably acquires information relating to its current position based on the sound generated from a sound source having a fixed installation location within the home or based on its own movement history. It is thereby possible to assess the position of the respective appliances (respective rooms) more accurately.

Moreover, the mobile sound source desirably comprises a laser light source for assessing the shape of the rooms in the home. It is thereby possible to assess the position of the appliances in the home in a shorter period of time.

Moreover, the information providing system may comprise a mobile light source or a mobile microwave source in substitute for the mobile sound source. In the foregoing case, as with the mobile sound source described above, the light intensity detection unit or the microwave detection unit of the respective appliances can assess the positional relationship of the respective rooms by detecting the light or microwaves that are output from the mobile light source or the microwave source.

However, when there is an area in the home where the entry of the mobile sound source or the mobile microwave source is prohibited, the information providing system desirably comprises the mobile sound source or the mobile microwave source since the position of appliances that are installed in such areas where entry is prohibited can also be assessed.

Moreover, appliances existing in the same room can be assessed more accurately with the mobile light source.

Moreover, in a multi-level home (building), desirably, at least one sound source is installed on each floor. It is thereby possible to assess the position of the respective appliances more accurately.

Moreover, the appliances disposed in different rooms may also comprise a microwave detection unit for detecting microwaves in substitute for the sound detection unit 340b.

Similar to the case of using sound, since the distance from the microwave source to the respective appliances can be known, it is possible to assess the positional relationship of the respective appliances (respective rooms) in the home.

Nevertheless, in comparison to sound, with microwaves, it is more difficult to measure the distance from the source to the respective appliances. Thus, it is more desirable to adopt the position detection method using sound, and the positional relationship of the rooms can be assessed with greater accuracy.

Note that since microwaves are conveyed beyond a soundproof wall, for example, microwaves are suitable for detecting the position of appliances installed in a soundproof room.

Moreover, it is more desirable to detect the positional relationship of the rooms by using both microwaves and sound. By synchronizing the timers in the respective appliances based on the timing that the microwaves emitted from the microwave source are received by the appliances in the respective rooms, the time that the respective appliances have detected the change in sound can be compared more accurately. In other words, the positional relationship of the respective appliances (respective rooms) can be assessed with greater accuracy.

(Appliance Position Detection Unit 2003)

The appliance position detection unit 2003 for detecting the positional relationship of the respective appliances in the respective rooms is now explained. By assessing the position of the respective appliances in the respective rooms in addition to assessing the appliance group that is installed in the same room and assessing the positional relationship of the respective rooms in the home, the appliances can be controlled in greater detail. Note that, in the ensuing explanation, an example of detecting the position of a plurality of appliances in the room 101 is explained.

The appliance position detection unit 2003 includes an appliance position detection unit 2003a and an appliance position detection unit 2003b.

Here, several methods (appliance position detection unit 2003a and appliance position detection unit 2003b) for detecting the position of appliances in the same room are explained.

(Appliance Position Detection Unit 2003a)

Figure 17:
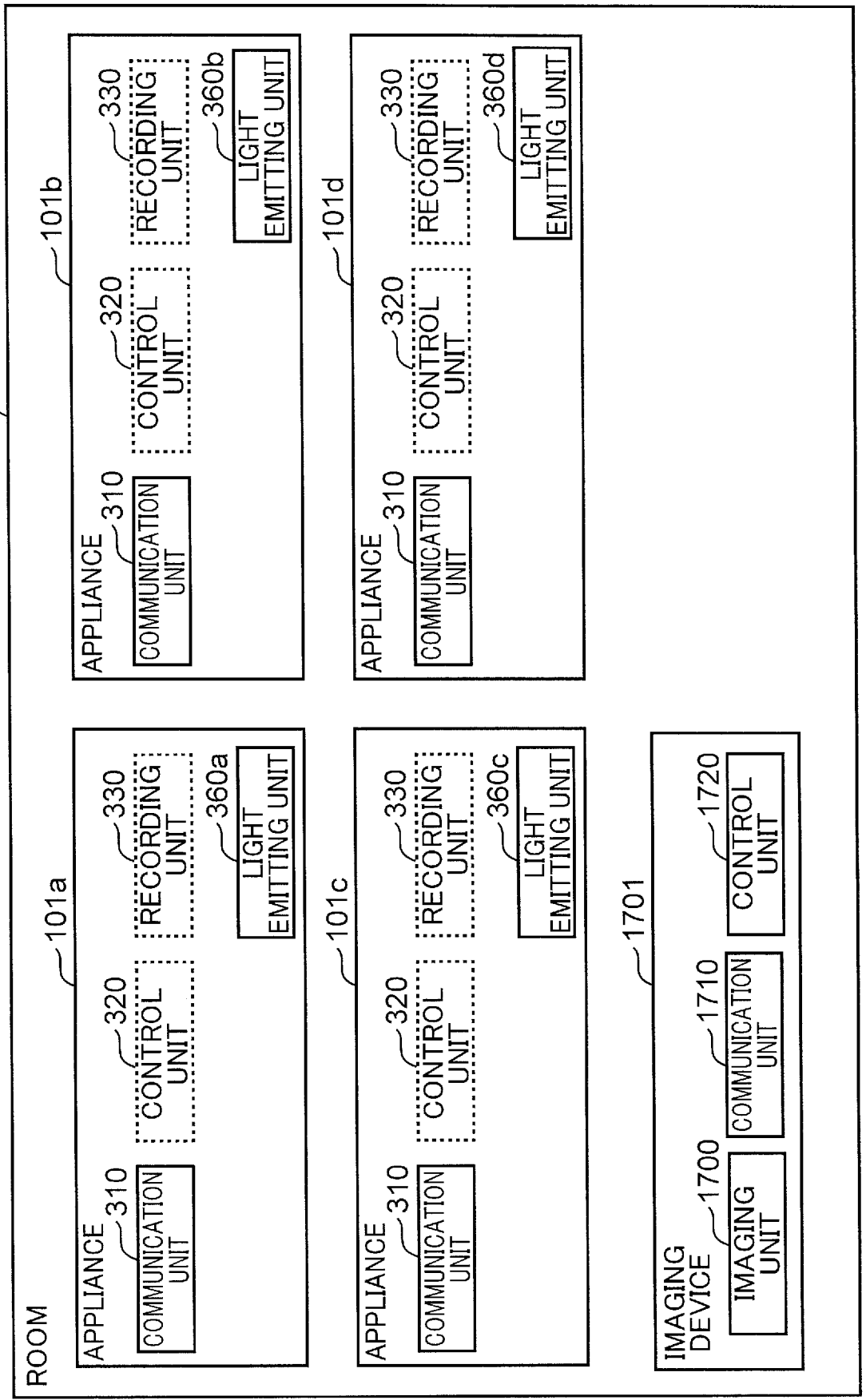
FIG. 17 is a diagram showing the configuration of the information providing system in a case where the control unit of the cloud server comprises the appliance position detection unit.

FIG. 17 is a diagram showing the configuration of the information providing system in a case where the control unit 321 of the cloud server 104 comprises the appliance position detection unit 2003a. FIG. 17 shows an example where the appliance 101a, the appliance 101b, the appliance 101c, the appliance 101d and an imaging device 1701 are installed in the room 101.

The appliance 101a in the room 101 desirably comprises a communication unit 310 and a light emitting unit 360a, the appliance 101b desirably comprises a communication unit 310 and a light emitting unit 360b, the appliance 101c desirably comprises a communication unit 310 and a light emitting unit 360c, and the appliance 101d desirably comprises a communication unit 310 and a light emitting unit 360d.

The light emitting unit 360a, the light emitting unit 360b, the light emitting unit 360c and the light emitting unit 360d emit light. Note that the light emitting unit 360a, the light emitting unit 360b, the light emitting unit 360c and the light emitting unit 360d may be configured, for example, from an LED or an OLED. Here, for the sake of explanation, the respective light emitting units are given the reference numerals 360a, 360b, 360c and 360d, but the respective appliances may also comprise the same light emitting unit.

Moreover, the imaging device 1701 is installed in the room 101. The imaging device 1701 desirably comprises an imaging unit 1700, a communication unit 1710 and a control unit 1720. The imaging device 1701 can thereby be connected to the cloud server 104 via the network 1000. There is no particular limitation in the method of connecting the imaging device 1701 to the cloud server 104, and, for example, wireless communication (Bluetooth (registered trademark) or wireless LAN) or the like may be used.

The imaging unit 1700 is configured, for example, from an image sensor comprising an imaging element such as a CMOS (Complementary Metal-Oxide Semiconductor) or a CCD (Charge Coupled Device) and an optical element. Moreover, the imaging device 1701 is desirably installed at a position where most of the room 101 can be observed (imaged) such as at the corner or ceiling of the room.

According to this configuration, the light emitting units 360a, 360b, 360c, 360d of the respective appliances 101a, 101b, 101c, 101d are caused to blink, and light from the light emitting units 360a, 360b, 360c, 360d is detected by the imaging device 1701. It is thereby possible to identify the respective appliances 101a, 101b, 101c, 101d as appliances existing in the same room as the imaging device 1701, and assess the positional relationship between the respective appliances 101a, 101b, 101c, 101d and the imaging device 1701. Moreover, when the plurality of appliances 101a, 101b, 101c, 101d comprise the communication unit 310, the positional relationship of the respective appliances can also be assessed.

Figure 18:
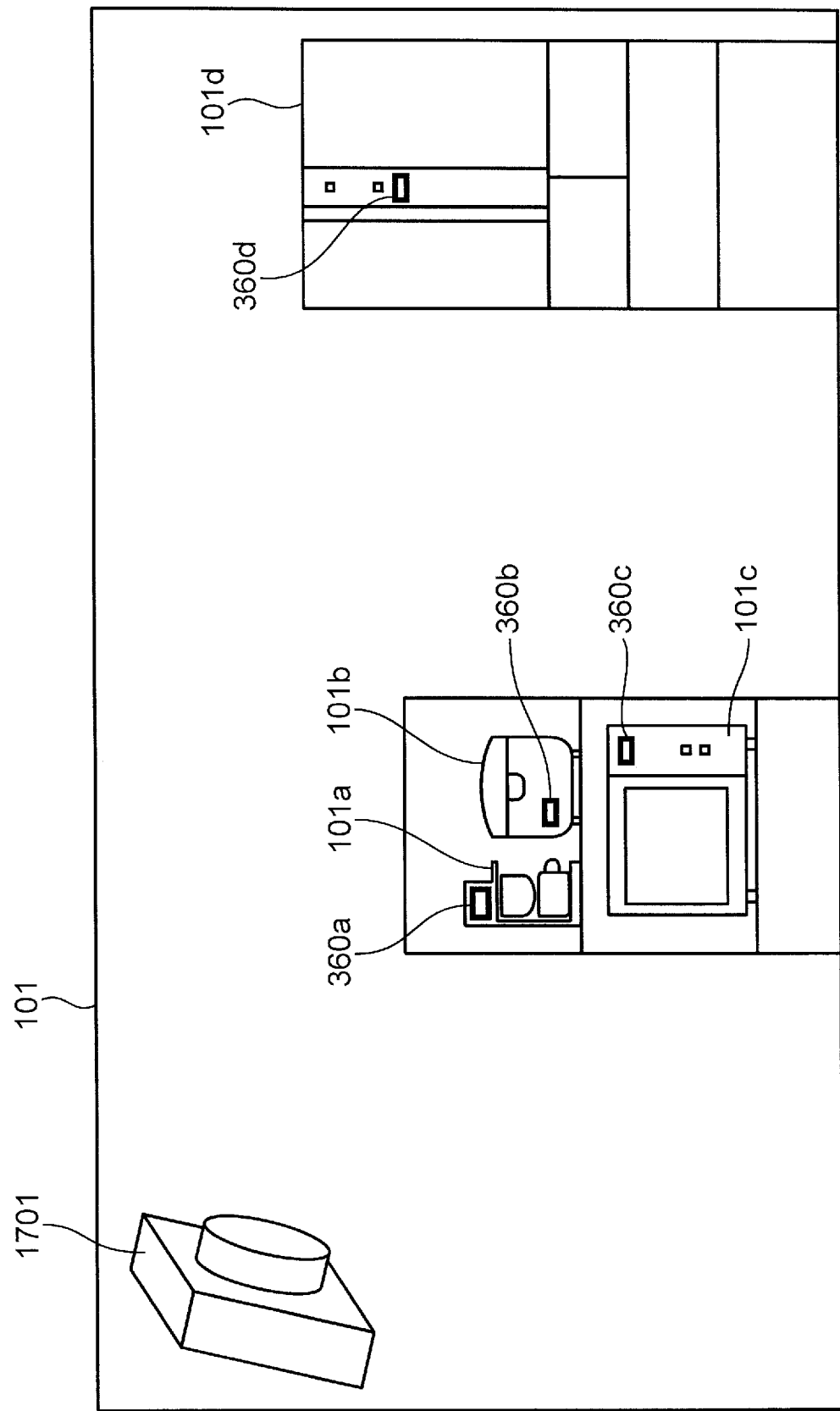
FIG. 18 is a diagram showing an example of the room including the imaging device.

FIG. 18 is a diagram showing an example of the room 101 including the imaging device 1701. Installed in the room 101 is the imaging device 1701 comprising the communication unit 1710. The imaging device 1701 images the respective appliances 101a, 101b, 101c, 101d installed in the room 101. Here, for example, a coffee maker as the appliance 101a, a rice cooker as the appliance 101b, a microwave oven as the appliance 101c, and a refrigerator as the appliance 101d are installed within the imaging area of the imaging device 1701. Each of the appliances 101a, 101b, 101c, 101d comprises at least one of the light emitting units 360a, 360b, 360c, 360d. The respective appliances 101a, 101b, 101c, 101d and the imaging device 1701 installed in the room 101 are respectively connected to the cloud server 104 via the network 1000 through the communication units 310 and 1710.

The method of detecting the location of appliances with the appliance position detection unit 2003a is now explained with reference to FIG. 19.

Figure 19:
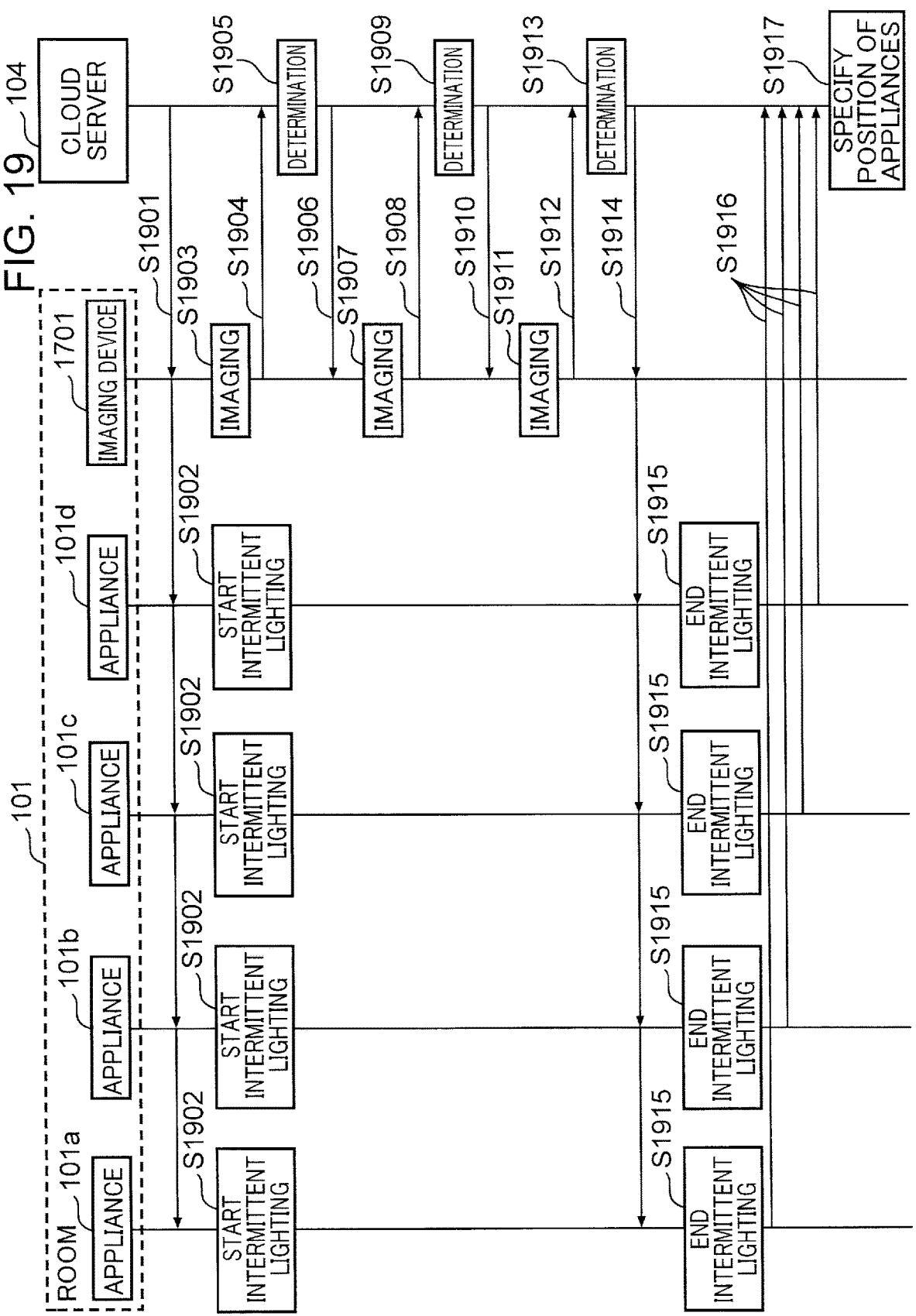
FIG. 19 is a sequence diagram showing the operation of the information providing system for detecting the positional relationship of a plurality of appliances in the same room.

FIG. 19 is a sequence diagram showing the operation of the information providing system for detecting the positional relationship of a plurality of appliances in the same room.

Foremost, in step S1901, the communication unit 311 of the cloud server 104 sends to the respective appliances 101a to 101d and the imaging device 1701, a position detection start signal for starting the position detection mode of detecting the positional relationship of the plurality of appliances in the same room. The position detection start signal may be sent at the timing designated by the user, or at a predetermined timing.

Subsequently, in step S1902, the appliance 101a, the appliance 101b, the appliance 101c and the appliance 101d that received the position detection start signal start the intermittent lighting of the light emitting units 360a to 360d based on an intermittent pattern that is preset for each appliance. Here, the intermittent pattern is desirably a pattern that is different for each appliance. Thus, the intermittent pattern does not need to be preset for appliance, and the cloud server 104 may send a command the respective appliances for engaging in intermittent lighting each in a different intermittent pattern.

FIG. 20 is a diagram showing an example of the intermittent pattern of causing the light emitting unit to emit light intermittently, and FIG. 21 is a diagram showing another example of the intermittent pattern of causing the light emitting unit to emit light intermittently.

Here, to light the light source at an intermittent pattern is, for example, as shown in FIG. 20, to temporally change the light output upon lighting the light sources (blinking drive). Moreover, as a different intermittent pattern for each appliance, for example, (1) the cycle of ON and OFF of the light source of each appliance may differ, or (2) the ratio of the ON time and OFF time of the light source for each appliance may differ. Moreover, as shown in FIG. 21, it is desirable to use an intermittent pattern in which the ratio of the ON time and OFF time at a plurality of cycles is not constant. It is thereby possible to identify the position of the respective appliances more accurately.

Subsequently, in step S1903, the imaging unit 1700 of the imaging device 1701 that received the position detection start signal starts imaging an image in the room 101. The imaging of the image is preferably a method of imaging a plurality of images periodically or successively. Moreover, the cloud server 104 may also designate the time of imaging the images and the number of images to be imaged. FIG. 19 shows an example of periodically imaging the images at given time intervals.

Note that the timing of step S1903 and step S1902 may be immediately after the cloud server 104 sends a signal to the respective appliances in step S1901, or the timing that is set by the respective appliances. Moreover, the cloud server 104 may also instruct the timing of starting the intermittent lighting in step S1930 in the timing of starting the imaging in step S1920 to the respective appliance.

Subsequently, in step S1904, the communication unit 1710 of the imaging device 1701 sends the images that were imaged in step S1903 to the cloud server 104. While not shown, the main memory 331 of the cloud server 104 successively stores the sent images.

Subsequently, in step S1905, the appliance position detection unit 2003a of the cloud server 104 determines whether the position of the respective appliances can be detected.

Subsequently, when it is determined in step S1905 that the position of the respective appliances cannot be detected, in step S1906, the communication unit 311 of the cloud server 104 send a command to the imaging device 1701 for performing imaging once again.

Then, the series of processing of steps S1903 to S1906 are repeated until the cloud server 104 can detect the position of the respective appliances (steps S1907 to S1913).

Note that the position of appliances can also be detected according to a method other than the processing of repeating the series of processing described above. For example, the imaging device 1701 may also collectively send a plurality of images to the cloud server 104 after a plurality of images are imaged continuously for a given period of time.

When it is determined in step S1913 that the location of the respective appliances can be detected, in step S1914, the communication unit 311 of the cloud server 104 sends a command to the appliance 101a, the appliance 101b, the appliance 101c, the appliance 101d and the imaging device 1701 for ending the position detection mode and ending the intermittent lighting.

In step S1915, the light emitting units 360a to 360d of the appliance 101a, the appliance 101b, the appliance 101c and the appliance 101d respectively end the intermittent lighting.

Subsequently, in step S1916, the communication unit 310 of the appliance 101a, the appliance 101b, the appliance 101c and the appliance 101d sends to the cloud server 104 identifying information such as the model number and the serial number for identifying the respective appliances, and information relating to the intermittent pattern that was being executed by the respective appliances. Note that, when the cloud server 104 had sent in advance a command for intermittent lighting each based on a different intermittent pattern to the respective appliances 101a to 101d, the processing of step S1916 is omitted.

Finally, in step S1917, the appliance position detection unit 2003a of the cloud server 104 compares the identifying information and information relating to the intermittent pattern sent from the respective appliances with the plurality of images sent from the imaging device 1701, and specifies the position of the respective appliances by calculating the position corresponding to the pixels in which the time change is as per the intermittent pattern. Here, in step S1917, the appliance position detection unit 2003a of the cloud server 104 may also calculate the position corresponding to the pixels that are subject to the time change by performing simple image processing to the respective images.

Moreover, in FIG. 18, while the imaging device 1701 is installed independently in the room 101, a lighting apparatus may be mounted thereon. Moreover, the imaging device 1701 may also comprise a light emitting unit. Since the appliance in which the position thereof cannot be assessed by the imaging device 1701 will become evident to the user, the user can move that application to a position where the position of that appliance can be assessed by the imaging device 1701. In other words, since an appliance to which the light emitted from the lighting apparatus does not reach the light emitting unit; that is, an appliance in which the light emitting unit is overshadowed can be assessed by the user, the position of that appliance can be assessed by moving that appliance to a position where the light emitted from the lighting apparatus will reach the light emitting unit. It is thereby possible to assess more appliances existing in the same room.

Moreover, the imaging device 1701 may also comprise a function of detecting fire and notifying a fire to the user. It is thereby possible to notify the indication of fire to the user sooner than a heat sensor-type or smoke sensor-type fire alarm. Thus, the imaging device 1701 may detect infrared rays, particularly far infrared rays exceeding 6 μm, and when the amount of detected far infrared rays exceeds a predetermined threshold, detect that a fire has occurred in the room where it is installed, and thereby notify the user.

Moreover, a plurality of imaging devices 1701 may also be installed at different positions in the same room. It is thereby possible assess the position of the respective appliances in the room more accurately and three-dimensionally.

Moreover, when a plurality of imaging devices 1701 are installed as described above, it is desirable that the plurality of imaging devices 1701 assess their mutual positional relationship. Thus, desirably, another imaging device is installed within the imaging area of at least one imaging device. It is thereby possible to assess the position of the respective appliances more accurately. Moreover, the method of assessing the position with the intermittent pattern of the light source can also be used for the imaging devices to assess their mutual positional relationship.

Moreover, the imaging device 1701 may comprise a depth position information acquisition unit for acquiring position information in the depth direction in order to assess position information in the depth direction with a single imaging device. As the depth position information acquisition unit, for example, used may be a monocular 3D camera that changes the focusing position by changing the position of the lens or the imaging element, or a binocular 3D camera that determines the depth from a plurality of images from different imaging positions.

Moreover, while the foregoing explanation described a method of assessing the position of the respective appliances by causing the light emitting units 360a to 360d to blink based on an intermittent pattern that is different for each appliance, for example, the respective appliances may also comprise a light emitting element that emits light of a wavelength that is different for each appliance, and the method of identifying the respective appliances based on the wavelength of the light of the light emitting unit may also be adopted.

In the foregoing case, the respective appliances cause the light emitting units, which have a different wavelength for each appliance, to be lit (or blink) during the position detection mode, and the imaging device 1701 acquires the information relating to the position of the respective light emitting units and the wavelength of the respective light emitting units with an imaging element comprising a wavelength separating unit such as a color filter or a diffraction grating. The appliance position detection unit 2003a calculates the relationship of the identifying the information of the respective appliances and the position of the respective appliances based on a database stored in the cloud server 104 which indicates the relationship of the identifying informa-tion for identifying the respective appliances and the wavelength of the light emitting unit of the respective appliances.

The method of using a different intermittent pattern for each appliance is desirable since it is less inexpensive, but the method of using a different wavelength for each appliance is desirable since the frame rate of the imaging unit 1700 can be lowered and a low power drive is enabled.

Moreover, the respective appliances may also comprise a display, and the display equipped in the respective appliances may display identifying information (mark such as a two-dimensional bar code or image) for identifying the respective appliances, and the appliance position detection unit 2003a may assess the position of the respective appliances from the identifying information included in the image that was imaged by the imaging device.

The method of using a different intermittent pattern for each appliance is desirable since it is less inexpensive, but the method of using a display for displaying identifying information is desirable since the frame rate of the imaging unit 1700 can be lowered and a low power drive is enabled even more than the method of using a different wavelength for each appliance.

Moreover, the method of using a different wavelength for each appliance is desirable since the respective appliances can be identifies more accurately than the method of using a display for displaying identifying information.

Moreover, it goes without saying that, in substitute for the display, the respective appliances may also comprise a plurality of light sources that are arranged in an array.

Moreover, the light emitted from the light emitting units 360a to 360d and the light measured by the imaging device 1701 may be visible light. As described later, this will enable the reduction in cost when the imaging unit 1700 is used to assess the location of a user in the home and to identify the user.

Moreover, the light emitted from the light emitting units 360a to 360d and the light measured by the imaging device 1701 may be near infrared light. It is thereby possible to assess the position of the respective appliances without causing any discomfort to the user in circumstances when it is undesirable to generate visible light such as when the user is sleeping in the room.

(Appliance Position Detection Unit 2003b)

Figure 22:
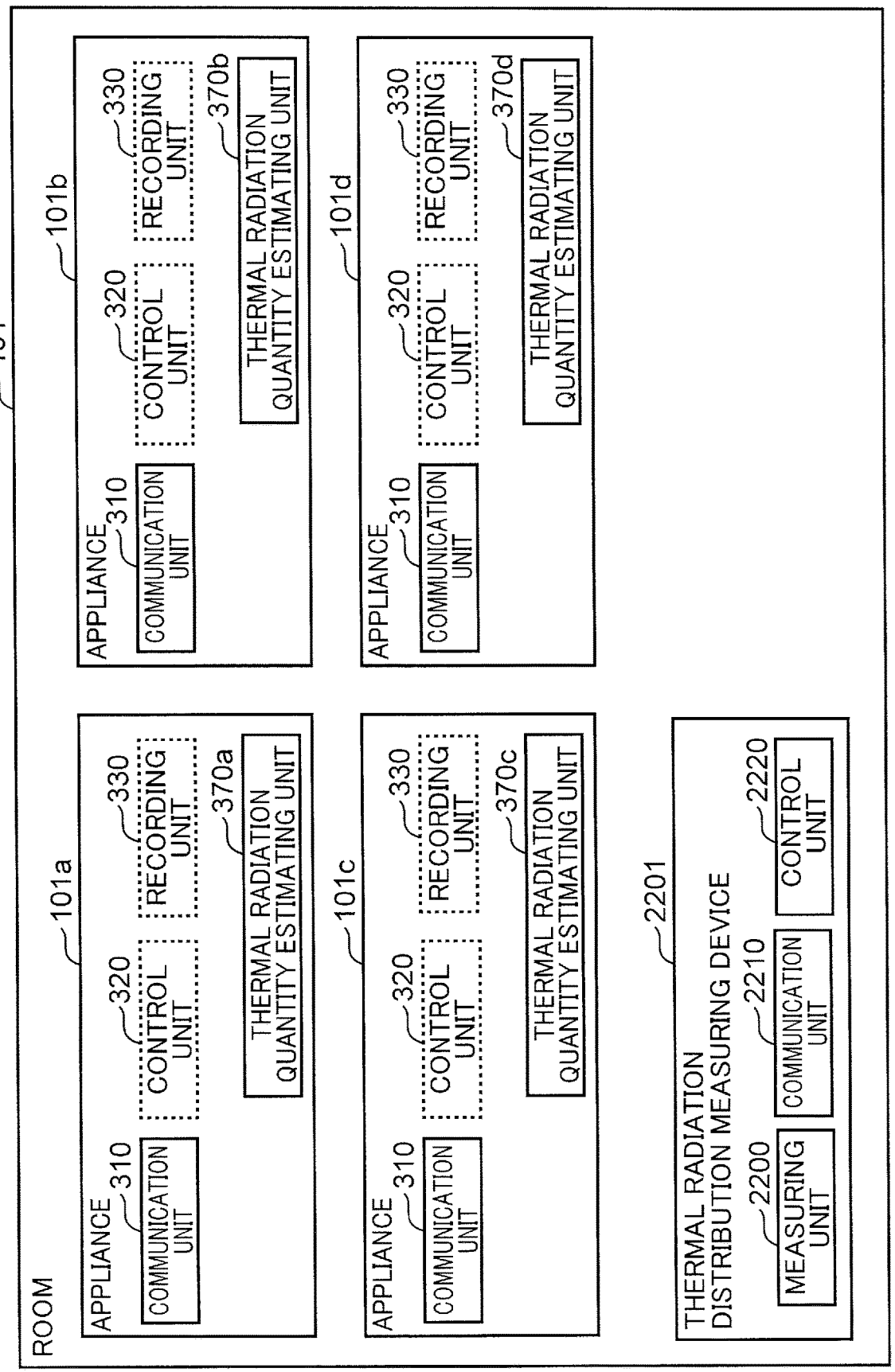
FIG. 22 is a diagram showing the configuration of the information providing system in a case where the control unit of the cloud server comprises the appliance position detection unit.

FIG. 22 is a diagram showing the configuration of the information providing system in a case where the control unit 321 of the cloud server 104 comprises the appliance position detection unit 2003b. FIG. 22 shows an example where the appliance 101a, the appliance 101b, the appliance 101c, the appliance 101d and the thermal radiation distribution measuring device 2201 are disposed in the room 101.

The appliance 101a in the room 101 desirably comprises a communication unit 310 and a thermal radiation quantity estimating unit 370a, the appliance 101b desirably comprises a communication unit 310 and a thermal radiation quantity estimating unit 370b, the appliance 101c desirably comprises a communication unit 310 and a thermal radiation quantity estimating unit 370c, and the appliance 101d desirably comprises a communication unit 310 and a thermal radiation quantity estimating unit 370d.

The thermal radiation quantity estimating unit 370a, the thermal radiation quantity estimating unit 370b, the thermal radiation quantity estimating unit 370c and the thermal radiation quantity estimating unit 370d estimate the thermal radiation quantity that is emitted from the appliances. The thermal radiation quantity estimating unit 370a, the thermal radiation quantity estimating unit 370b, the thermal radiation quantity estimating unit 370c and the thermal radiation quantity estimating unit 370d may be of any configuration so as long as they can estimate the thermal radiation quantity that is emitted from the appliances. The thermal radiation quantity estimating unit 370a, the thermal radiation quantity estimating unit 370b, the thermal radiation quantity estimating unit 370c and the thermal radiation quantity estimating unit 370d are configured, for example, from a temperature measuring unit such as a thermistor or a thermocouple. The thermal radiation quantity estimating unit 370a, the thermal radiation quantity estimating unit 370b, the thermal radiation quantity estimating unit 370c and the thermal radiation quantity estimating unit 370d can thereby calculate the thermal radiation quantity emitted from the respective appliances from the temperature of the respective appliances.

The communication unit 310 of the respective appliances 101a to 101d is connected to the cloud server 104 via the network 1000. For example, communication between the respective appliances 101a to 101d and the cloud server 104 is conducted, for example, based on wireless communication such as Bluetooth (registered trademark) or wireless LAN.

Here, for the sake of explanation, the thermal radiation quantity estimating units are given the reference numerals 370a, 370b, 370c and 370d, but the respective appliances may also comprise the same thermal radiation quantity estimating unit.

Moreover, the thermal radiation distribution measuring device 2201 is installed in the room 101. The thermal radiation distribution measuring device 2201 desirably comprises a measuring unit 2200 for measuring the thermal radiation distribution, a communication unit 2210 and a control unit 2220. The thermal radiation distribution measuring device 2201 can thereby be connected to the cloud server 104 via the network 1000. There is no particular limitation in the method of connecting the thermal radiation distribution measuring device 2201 to the cloud server 104, and, for example, wireless communication (Bluetooth (registered trademark) or wireless LAN) or the like may be used.

Moreover, the thermal radiation distribution measuring device 2201 is desirably installed at a position where most of the room 101 can be observed such as at the corner or ceiling of the room.

The thermal radiation distribution measuring device 2201 is configured, for example, from an infrared camera comprising an infrared sensor array configured from a pyro, a thermopile or a bolometer, and a lens optical system configured from germanium or chalcogenide.

According to the foregoing configuration, it is possible to identify that the respective appliances 101a, 101b, 101c, 101d and the thermal radiation distribution measuring device 2201 exist in the same room based on the information of the thermal radiation distribution in the room obtained from the thermal radiation distribution measuring device 2201, and further assess the positional relationship of the respective appliances 101a, 101b, 101c, 101d and the thermal radiation distribution measuring device 2201. Moreover, when the room includes a plurality of appliances, it is also possible to assess the positional relationship of the respective appliances.

Figure 23:
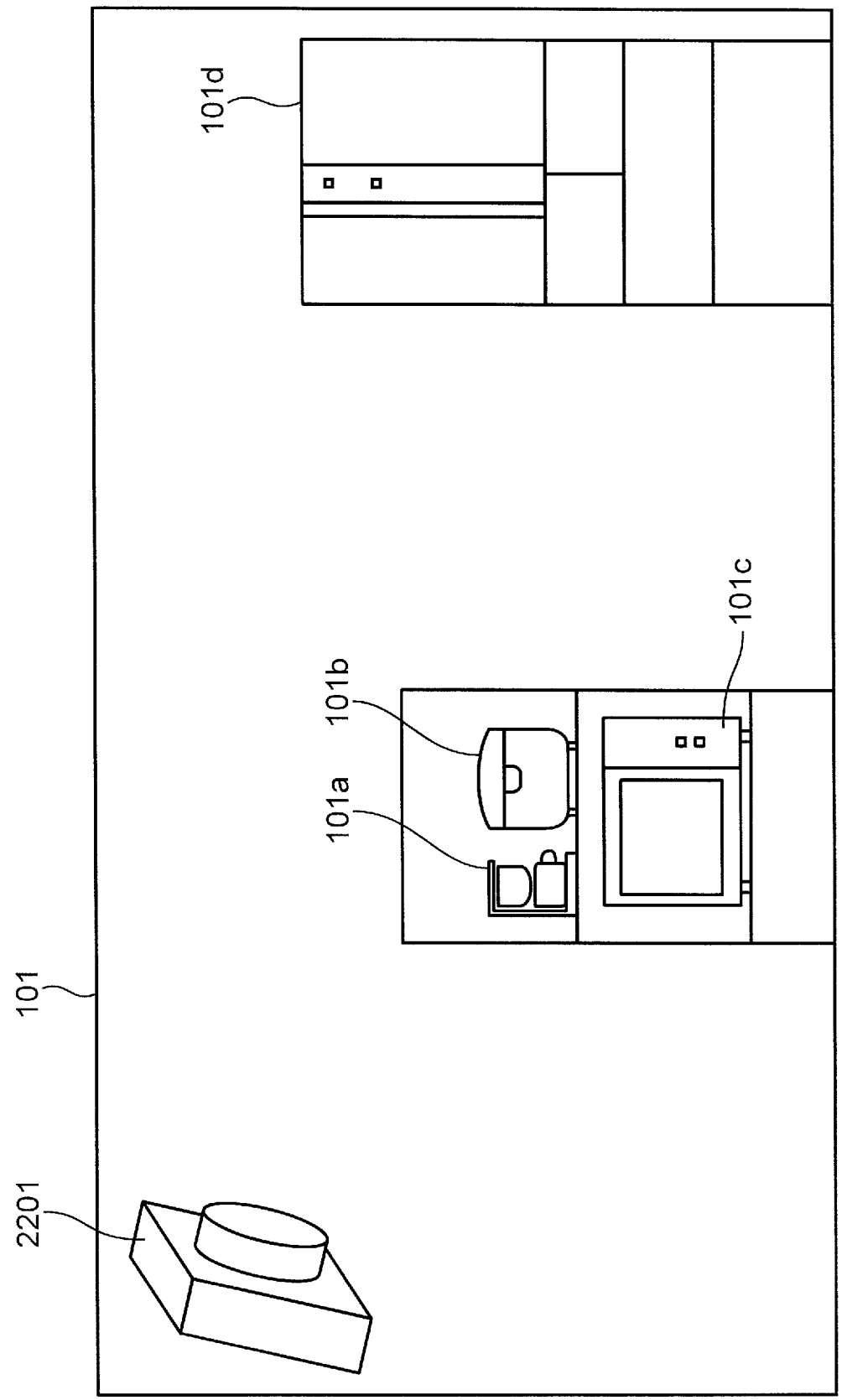
FIG. 23 is a diagram showing an example of the room including a thermal radiation distribution measuring device.

FIG. 23 is a diagram showing an example of the room 101 including a thermal radiation distribution measuring device 2201. The thermal radiation distribution measuring device 2201 is installed in the room 101. The thermal radiation distribution measuring device 2201 measures the thermal radiation distribution in the room 101 where the respective appliances 101a, 101b, 101c, 101d are installed. Moreover, here, for example, a coffee maker as the appliance 101a, a rice cooker as the appliance 101b, a microwave oven as the appliance 101c, and a refrigerator as the appliance 101d are installed within the measurement area of the thermal radiation distribution measuring device 2201. The respective appliances 101a to 101d and the imaging device 1701 installed in the room 101 are respectively connected to the cloud server 104 via the network 1000 through the communication units 310 and 2210.

The method of detecting the location of the appliances with the appliance position detection unit 2003b is now explained with reference to FIG. 24.

Figure 24:
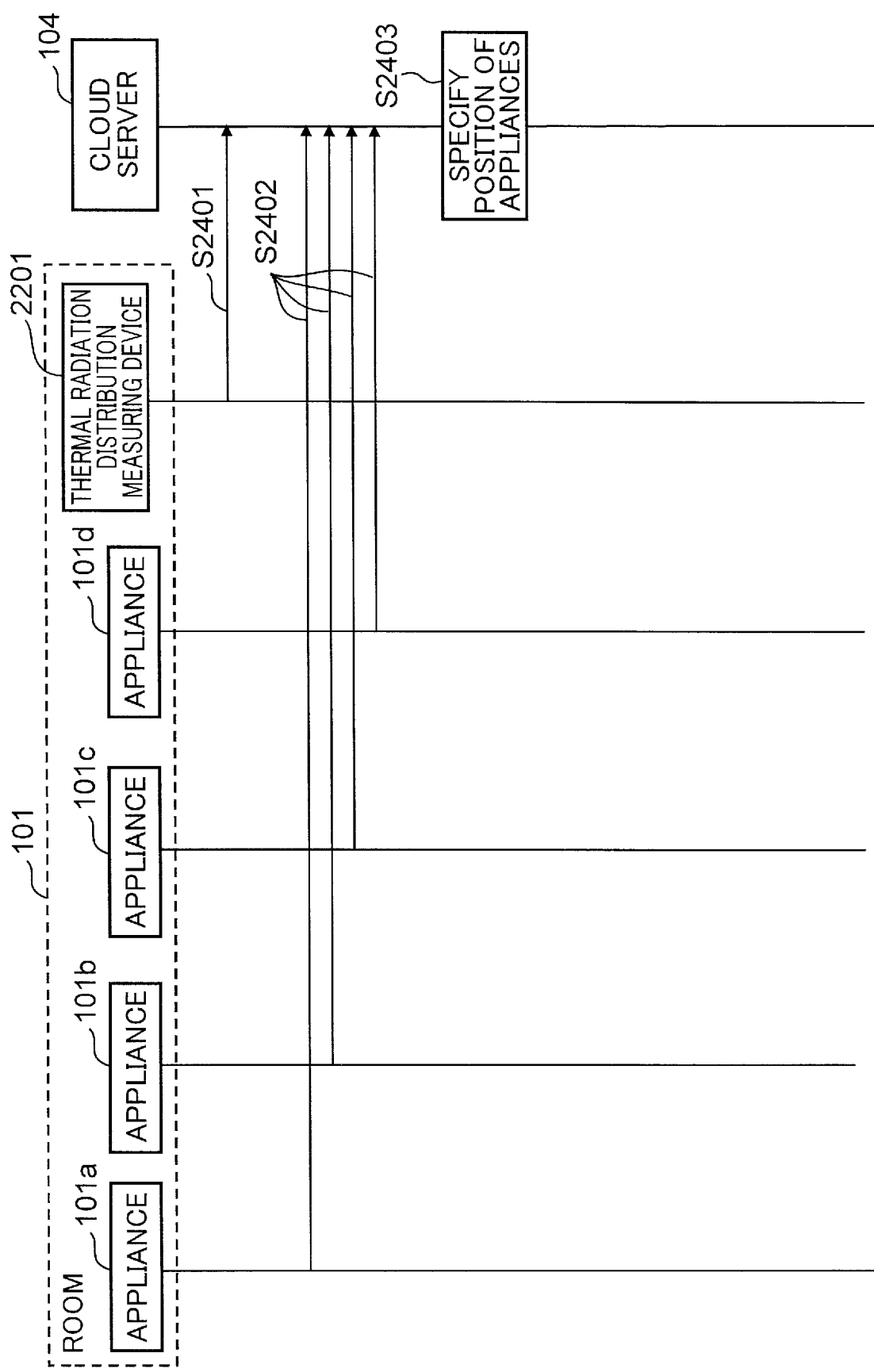
FIG. 24 is a sequence diagram showing the operation of the information providing system for detecting the positional relationship of a plurality of appliances in the same room.

FIG. 24 is a sequence diagram showing the operation of the information providing system for detecting the positional relationship of a plurality of appliances in the same room.

Foremost, in step S2401, the communication unit 2210 of the thermal radiation distribution measuring device 2201 periodically sends to the cloud server 104, via the network 1000, the thermal radiation quantity (thermal radiation quantity distribution) measured with the respective elements (respective pixels) of the infrared sensor array. While not shown, the main memory 331 of the cloud server 104 successively stores the sent thermal radiation quantity distribution.

Subsequently, in step S2402, the communication unit 310 of the respective appliances 101a to 101d periodically sends to the cloud server 104, via the network 1000, the identifying information for identifying the respective appliances 101a to 101d and the thermal radiation quantity estimated by the thermal radiation quantity estimating units 370a to 370d. While not shown, the main memory 331 of the cloud server 104 successively stores the sent identifying information for identifying the respective appliances 101a to 101d and the thermal radiation quantity of the respective appliances 101a to 101d.

Subsequently, in step S2403, the appliance position detection unit 2003b of the cloud server 104 compares the thermal radiation quantity of the respective pixels obtained from the thermal radiation distribution measuring unit 1301, and the data (time change history) of the periodical thermal radiation quantity obtained from the thermal radiation quantity estimating units 370a to 370d of the respective appliances 101a to 101d, and specifies the position (positional relationship) of the respective appliances 101a to 101d by calculating the strength of correlation.

Note that the appliance position detection unit 2003b may also detect the position of the respective appliances based on the same flow as the appliance position detection unit 2003a shown in FIG. 19.

Desirably, the appliance position detection unit 2003a can assess the position (positional relationship) of the respective appliances at an arbitrary timing. Moreover, the appliance position detection unit 2003b is desirable since it can assess, less expensively, the position (positional relationship) of appliances that are not equipped with a light source.

Moreover, in the position detection method of the respective appliances, upon calculating the thermal radiation quantity from the temperature obtained with the temperature measuring unit of the respective appliances, the thermal radiation quantity is desirably calculated upon giving consideration to the emissivity of the case of the respective appliances. It is thereby possible to clarify the position of the respective appliances more accurately.

Thus, for example, a database that associates the respective appliances and the emissivity of the case of the respective appliances is desirably stored in the main memory 331 of the cloud server 104 connected to the network 1000.

Moreover, the respective appliances may also calculate the thermal radiation quantity in consideration of the emissivity of their own case.

Moreover, as the thermal radiation quantity estimating units 370a to 370d of the respective appliances, the temperature measuring units equipped in the respective appliances are used in the foregoing explanation, but the thermal radiation quantity estimating units 370a to 370d may also estimate the thermal radiation quantity of the respective appliances based on the power that is input to the respective appliances (power consumption in the respective appliances).

For example, the thermal radiation quantity estimating units 370a to 370d measures the power that is input to the respective appliances from an outlet in the home, and the communication unit 310 sends the obtained input power to the cloud server 104 via the network 1000. The main memory 331 of the cloud server 104 successively stores the sent input power of the respective appliances. The appliance position detection unit 2003b can thereby calculate the amount of heat generation in the respective appliances. The appliance position detection unit 2003b may also estimate the temperature of the respective appliances and estimate the thermal radiation quantity of the respective appliances based on the calculated amount of heat generated in the respective appliances.

In the foregoing case, the appliance position detection unit 2003b desirably calculates the amount of heat generated in the respective appliances by giving consideration to the conversion efficiency of power into thermal energy among the power that is input to the respective appliances. It is thereby possible to assess the position of the respective appliances more accurately.

Thus, the cloud server 104 desirably initially registers the amount of energy that is converted into energy other than thermal energy for each appliance, or the respective appliances desirably comprise a function for measuring the amount of energy that is converted into energy other than thermal energy. For example, when the appliance is a TV, the energy of visible light that is emitted from the screen of the TV is stored (initially registered) in the database of the cloud server 104. Moreover, when the appliance is a radio, the energy of sound that is emitted from the speaker of the radio is stored (initially registered) in the database of the cloud server 104. Moreover, the respective appliances may also comprise, as needed, a function for measuring the amount of energy that is converted into energy other than the current thermal energy. It is thereby possible to calculate the amount of heat generation in the respective appliances.

Moreover, with an apparatus comprising a battery, the energy that is used for charging also becomes energy that is converted into energy other than thermal energy. Moreover, contrarily, of the energy obtained from the battery, energy that is converted into thermal energy will cause heat generation in the respective appliances other than from the input power from the outlet. Thus, an appliance comprising a battery desirably comprises a function for measuring the energy of charging/discharging. Based on similar reasons, an appliance comprising a power generation unit such as a solar cell desirably comprises a function for measuring the electric power generation.

Moreover, the temperature of the respective appliances can be calculated more accurately by giving consideration to the thermal resistance from the heat source in the respective appliances to the case, and the thermal resistance from the case to the indoor air.

The method of using the temperature measuring unit is desirable since the position of the respective appliances can be assessed more accurately. Moreover, the method of using the input power measuring unit is desirable since a temperature sensor is no longer required and the position of the respective appliances can be assessed less expensively.

Moreover, as a simpler method, the position of the respective appliances can be specified by comparing the timing of increase/decrease in the input power (power consumption) of the respective appliances and the timing of increase/decrease in the thermal radiation quantity measured with the respective pixels of the thermal radiation distribution measuring unit 1301.

Figure 25:
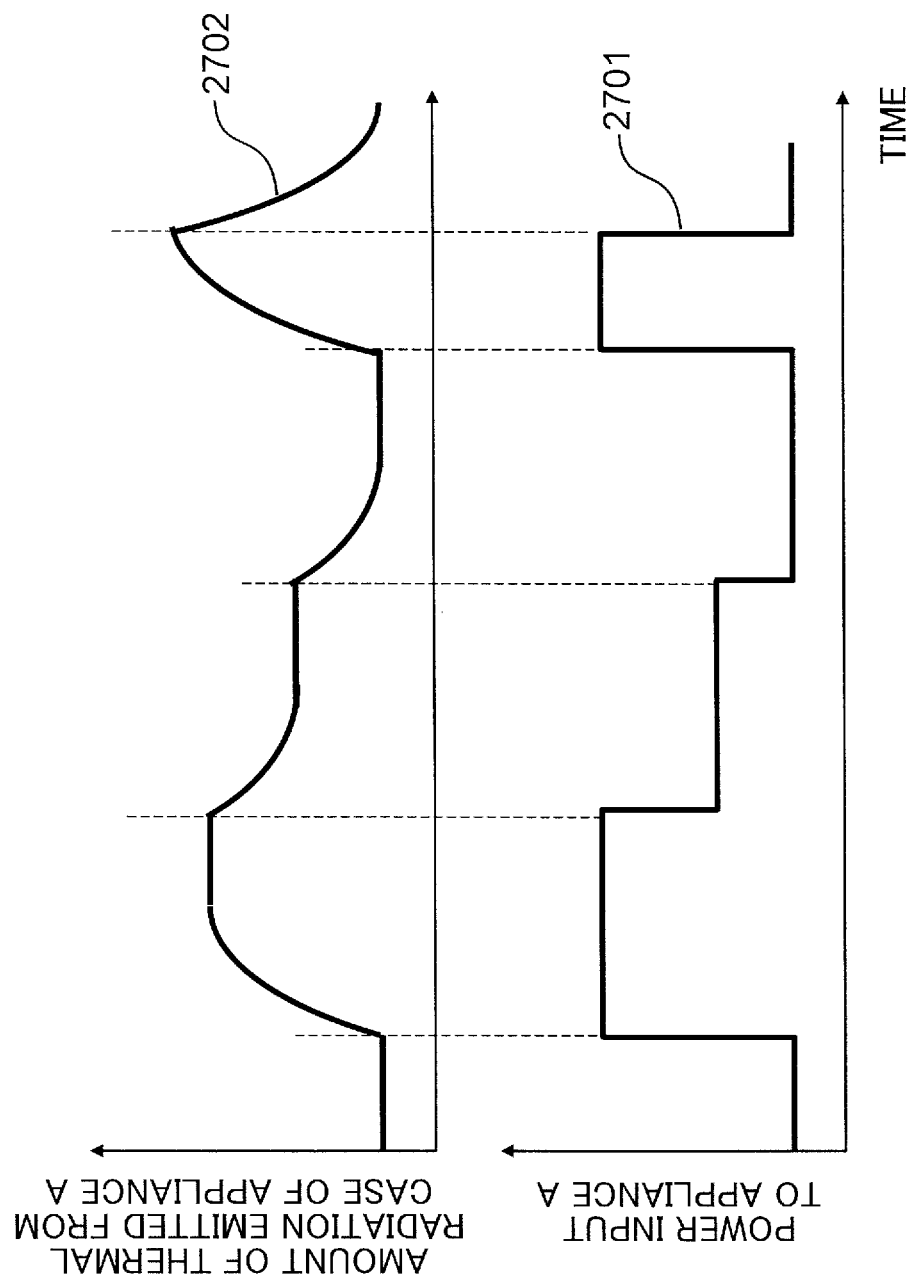
FIG. 25 is a diagram showing the relationship between the amount of thermal radiation emitted from the case of an arbitrary appliance, and the power that is input to the arbitrary appliance.

FIG. 25 is a diagram showing the relationship between the amount of thermal radiation emitted from the case of an arbitrary appliance A, and the power that is input to the arbitrary appliance A. As shown in FIG. 25, it can be seen that the thermal radiation quantity 2702 is increasing/decreasing pursuant to the increase/decrease of the input power 2701. However, as also evident from FIG. 25, there is a slight delay between the timing of increase/decrease in the input power 2701 and the timing of increase/decrease in the thermal radiation quantity 2702. This delay time affects the heat capacity of the respective appliances. Thus, desirably, the heat capacity of the respective appliances, or the delay time between the increase/decrease in the input power of the respective appliances and the increase/decrease in the thermal radiation quantity is stored (initially registered) in the database of the cloud server 104. It is thereby possible to assess the position of the respective appliances more accurately.

However, the method of estimating the thermal radiation quantity of the respective appliances from the input power is desirable since the position of the appliances can be detected with greater accuracy.

Moreover, in FIG. 23, while the thermal radiation distribution measuring device 2201 is installed independently in the room 101, a lighting apparatus may be mounted thereon. Moreover, the thermal radiation distribution measuring device 2201 may also comprise a light emitting unit. Since the appliance in which the position thereof cannot be assessed by the thermal radiation distribution measuring device 2201 will become evident to the user, the user can move that application to a position where the position of that appliance can be assessed by the thermal radiation distribution measuring device 2201. In other words, since an appliance to which the light emitted from the lighting apparatus does not reach the light emitting unit; that is, an appliance in which the light emitting unit is overshadowed can be assessed by the user, the position of that appliance can be assessed by moving that appliance to a position where the light emitted from the lighting apparatus will reach the light emitting unit. It is thereby possible to assess more appliances existing in the same room.

Moreover, a plurality of thermal radiation distribution measuring devices 2201 may be installed at different positions in the same room. It is thereby possible assess the position of the respective appliances in the room more accurately and three-dimensionally.

Moreover, when a plurality of thermal radiation distribution measuring devices 2201 are installed as described above, it is desirable that the plurality of thermal radiation distribution measuring devices 2201 assess their mutual positional relationship. Thus, desirably, another thermal radiation distribution measuring device is installed within the measurement area of at least one thermal radiation distribution measuring device. It is thereby possible to assess the position of the respective appliances more accurately. Moreover, the method of at least one thermal radiation distribution measuring device comprising the thermal radiation quantity estimating unit and assessing the positional relationship of the appliances described above and also be adopted upon assessing the positional relationship of the thermal radiation distribution measuring devices.

Moreover, the thermal radiation distribution measuring device 2201 may also be equipped with an air-conditioner. Moreover, the thermal radiation distribution measuring device 2201 may also comprise a blower unit for generating at least cool air or warm air toward a specific direction. For example, with regard to a certain appliance A, when the accurate position information thereof has not been obtained, the blower unit blows cool air (or warm air) to the respective positions in the room, and monitors the change in the temperature measuring unit of the appliance A. In other words, the blower unit blows air of a temperature that is different from the room temperature toward the arbitrary appliance A. It is thereby possible to assess the position of the appliance A accurately.

Moreover, the thermal radiation distribution measuring device 2201 may also comprise a function of detecting fire and notifying a fire to the user. It is thereby possible to notify the indication of fire to the user sooner than a heat sensor-type or smoke sensor-type fire alarm. Moreover, the thermal radiation distribution measuring device 2201 may also be connected to an alarm activating appliance for emitting an alarm via the network 1000, and send a signal instructing the emission of an alarm to the alarm activating appliance upon the detection of a fire.

Moreover, the thermal radiation distribution measuring device 2201 may also be mounted on a fire alarm comprising a communication unit.

Moreover, in order to assess the position information in the depth direction with a single thermal radiation distribution measuring unit, the thermal radiation distribution measuring device 2201 may also comprise a depth position information acquisition unit for acquiring position information in the depth direction. As the depth position information acquisition unit, for example, used may be a monocular 3D infrared camera in which the focus position is changed by changing the position of the lens or infrared sensor array, or a binocular 3D infrared camera that determines the depth by using infrared sensor arrays installed at a plurality of different positions.

In order to realize the same configuration as the binocular 3D infrared camera with one appliance, for example, a thermal image distribution measuring device is desirably provided to either end of a household appliance in the home that is large in the horizontal direction such as a TV or an air-conditioner.

Since the position information in the depth direction can be acquired with greater accuracy, it is thereby possible to assess the arrangement of the respective appliances in the home with greater accuracy.

The method of assessing the position of the respective appliances using the visible light (imaging device 1701) or the thermal radiation (thermal radiation distribution measuring device 2201) was explained above, it is also possible for the appliance position detection unit to detect the position of the respective appliances by the respective appliances each sending a unique ultrasonic signal, and the arrayed ultrasonic wave measuring device receiving the ultrasonic signal output from the respective appliances.

While the method of using visible light or thermal radiation is desirable from the perspective of low cost, the method of using ultrasonic waves is desirable with respect to the point of being able to assess the position of more appliances even in rooms including obstacles since ultrasonic waves can pass through members such as a paper sliding door or light scattering substances such as smoke.

Moreover, in order for an imaging device or a thermal radiation distribution measuring device installed in a specific appliance (air-conditioner or lighting apparatus) within the room to exhibit the effects of the present invention at an arbitrary timing and enable the assessment of the position of the respective appliances, it is desirable for the imaging device or the thermal radiation distribution measuring device to perform imaging of the room or measure the thermal radiation distribution in the room even while the air-conditioner or the lighting apparatus, in which it is installed, is not operating.

Moreover, the imaging device or the thermal radiation distribution measuring device may comprise a function for assessing the positional relationship of the room where it is installed based on the foregoing method of detecting the positional relationship of the rooms. It is thereby possible to control the appliances by assessing the positional relationship of the respective appliances in the room within the home.

Moreover, the appliance position detection unit 2003a is desirable since the position of the respective appliances can be assess in a short period of time, and the appliance position detection unit 2003b is desirable since the location of appliances that are not equipped with a light source can also be assessed.

(User Position Detection Unit 2004)

Finally, the method of identifying the positional relationship of the user and the respective appliances in the respective rooms is explained below. The user of the respective appliances can be assessed by assessing the location of the respective users in addition to assessing the appliance group that is installed in the same room, assessing the positional relationship of the respective rooms in the home, and assessing the position of the respective appliances and the respective rooms. The appliances can be controlled to suit to the user by being able to assess the user. Here, the method of detection the location of a person in the room 101 is explained.

Figure 26:
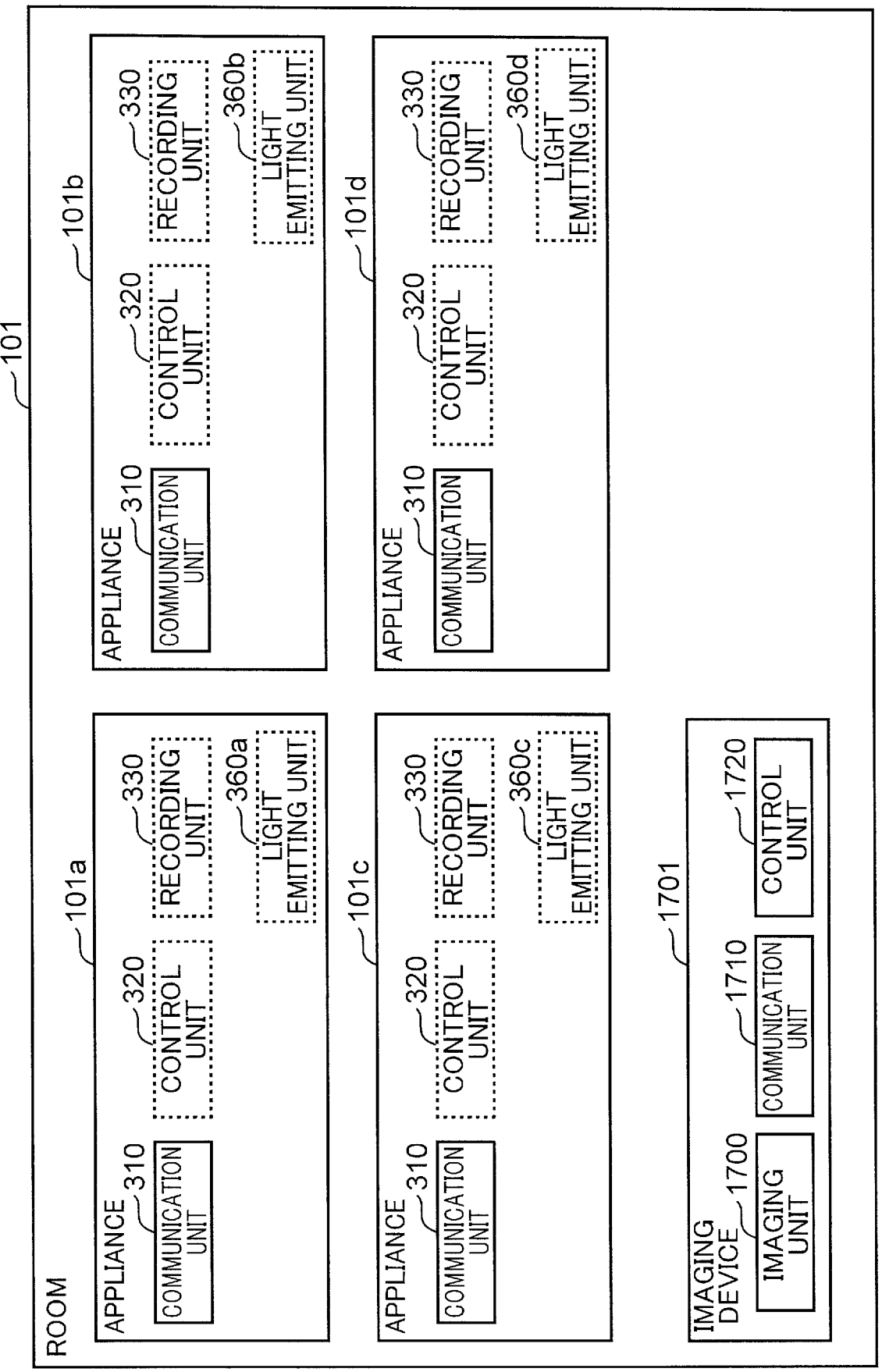
FIG. 26 is a diagram showing the configuration of the information providing system in a case where the control unit of the cloud server comprises the user position detection unit.

FIG. 26 is a diagram showing the configuration of the information providing system in a case where the control unit 321 of the cloud server 104 comprises the user position detection unit 2004.

As with the case where the control unit 321 comprises the appliance position detection unit 2003a, an imaging device 1701 is installed in the room 101. The imaging device 1701 is desirably installed at a position where most of the room 101 can be observed (imaged) such as at the corner or ceiling of the room. Moreover, the imaging device 1701 is desirably connected to the network 1000.

Figure 27:
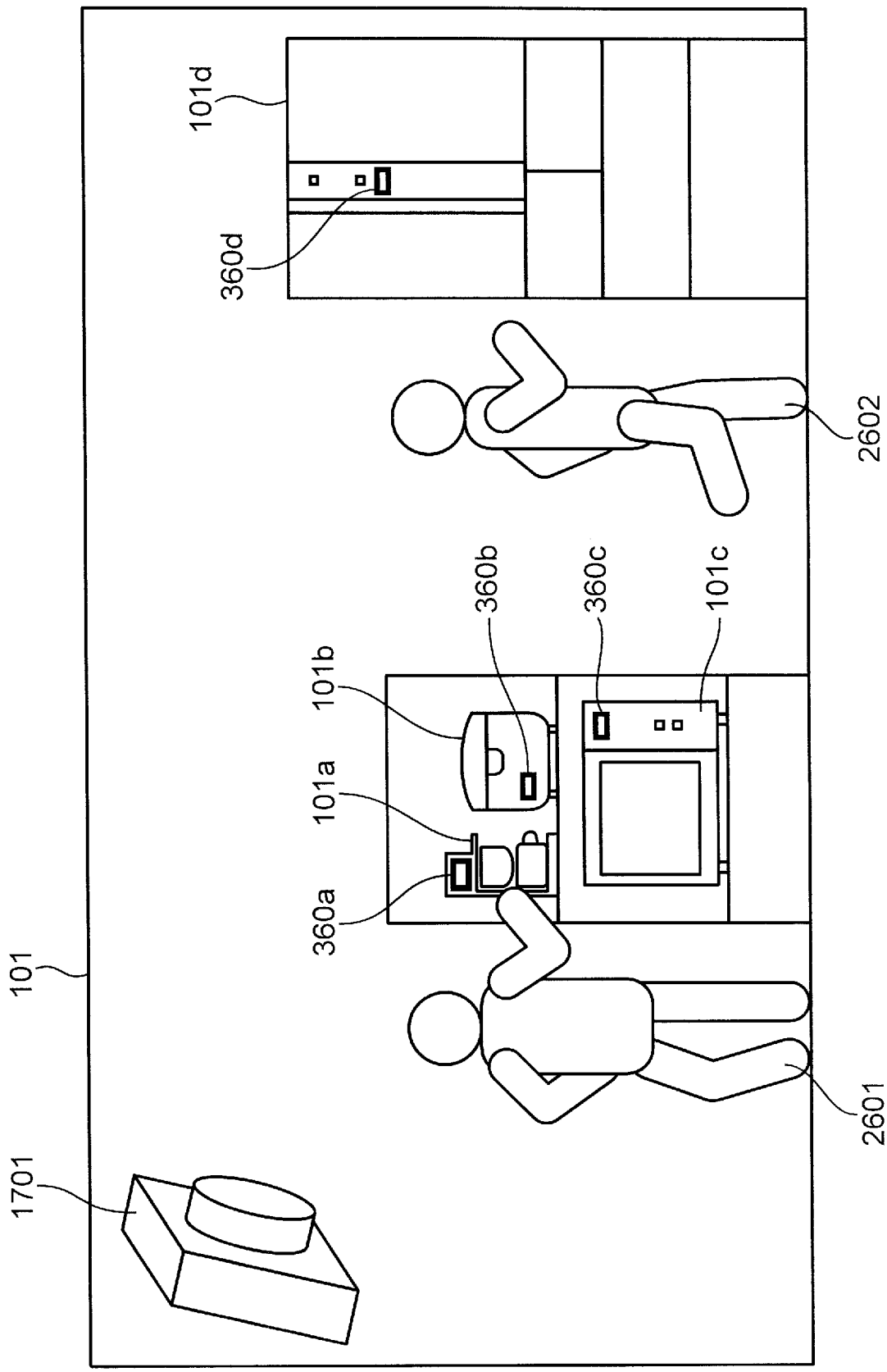
FIG. 27 is a diagram showing an example of the room including the imaging device.

FIG. 27 is a diagram showing an example of the room 101 including the imaging device 1701. As shown in FIG. 27, the inside of the room 101 is imaged using the imaging device 1701, and a user 2601 and a user 2602 in the imaging area are individually identified from the captured image.

By assessing the position of the respective appliances and the location of the users in the respective rooms, it becomes possible to assess the user who is operating the respective appliances. For example, the user position detection unit 2004 specifies the user who is closest to an appliance as the user of that appliance. Consequently, as explained in embodiment 2 onward, it is possible to control appliances and provide information in a manner that is more suitable for that individual.

As described above, the communication unit 311 of the cloud server 104 receives, via a network, position specifying information for specifying the position of a plurality of appliances in a predetermined room and specifying the location of users in that room. The appliance position detection unit 2003 specifies the position of the plurality of appliances in the room based on the received position specifying information. The user position detection unit 2004 specifies the position of the users in the room based on the received position specifying information.

Note that the position specifying information is the image of the room that was imaged by the imaging device 1701. The appliance position detection unit 2003 specifies the position of the plurality of appliances in the room based on the captured image. The user position detection unit 2004 specifies the position of the users in the room based on the captured image.

Moreover, the user position detection unit 2004 specifies the user who is using one or more appliances among the plurality of appliances in the room based on the specified position of the plurality of appliances and the specified position of the user. Note that whether a user is using one or more appliances can be determined by receiving operating information of the appliances. Moreover, the communication unit 311 of the cloud server 104 provides information relating to the user to the service providing apparatus that is providing an arbitrary to the specified user and the family members of that user. Note that the service providing apparatus is, for example, the server 121 that is being operated by the service provider 120.

Here, as the individual identification method based on images, an individual identification method that is based on the features of an individual, such as the face, height or body shape, is used.

Thus, the cloud server 104 desirably stores in advance, in the main memory 331, the facial image of the residents of the home where the imaging device 1701 is installed. It is thereby possible to identify individuals more accurately.

When identifying individuals based on the height or width of the users 2601, 2602 from the images captured by the imaging unit 1700, desirably, a database which records the body shape of information of the respective users in the home, such as the height or waist size, is stored in advance in the main memory 331 of the cloud server 104 connected to the network 1000. The user position detection unit 2004 can more accurately identify the user included in the image obtained with the imaging unit 1700 by referring to the database.

Moreover, the information providing system may also comprise a body shape measuring device for measuring the user's body shape. The body shape measuring device is desirably installed in the home (building), and desirably comprises a communication unit for connecting to the network 1000. The body shape measuring device is configured, for example, from a body composition meter or a weight scale.

Moreover, the body shape measuring device desirably comprises a function for identifying the individual and storing the measurement results of the body shape. It is thereby possible to obtain, for example, information which associates the personal name (or personal ID) and the body shape such as the height or weight. Thus, it is possible to identify the user 2601 who was imaged by the imaging device 1701 without having to initially register the user's body shape. The body shape measured by the body shape measuring device and the personal name or the personal ID are associated.

In other words, the communication unit 311 of the cloud server 104 receives information relating to the user's body shape that was measured with the body shape measuring device. Subsequently, the user position detection unit 2004 specifies the user who is using one or more appliances among the plurality of appliances in the room based on the information relating to the user's body shape and the position of the plurality of appliances and the position of the users.

Moreover, upon identifying individuals based on facial recognition, the cloud server 104 may initially register data of the facial image of each user. It is thereby possible to identify the users in the room more accurately.

Moreover, the information providing system may also comprise a pedometer device to be carried by the user and used for counting the number of steps taken by the user. The pedometer device desirably comprising a communication unit for connecting to the network 1000. The user position detection unit 2004 can thereby identify the users 2601, 2602 more accurately by comparing the movement of the users 2601, 2602 detected by the imaging device 1701 and the time in which the total number of steps increased as measured by the pedometer device. Thus, the cloud server 104 desirably registers in advance the user of the pedometer device. Moreover, it goes without saying that the information providing system may also comprise a device such as an activity meter which measures the change in acceleration in substitute for the pedometer device.

Moreover, the information providing system may also comprise, in substitute for the pedometer device, a device in which the user thereof has been identified and which includes a communication unit for connecting to the network 1000 and which measures the user's heart rate (pulse rate), respiration rate and body temperature.

By utilizing the increase in the heart rate, respiration rate and body temperature at the timing that the user's activity increases, the user position detection unit 2004 can identify the users 2601, 2602 more accurately by comparing the timing of increase in the heart rate, respiration rate and body temperature and the timing of the user's movement that was captured by the imaging device 1701.

Moreover, the information providing system may also comprise a portable terminal in which the user thereof has been identified. The portable terminal comprises a communication unit for connecting to the network 1000, and an information acquisition unit for acquiring the current position based on information from the GPS or Wi-Fi access point. Here, the cloud server 104 desirably stores the personal name (personal ID) of the user who is currently indoors. The portable terminal is configured, for example, from a smartphone or an activity meter.

Since the users who are currently in the home can thereby be identified, the imaging device 1701 can be used to identify the respective users more accurately and in a shorter period of time.

Moreover, similarly, an interphone comprising a communication unit may also identify the person entering and exiting the home.

While the method of identifying users in the room using the imaging device 1701 was explained above, the users in the room may be similarly identified using the thermal radiation distribution measuring device.

In other words, the position specifying information may also be the thermal radiation distribution in the room that was measured with the thermal radiation distribution measuring device. In the foregoing case, the appliance position detection unit 2003 specifies the position of the plurality of appliances in the room based on the measured thermal radiation distribution. Moreover, the user position detection unit 2004 specifies the position of the users in the room based on the measured thermal radiation distribution.

In the case of using the thermal radiation distribution measuring device also, similar to the case of using the imaging device 1701, the user position detection unit 2004 can identify the respective users based on the face, height or body shape, and identify the user of the respective appliances.

Moreover, the method of using the thermal radiation distribution measuring device is desirable with respect to the point of being able to detect farther users without omission, and the method of using the imaging device is desirable with respect to the point of being able to more accurately detect closer users.

Moreover, the method of concurrently using the imaging device and the thermal radiation distribution measuring device is even more desirable, and the users at the respective positions in the room can be identified more accurately by adjusting the focus position of the imaging device based on the user position information detected by the thermal radiation distribution measuring device.

Moreover, the user position detection unit 2004 may also use the imaging device and the thermal radiation distribution measuring device to identify the user and, based on the user's posture and movement information, determine that the user is sleeping when there is no movement in a state where the user is lying down for a given period of time or longer.

Moreover, the imaging device and the thermal radiation distribution measuring device desirably detect the facing direction of the user's face or the position of the user's hand. This is desirable since it will be possible to know which user is operating which appliance.

Moreover, the imaging device 1701 is desirably installed in a TV. In order to avoid recognizing a person displayed on the TV as a user in the home, it is desirable that the TV is not installed within the imaging range. As a result of the imaging device 1101 being installed in the TV, it is possible to prevent a person displayed on the TV from being erroneously detected. It is thereby possible to identify the users in the room more accurately.

Moreover, the information providing system desirably comprises a thermal radiation distribution measuring device together with an imaging device. The thermal radiation of a person displayed on the TV is the same as the periphery in the screen, and the thermal radiation of an existing person differs from the periphery. Thus, by concurrently using the thermal radiation distribution measuring device and the imaging device, it is possible to identify individuals more accurately.

Embodiment 2

In embodiment 2, explained are examples of the services provided to the user using the respective appliances by using the information that has been detected in the information providing system described in embodiment 1. Note that embodiment 2 is merely an example, and does not in any way limit the services that can be provided by the information providing system described in embodiment 1.

Based on the appliance identification unit 2001, the room position detection unit 2002, the appliance position detection unit 2003 and the user position detection unit 2004 described in embodiment 1, obtained are (1) same-room appliance list information (first information), (2) positional relationship information of rooms (second information), (3) appliance position information in rooms (third information) and (4) user's position information (fourth information). Moreover, based on the appliance position information and the user's position information, (5) user information of each appliance (fifth information) is obtained. As the remote control service of indoor appliances using the foregoing information, the following modes can be considered.

Note that, in the ensuing explanation, the service mode using information including at least one among the first information, the second information, the third information, the fourth information and the fifth information is explained.

Figure 28:
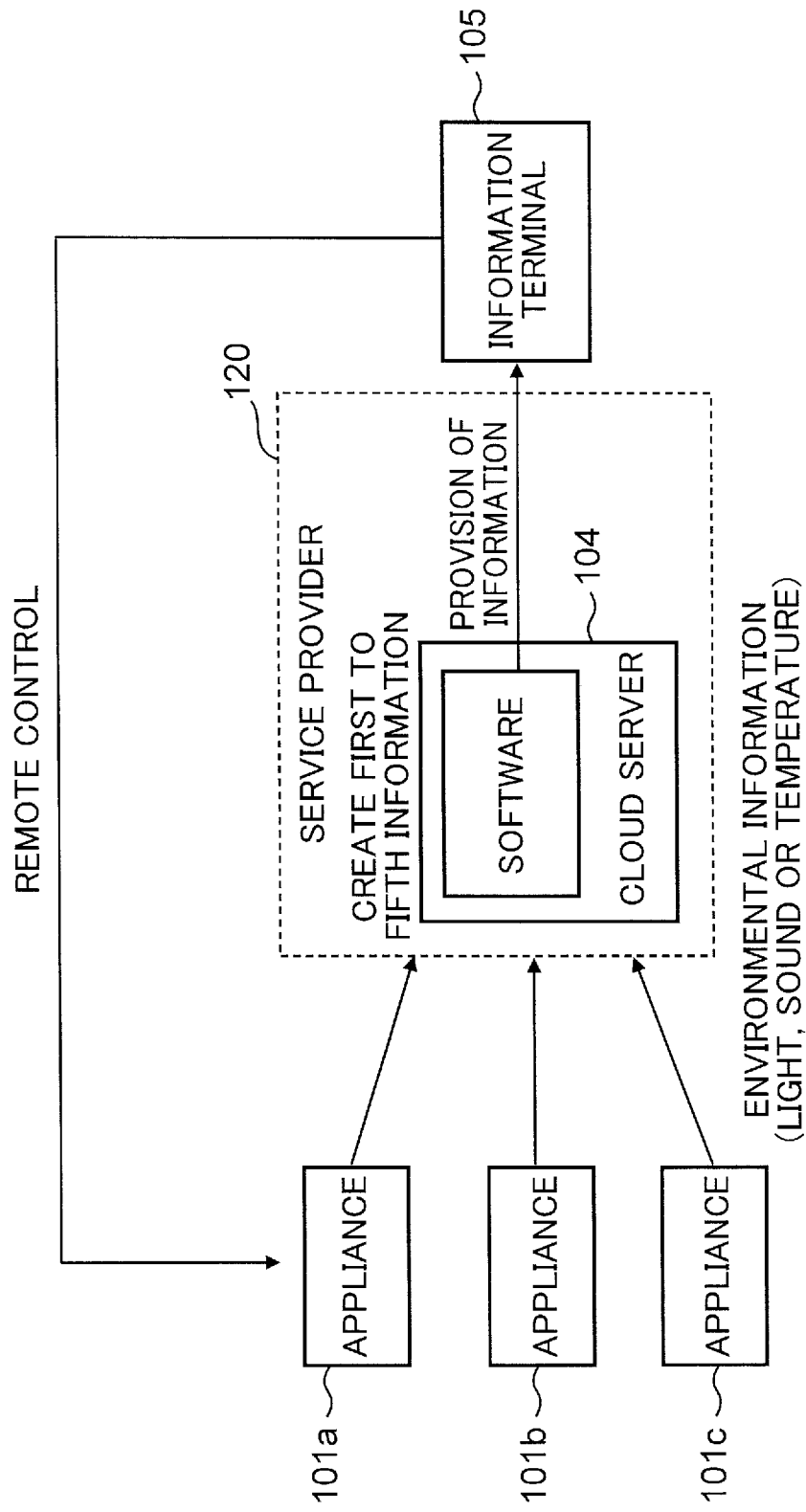
FIG. 28 is a diagram showing the first service mode in which the terminal receives information provided from the service provider, and the user controls the indoor appliance via the terminal.

FIG. 28 is a diagram showing the first service mode in which the terminal receives information provided from the service provider, and the user controls the indoor appliance via the terminal. In the first service mode, the first information to fifth information provided from the service provider 120 is received by the terminal 105, and the user controls the indoor appliances 101a to 101c via the terminal 105. Note that, as shown in FIG. 1, the data center operating company 110 may exist as a company to manage the cloud server 104, or the service provider 120 may individually manage the cloud server 104. In this embodiment, there is no particular limitation regarding the service type with regard to which company or individual is fulfilling the role of which function. The plurality of service types will be described later.

As shown in FIG. 28, in the first service mode, while it is desirable to provide information using the terminal 105, the method is not limited thereto. Moreover, the terminal 105 may be one appliance among the appliances existing in the room such as the appliances 101a to 101c.

Figure 29:
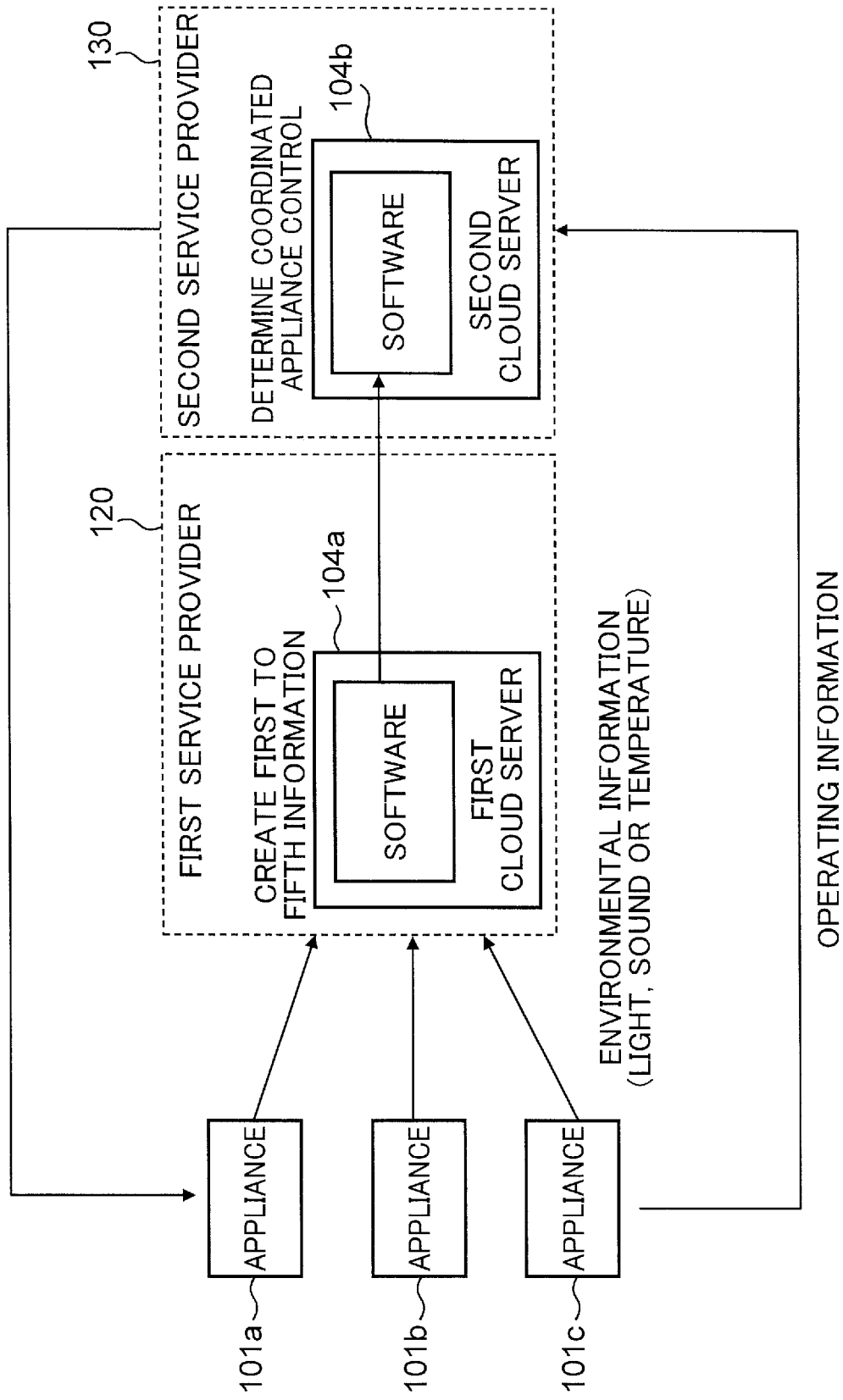
FIG. 29 is a diagram showing a second service mode in which the service provider determines the control description of the indoor appliance and controls the indoor appliance based on the received information and operating information.

FIG. 29 is a diagram showing a second service mode in which the service provider determines the control description of the indoor appliance and controls the indoor appliance based on the received information and operating information. The second service provider 130 receives the first information to fifth information from the first service provider 120. In addition, the second service provider 130 receives the operating information from the indoor appliances 101a to 101c. In the second service mode, the second service provider 130 determines the control description of the indoor appliances 101a to 101c and controls the indoor appliances 101a to 101c based on the received first information to fifth information and the operating information.

Note that, in FIG. 29, while the first cloud server 104a used by the first service provider 120 and the second cloud server 104b used by the second service provider 130 are depicted separately, the first service provider 120 and the second service provider 130 may also use the same cloud server. Moreover, as shown in FIG. 1, the data center operating company 110 may exist as a company that manages the first cloud server 104a and the second cloud server 104b, or the first service provider 120 and the second service provider 130 may individually manage the first cloud server 104a and the second cloud server 104b. In this embodiment, there is no particular limitation regarding the service type with regard to which company or individual is fulfilling the role of which function. The plurality of service types will be described later.

Figure 30:
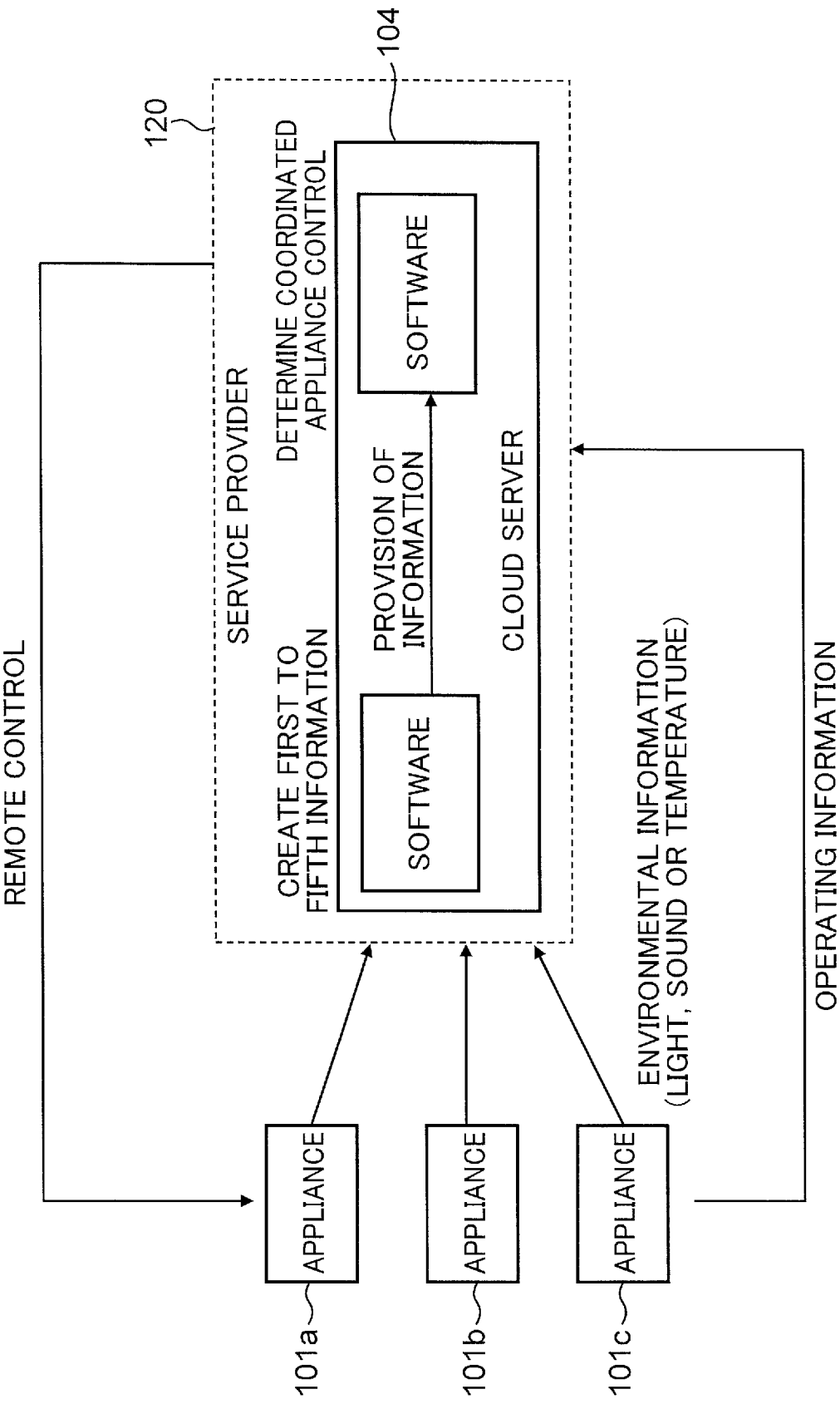
FIG. 30 is a diagram showing a third service mode in which the processing of the two service providers of FIG. 29 is performed by one service provider.

FIG. 30 is a diagram showing a third service mode in which the processing of the two service providers of FIG. 29 is performed by one service provider. In the third service mode, the processing of the first service provider 120 and the second service provider 130 in the second service mode described above is performed with a single service provider 120. Note that, as shown in FIG. 1, the data center operating company 110 may exist as a company that manages the cloud server 104, or the service provider 120 may individually manage the cloud server 104. In this embodiment, there is no particular limitation regarding the service type with regard to which company or individual is fulfilling the role of which function. The plurality of service types will be described later.

Specific examples of the first to third service modes are now explained.

Note that, in the foregoing explanation, in order to acquire the third information, the fourth information and the fifth information, while not shown in FIG. 2 to FIG. 4, the first service provider 120 or the second service provider 130 desirably receive the user's position information based on the image information obtained with the imaging device or the thermal radiation distribution measuring device.

Example Relating to First Service Mode

The first service mode where the terminal 105 receives the first information to fifth information provided from the service provider 120, and the user controls the indoor appliances 101*a* to 101*c* via the terminal 105 is explained.

Figure 31:
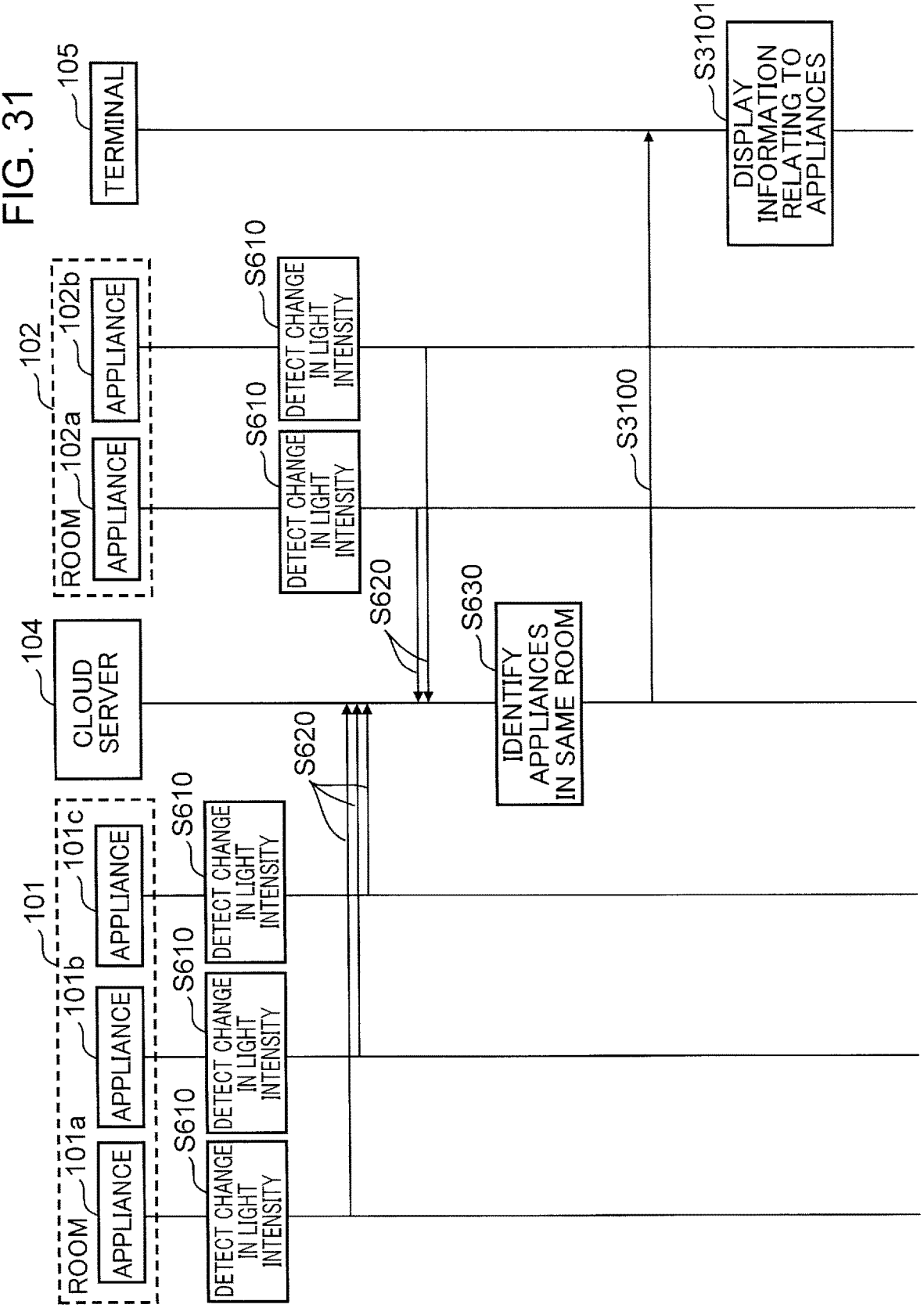
FIG. 31 is a sequence diagram showing the operation of providing information to the terminal by using the information acquired from the application identification unit in the information providing system described in embodiment 1.

FIG. 31 is a sequence diagram showing the operation of providing information to the terminal 105 by using the information acquired from the appliance identification unit 2001*a* in the information providing system described in embodiment 1. Note that, without limitation to the appliance identification unit 2001*a*, other means described in the information providing system described in embodiment 1 may also be applied.

Since the processing of step S610 to step S630 is the same as in the appliance identification unit 2001*a* of embodiment 1, the explanation thereof is omitted.

In step S3100, the cloud server 104 sends to the terminal 105 information relating to the respective appliances that were specified for each room.

FIG. 32A is a diagram showing an example of the information that is sent from the cloud server 104 to the terminal 105, and FIG. 32B is another example of the information that is sent from the cloud server 104 to the terminal 105. As shown in FIG. 32A, the cloud server 104 may also send to the terminal 105 all information including the information for identifying the respective appliances, the room information relating to the room number where the respective appliances are installed, and information relating to the display area upon displaying information on the terminal side. Moreover, as shown in FIG. 32B, the cloud server 104 may also only send the information for identifying the respective appliances, and the room information relating to the room number where the respective appliances are installed.

Subsequently, in step S3101, the terminal 105 displays, for each room area, information relating to the respective appliances based on the information received from the cloud server 104. Here, when the information shown in FIG. 32A is sent, the control unit 320 of the terminal 105 controls the display unit 350 so as to display information relating to the respective appliances in the designated display area. Moreover, when the information shown in FIG. 32B is sent, the control unit 320 of the terminal 105 determines the display area of the display unit 350 for each appliance of the respective rooms, and controls the display unit 350 so as to display information relating to the respective appliances in the determined display area.

Figure 33:
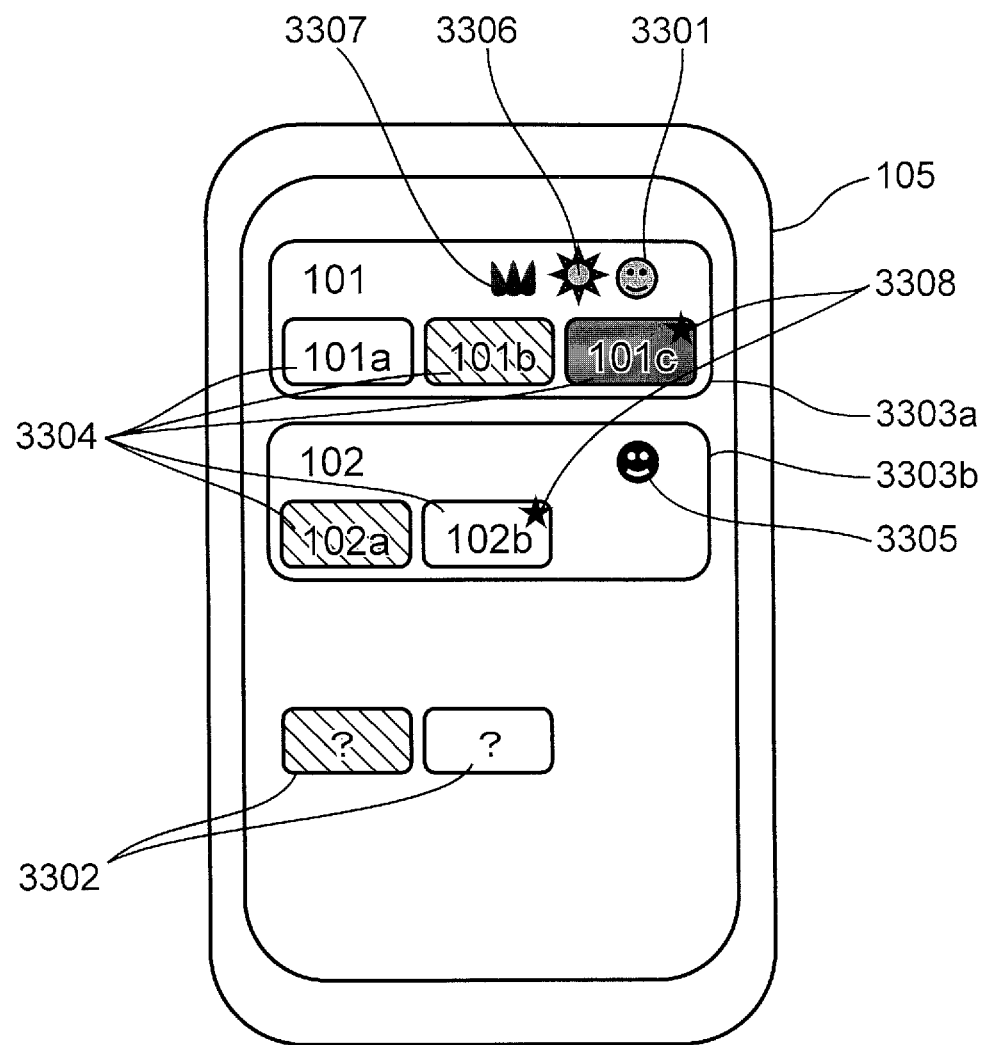
FIG. 33 is a diagram showing an example of the display screen that is displayed on the display unit of the terminal in step S3101 of FIG. 31.

FIG. 33 is a diagram showing an example of the display screen that is displayed on the display unit 350 of the terminal 105 in step S3101 of FIG. 31. Room frames 3303*a*, 3303*b* which are separated for each room as the display area of the respective appliances are displayed. Note that, in FIG. 33, the name for identifying the room 101 is indicated as "101". Moreover, an appliance frame 3304 indicating the respective appliances in the room is displayed. Note that, in FIG. 33, the name for identifying the appliance 101*a* is indicated as "101*a*". Here, as shown in FIG. 33, since the appliances 101*a*, 101*b*, 101*c* have been identified as appliances in the same room in step S630, the appliance frames 3304 of the respective appliances are indicated in the room frame 3303*a*, which is the same display area. Similarly, since the appliances 102*a*, 102*b* have been identified as appliances in the same room in step S630, the appliance frames 3304 of the respective appliances are indicated in the room frame 3303*b*, which is the same display area.

Note that, in the terminal 105, the appliance frames 3304 indicating the names for identifying the respective appliances are desirably grouped with a plurality of colors or patterns. In the example of FIG. 33, the appliance frame 3304 indicating the appliance 101*b* and the appliance frame 3304 indicating the appliance 102*a* are grouped with the same color and pattern. Moreover, the appliance frame 3304 indicating the appliance 101*a* and the appliance frame 3304 indicating the appliance 102*b* are grouped with the same color.

For example, it is desirable to group appliances such as air-conditioners or lighting apparatuses based on their respective roles with the same color or pattern since it will be possible to easily assess the types of appliances that are installed in the respective rooms.

Accordingly, the appliance identification unit 2001 of the cloud server 104 determines one or more appliances that are installed in the first room 101 among the plurality of appliances based on the received environmental information. Moreover, the appliance identification unit 2001 determines one or more appliances that are installed in the second room 102, which is different from the first room 101, among the plurality of appliances based on the received environmental information. The communication unit 311 of the cloud server 104 sends a command for respectively displaying, in different display areas of a display unit equipped in a specific appliance among the plurality of appliances or in the terminal 105 other than the plurality of appliances, first information relating to the one or more appliances that have been determined as being installed in the first room 101, and second information relating to the one or more appliances that have been determined as being installed in the second room 102. The terminal 105 respectively displays the first information and the second information in different display areas (room frames 3303*a*, 3303*b*) of the display unit.

Moreover, when the user confirms the appliances in the home using the terminal 105 and there is an error in the displayed information, the error is desirably corrected. It is thereby possible to identify the appliances in the same home and same room more accurately.

Moreover, the terminal 105 preferably displays appliances that are running and appliances that are in standby mode with different colors or patterns. This is desirable since the appliance for which user forgot to turn off can be displayed in an easy-to-understand manner.

Moreover, with regard to the appliance for which user forgot to turn off, desirably, the terminal 105 can be used for performing control to turn OFF the power. It is thereby possible to conserve energy by resolving a situation where the user forgets to turn OFF the power of an appliance.

Moreover, desirably, a motion sensor for detecting users in the respective rooms is installed, and the terminal 105 displays an indication mark 3301 indicating that a user is in the room when a user exists in that room. Here, information relating to the existence/non-existence of a person in the room or the position of that person may also be acquired by using the user position detection unit 2004 of embodiment 1. Whether another user forgot to turn OFF the power can be determined based on the existence/non-existence of a user in the room. Thus, more appropriate power-saving is enabled.

Note that the motion sensor is configured from a pyroelectric sensor, the imaging device described in embodiment 1, or the thermal radiation distribution measuring device described in embodiment 1.

Moreover, the terminal 105 desirably displays the personal name or the individual ID as a suffix to the indication mark 3301 based on the user position information in which the individual was identified. It is thereby possible to control the appliances to suit each user. For example, a parent can prevent a child from watching TV for long hours via remote operation.

Moreover, the terminal 105 desirably changes the display location of the indication mark 3301 within the room frames 3303a, 3303b based on the user position information. It is thereby possible to further clarify the appliance user.

Moreover, when the motion sensor installed in the respective rooms detects that a person is in a room and is sleeping (or has fallen), the terminal 105 desirably displays the indication mark 3305 indicating that a person is in a room and is sleeping (or has fallen). More appropriate power-saving is enabled since it is possible to determine whether the user has forgotten to turn OFF the power of an appliance based on the information indicating that the person is sleeping.

Moreover, the terminal 105 may also display information relating to the position of the respective appliances in the respective rooms by using the room position detection unit 2002 described in embodiment 1.

Moreover, the terminal 105 desirably displays the indication mark 3307 indicating that there is a heat source in the room when a heat source sensor-type fire alarm or the like installed in the respective rooms detects the existence of a heat source in the room. It is possible to prevent fires based on information of both the person's condition or the person's existence and the heat source.

Moreover, the thermal radiation distribution measuring device or the imaging device may also be used for detecting fires.

Moreover, a toxic substance detecting device for detecting toxic substances such as pollen, dust, fungus or the like floating in the room may also be installed in the respective rooms, and the terminal 105 desirably displays the indication mark 3306 according to the amount of toxic substance detected by the toxic substance detecting device. It is thereby possible to adjust the operation of the ventilating device or air cleaner installed in the respective rooms.

Moreover, the terminal 105 may also receive an instruction for starting the operation of the air cleaner installed in the respective rooms.

Moreover, when a fire breaks out in the home, the terminal 105 desirably displays an indication mark (not shown) indicating a fire in the room. It is thereby possible to more quickly evacuate and engage in fire-fighting activities.

Moreover, when there is an appliance in a room where the installation position thereof is unknown, the terminal 105 may display the appliance frame 3302 indicating this appliance in which the installation position is unknown outside the room frames 3303a, 3303b. If the user learns of the room where the appliance in which the installation position is unknown, the user can thereby correct the information.

Moreover, as described in embodiment 1, the information providing system of embodiment 2 desirably comprises both a body fat scale including a communication unit and a thermal radiation distribution measuring device including a communication unit. Thus, the terminal 105 desirably displays a mark of at least the body fat scale and the thermal radiation distribution measuring device. It is thereby possible to assess the users more accurately.

Moreover, similarly, as described in embodiment 1, the information providing system of embodiment 2 desirably comprises a TV including a communication unit and a lighting apparatus including a communication unit. Thus, the terminal 105 desirably displays a mark indicating the TV or the lighting apparatus. It is thereby possible to increase the accuracy of detecting the position of appliances and the position of users in the same room.

Moreover, when the imaging device or the thermal radiation distribution measuring device is installed in appliance for a different purpose (lighting apparatus, TV or air-conditioner), the terminal 105 desirably displays a star-shaped indication mark 3308 in the appliance frame 3304 representing the appliance comprising the imaging device or the thermal radiation distribution measuring device. It is thereby possible to clarify the room where the position of appliances can be detected and the position of users can be detected.

Figure 34:
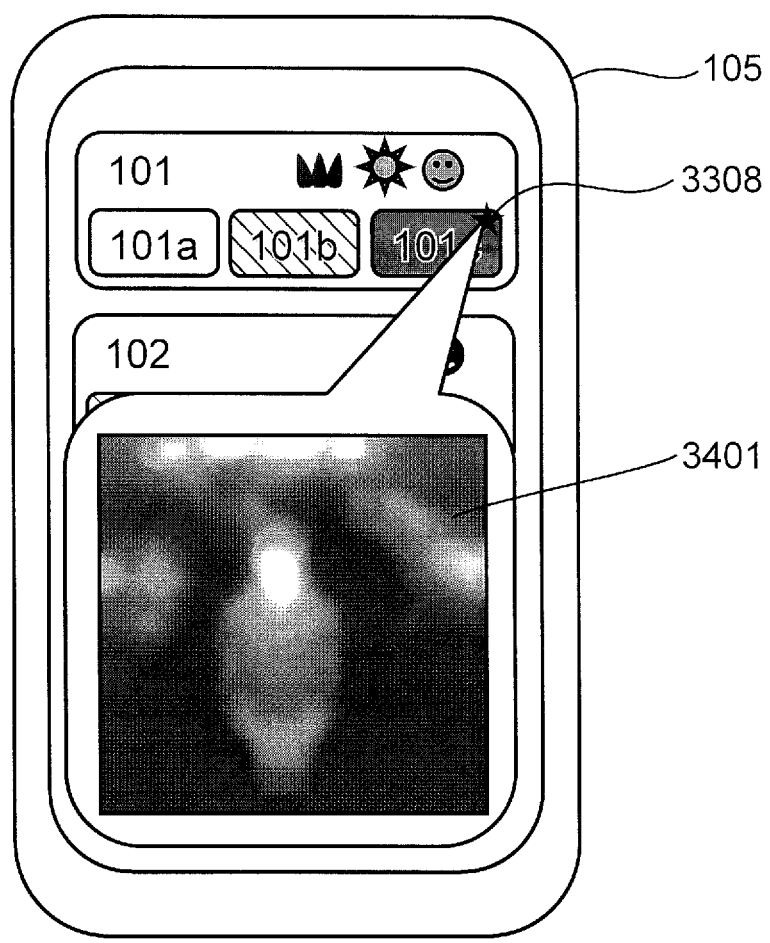
FIG. 34 is a diagram showing a display example of the thermal radiation distribution image measured with the thermal radiation distribution measuring device.

Moreover, when the user selects (clicks) the indication mark 3308, the terminal 105 desirably displays the thermal radiation distribution image 3401 measured with the thermal radiation distribution measuring device as shown in FIG. 34. FIG. 34 is a diagram showing a display example of the thermal radiation distribution image measured with the thermal radiation distribution measuring device. The user can thereby assess the temperature distribution in the room. For example, the user can assess the cold portion of the room upon heating the room, and engage in energy-saving by taking measures for insulation or the like.

Moreover, here, while the terminal 105 is displaying the thermal radiation distribution image, the thermal radiation distribution measuring device may also comprise a display unit for displaying the thermal radiation distribution image.

Moreover, an abnormally hot location of the room can be clarified with the thermal radiation distribution image. For example, since the user can assess abnormal heat generation of the outlet in advance, it is possible to predict and prevent the tracking phenomenon.

Moreover, the room frames 3303a, 3303b are desirably laid out pursuant to the actual positional relationship of the rooms. It is thereby possible to provide a display that can be easily understood by the user. Here, information relating to the actual positional relationship of the rooms may be acquired by using the room position detection unit 2002 described in embodiment 1.

Figure 35:
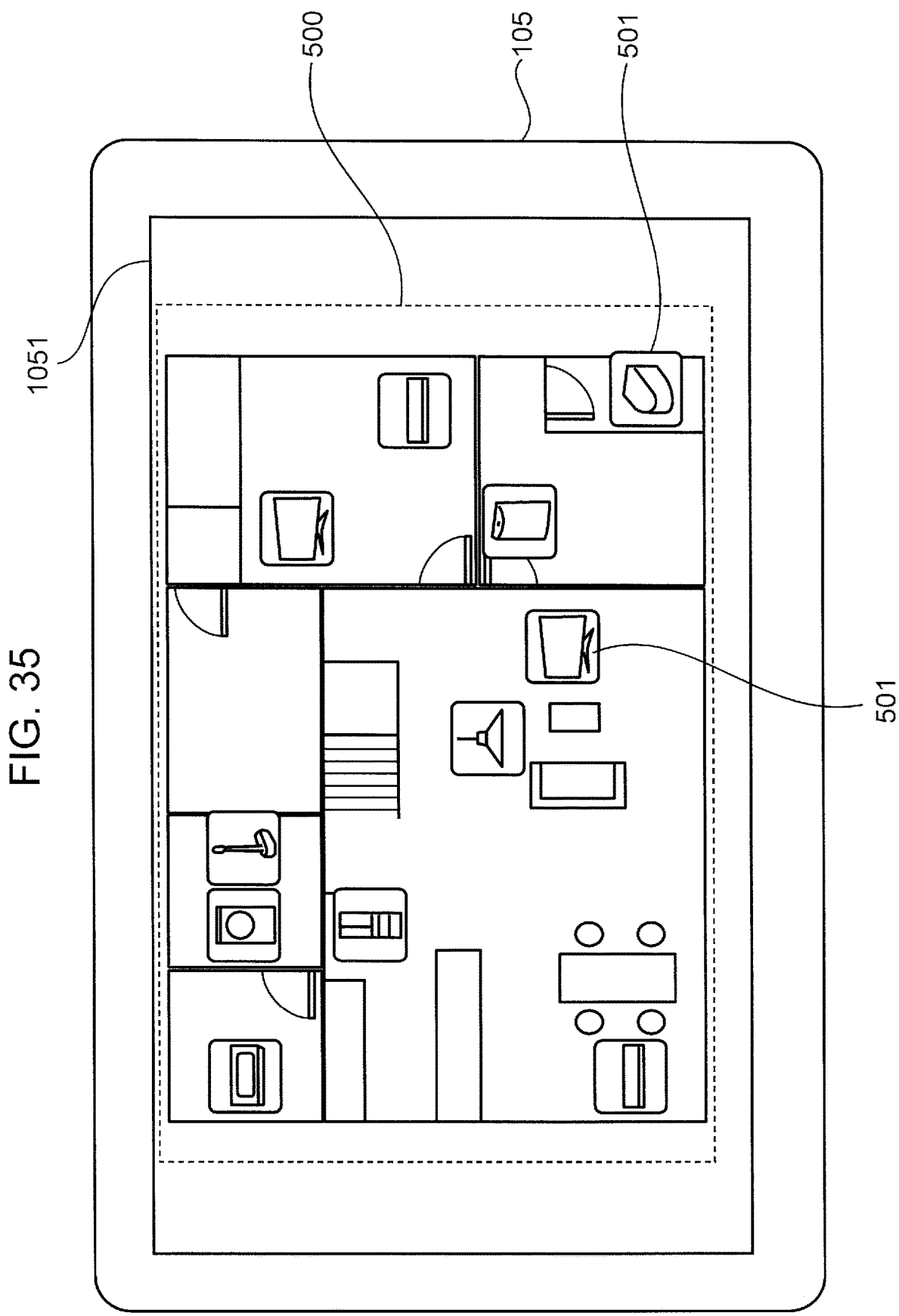
FIG. 35 is a diagram showing another example of the display screen that is displayed on the display unit of the terminal in step S3101 of FIG. 31.

FIG. 35 is a diagram showing another example of the display screen that is displayed on the display unit 350 of the terminal 105 in step S3101 of FIG. 31.

As shown in FIG. 35, the display screen 1051 of the terminal 105 may display a floor plan 500 of the room in the home. Note that the floor plan 500 may be stored in the terminal 105 in advance, or created in advance by the terminal 105 based on the positional relationship information of rooms (second information).

The terminal 105 displays icons 501 representing the appliances in an area representing the respective rooms in the floor plan 500. The terminal 105 displays the icons 501 based on the same-room appliance list information (first information) and the appliance position information in room (third information). Moreover, the terminal 105 displays a different icon 501 according to the type of appliance.

As a result of displaying the positions where the appliances are installed together with the floor plan in the building, the user can intuitively assess the position of the appliances.

The display method for displaying the first information to fifth information using the terminal 105 was explained above.

In the terminal 105, when there is any error in the first information to fifth information, even when the user ultimately corrects the error, as explained in embodiment 2, the user's troubles of correcting the error can be alleviated by adopting the method of automatically detecting and displaying the appliances installed in the same room and the position of the rooms where the appliances are installed.

Moreover, with regard to an appliance in which the room where it is installed is frequency changed, the user's troubles of frequently updating the information of the room where that appliance is installed can be alleviated by adopting the method described in embodiment 2.

Moreover, when the terminal 105 is located outside the home (house) for a predetermined time or longer, desirably, the user is disabled from operating the terminal 105. It is thereby possible to prevent a user outside the home from operating the appliances inside the home.

Moreover, the method of detecting the positional relationship of the rooms described in embodiment 1 is desirably used, and, consequently, the same effect as embodiment 1 can be yielded.

According to embodiment 2, not only is the control of indoor appliances from outside the home facilitated, it is also possible to provide a service to the user based on the coordination of the appliances in the same house.

First Example Relating to Second Service Mode and Third Service Mode

Explained is the information providing system and the information providing method in the second service mode and the third service mode of controlling the indoor appliances via the service provider in which a plurality of appliances connected to a network coordinate with each other to provide value to the user.

Figure 36:
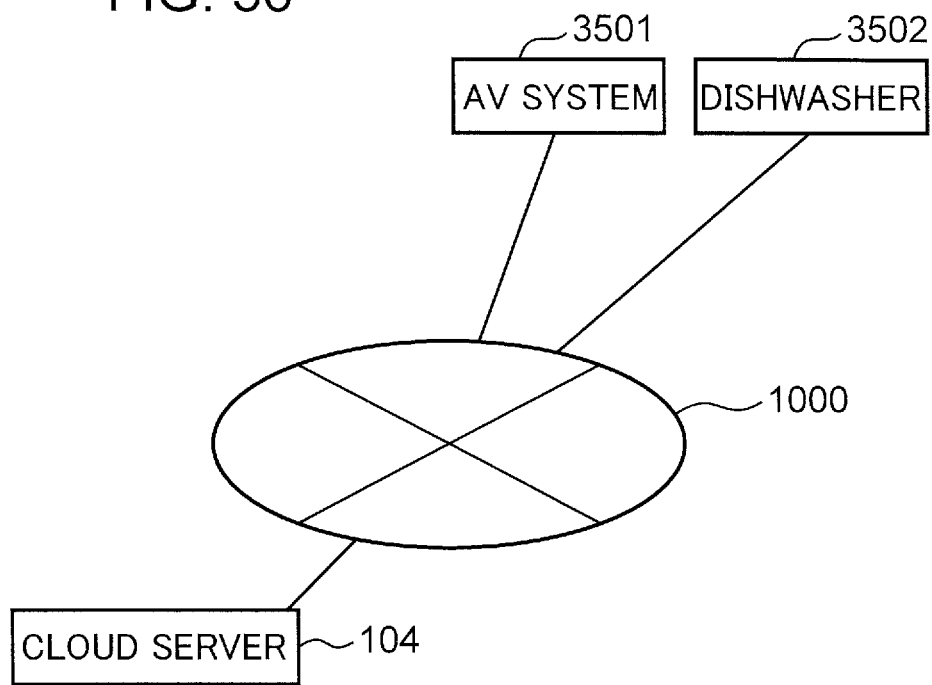
FIG. 36 is a diagram showing the configuration of the information providing system in the first example related to the second service mode and the third service mode.

The information providing system of this embodiment is now explained with reference to FIG. 36. FIG. 36 is a diagram showing the configuration of the information providing system in the first example related to the second service mode and the third service mode.

The information providing system shown in FIG. 36 comprises at least an AV (Audio Visual) system 3501 including a communication function, a dishwasher 3502 comprising a communication function, and the cloud server 104. With this information providing system, when the user turns ON the power of the AV system 3501, the operation of the dishwasher 3502 is automatically suspended. The user can thereby use the AV system 3501 in a quiet environment, and a higher quality sound can be provided to the user. Note that the AV system 3501 includes, for example, a TV, an optical disc recorder or an optical disc player.

With this information providing system, for example, the AV system 3501 notifies the cloud server 104 via the network 1000 of the fact that its power has been turned ON. The cloud server 104 determines the operation (turning OFF the power) of the dishwasher 3502 that operates in coordination as a result of the power of the AV system 3501 being turned ON based on the retained appliance coordinated operation database. In addition, the cloud server 104 sends an instruction signal to the dishwasher 3502 for turning OFF its power. The plurality of appliances connected to a network can thereby coordinate with each other and provide value to the user. Moreover, the AV system 3501 may also directly send an instruction signal to the dishwasher 3502 via the network 1000 for turning OFF its power.

Note that, in this embodiment, the cloud server 104 desirably identifies that the AV system 3501 and the dishwasher 3502 exist in the same room based on the method of detecting the appliances in the same room described in embodiment 1. It is thereby possible to stop the dishwasher 3502 only when necessary.

Note that the cloud server 104 may also suspend the operation of the dishwasher 3502 rather than turning OFF of the power of the dishwasher 3502.

Moreover, in this embodiment, the cloud server 104 desirably identifies that the AV system 3501 and the dishwasher 3502 respectively exist in mutually adjacent rooms based on the method of detecting the positional relationship of the rooms described in embodiment 1. It is thereby possible to stop the dishwasher 3502 disposed in the adjacent room and provide a high quality sound from the AV system 3501 to the user.

Moreover, in this embodiment, the cloud server 104 desirably identifies the user who is using the AV system 3501 in advance based on the method of identifying the position of the user described in embodiment 1. For example, the cloud server 104 stops the operation of the dishwasher 3502 when the user is near the AV system 3501, and continues the operation of the dishwasher 3502 when the user is positioned a predetermined distance away from the AV system 3501. It is thereby possible to set whether to stop the dishwasher 3502 for each user when the AV system 3501 is being used.

Accordingly, the control unit 321 of the cloud server 104 creates a list (same-room appliance list information) of one or more appliances that have been determined as being installed in the same room. The communication unit 311 of the cloud server 104 receives operating information of the first appliance included in the created list. The control unit 321 of the cloud server 104 determines a control description of a second appliance which is included in the list and operates in coordination with the first appliance based on a coordinated operation database for associating and storing an operation of one appliance among the plurality of appliances and an operation of another appliance that operates in coordination with the one appliance. The communication unit 311 of the cloud server 104 sends, to the second appliance, a control signal for controlling the second appliance according to the determined control description.

Second Example Relating to Second Service Mode and Third Service Mode

Figure 37:
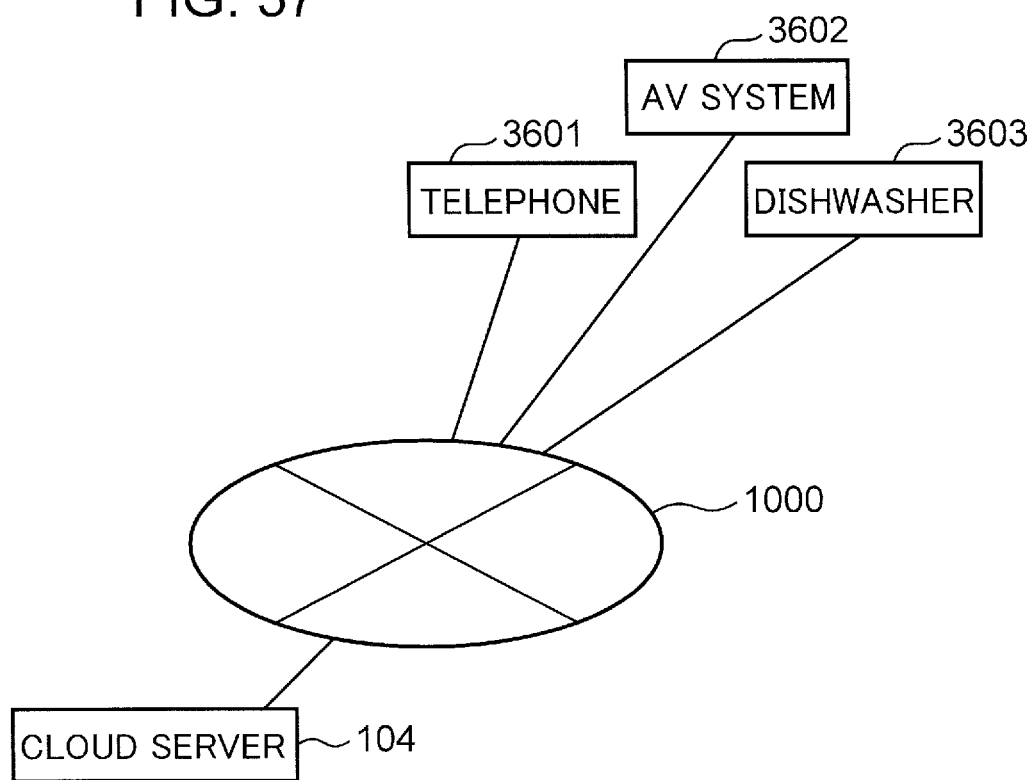
FIG. 37 is a diagram showing the configuration of the information providing system in the second example related to the second service mode and the third service mode.

The information providing system of this embodiment is now explained with reference to FIG. 37. FIG. 37 is a diagram showing the configuration of the information providing system in the second example related to the second service mode and the third service mode.

The information providing system shown in FIG. 37 comprises at least a telephone 3601 including a communication function, an AV system 3602 including a communication function, a dishwasher 3603 including a communication function, and the cloud server 104. With this information providing system, when the user makes a call using the telephone 3601, the volume of the AV system 3602 is automatically lowered and the operation of the dishwasher 3603 is automatically suspended. The user can thereby make the call in a quite environment.

With this information providing system, for example, the telephone 3601 sends a detection signal to the cloud server 104 via the network 1000 at the timing that the call is made. The cloud server 104 determines the operation (lowering the volume) of the AV system 3602 and the operation (suspending the operation) of the dishwasher 3603 which operate in coordination with the call made with the telephone 3601 based on the retained appliance coordinated operation database. Subsequently, the cloud server 104 sends an instruction signal to the AV system 3602 for lowering the volume and an instruction signal to the dishwasher 3603 for suspending the operation. The plurality of appliances connected to a network can thereby coordinate with each other to provide value to the user.

Moreover, the telephone 3601 may also directly send an instruction signal to the AV system 3602 and the dishwasher 3603 via the network 1000.

Note that the cloud server 104 may also turn OFF of the power of the dishwasher 3502 rather than suspending the operation of the dishwasher 3502.

Note that, in this embodiment, the cloud server 104 desirably identifies that the telephone 3601 and the AV system 3602 and the dishwasher 3603 exist in the same room based on the method of identifying the appliances in the same room described in embodiment 1. It is thereby possible to lower the volume of the AV system 3602 and to suspend the dishwasher 3603 only when necessary.

Moreover, in this embodiment, the cloud server 104 desirably identifies that the telephone 3601 and the AV system 3602 and the dishwasher 3603 respectively exist in mutually adjacent rooms based on the method of detecting the positional relationship of the rooms described in embodiment 1. It is thereby possible to lower the volume of the AV system 3602 and suspend the dishwasher 3603 which are disposed in the adjacent room and provide a quiet environment to the user for making a call with the telephone 3601.

Moreover, in this embodiment, the cloud server 104 desirably identifies the user who is using the telephone 3601 in advance based on the method of identifying the position of the user described in embodiment 1. For example, the cloud server 104 lowers the volume of the AV system 3602 when the user is near the AV system 3602 and suspends the operation of the dishwasher 3603 when the user is near the dishwasher 3603, and maintains the current volume of the AV system 3602 when the user is positioned a predetermined distance away from the AV system 3602, and continues the operation of the dishwasher 3502 when the user is positioned a predetermined distance away from the dishwasher 3603. It is thereby possible to set whether to suspend the operation of the dishwasher 3603 or lower the volume of the AV system 3602 for each user when the telephone 3601 is being used.

Third Example Relating to Second Service Mode and Third Service Mode

Figure 38:
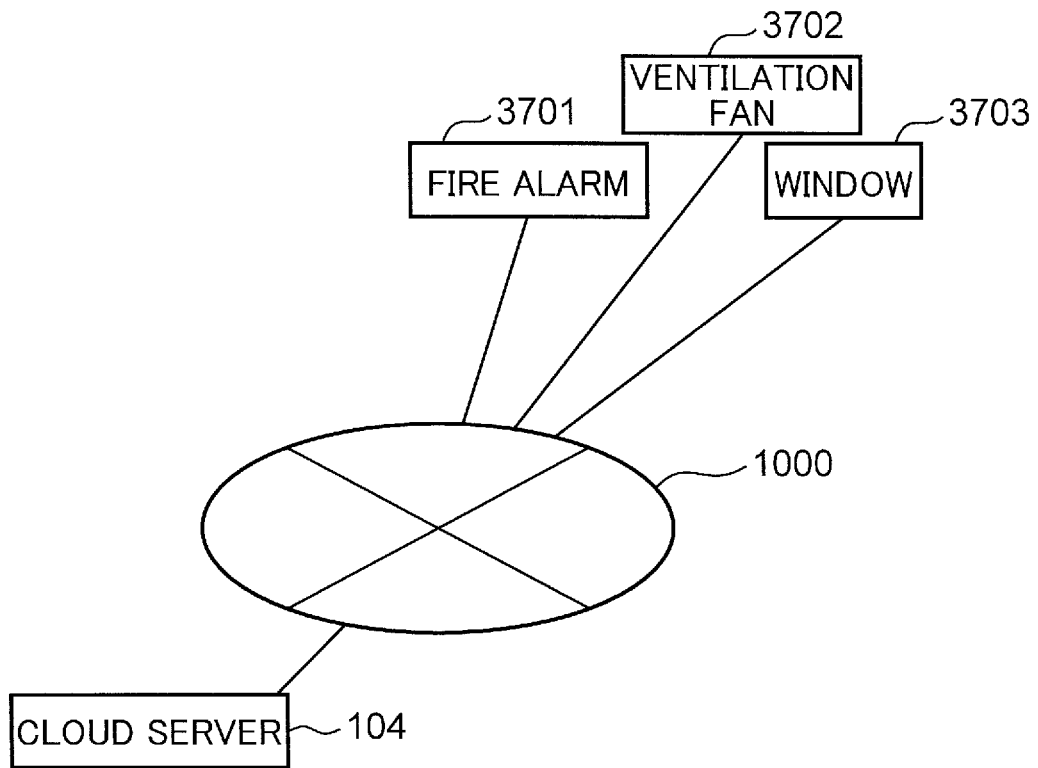
FIG. 38 is a diagram showing the configuration of the information providing system in the third example related to the second service mode and the third service mode.

The information providing system of this embodiment is now explained with reference to FIG. 38. FIG. 38 is a diagram showing the configuration of the information providing system in the third example related to the second service mode and the third service mode.

The information providing system shown in FIG. 38 comprises at least a fire alarm 3701 including a communication function, a ventilation fan 3702 comprising a communication function, a window 3703 comprising a communication function, and the cloud server 104. With this information providing system, when smoke is detected by the fire alarm 3701, the power of the ventilation fan 3702 is automatically turned ON to start ventilation. It is thereby possible to discharge smoke in the home upon alleviating the user's troubles.

With this information providing system, for example, the fire alarm 3701 sends a detection signal to the cloud server 104 via the network 1000 at the timing that the smoke is detected. The cloud server 104 determines the operation (starting ventilation) of the ventilation fan 3702 which operates in coordination with the detection of the smoke by the fire alarm 3701 based on the retained appliance coordinated operation database. Subsequently, the cloud server 104 sends an instruction signal to the ventilation fan 3702 for starting the ventilation. The plurality of appliances connected to a network can thereby coordinate with each other to provide value to the user.

Moreover, the fire alarm 3701 may also directly send an instruction signal to the ventilation fan 3702 via the network 1000.

The fire alarm 3701 is preset with a smoke density for determining that a fire has occurred and a smoke density for starting the ventilation with the ventilation fan 3702, and the original function as a fire alarm can also function without any problem.

Here, the fire alarm 3701 is desirably a smoke sensor-type fire alarm. It is thereby possible to perform the ventilation with the ventilation fan 3702 more accurately.

Moreover, the information providing system of this embodiment comprises a window 3703 which is connected to the network 1000 and includes an automatic opening/closing function. When smoke is detected by the fire alarm 3701, the information providing system desirably starts the ventilation with the ventilation fan 3702, and additionally opens the window 3703. It is thereby possible to increase the amount of smoke that is discharged, and reduce the amount of smoke in the room.

Moreover, here, while the case of the fire alarm 3701 detecting the smoke density and the ventilation fan 3702 starting the ventilation was explained, the information providing system may also start the ventilation with the ventilation fan 3702 when the humidity of the room measured with the air cleaner in the same room exceeds a predetermined threshold. It is thereby possible to inhibit the generation of mildew.

Moreover, when the information providing system comprises the window 3703 including an automatic opening/closing function to become the inlet port of a plurality of rooms in the same home, the cloud server 104 desirably selects the ventilation fan 3702 to perform the ventilation and the window 3703 to perform the intake of air based on information such as the humidity of the respective rooms, the temperature of the respective rooms, the outdoor air temperature, existence of residents, concentration of pollen indoors and outdoors, concentration of fungi floating in the room, smoke density, or concentration of dust, and change the rotation speed of the blades of the ventilation fan 3702. It is thereby possible to perform efficient ventilation.

For example, during the use of air-conditions in the summer or winter, the cloud server 104 discharges air from the ventilation fan 3702 installed in a room having a high concentration of pollen, fungi, smoke or dust, and performs the intake of air from the window 3703 of a room where a user does not exist. It is thereby possible to discharge pollen, fungi, smoke or dust while suppressing the power consumption of the air-conditioners.

Moreover, for example, by performing the intake of air from the window 3703 of a room that is facing a side in which the outside temperature is high in the winter and discharging air from the ventilation fan 3702 installed in a room that has high humidity, it is possible to efficiently prevent the occurrence of fungi while alleviating the lowering of the room temperature.

Moreover, the fire alarm 3701 desirably comprises a power supply unit. It is thereby possible to realize a fire alarm 3701 without requiring a battery, inexpensively, and which does not need to be replaced for a long period of time.

Moreover, the fire alarm 3701 desirably has the same body shape as the lighting apparatus. It is thereby possible to avoid any new wiring work for supplying power.

Note that, in this embodiment, the cloud server 104 desirably identifies that the fire alarm 3701 and the ventilation fan 3702 exist in the same room based on the method of detecting the appliances in the same room described in embodiment 1. It is thereby possible to operate the ventilation fan 3702 only when necessary.

Moreover, in this embodiment, the cloud server 104 desirably identifies that the fire alarm 3701 and the ventilation fan 3702 respectively exist in mutually adjacent rooms based on the method of detecting the positional relationship of the rooms described in embodiment 1. It is thereby possible to also perform ventilation from the ventilation fan 3702 disposed in the adjacent room.

Fourth Example Relating to Second Service Mode and Third Service Mode

Figure 39:
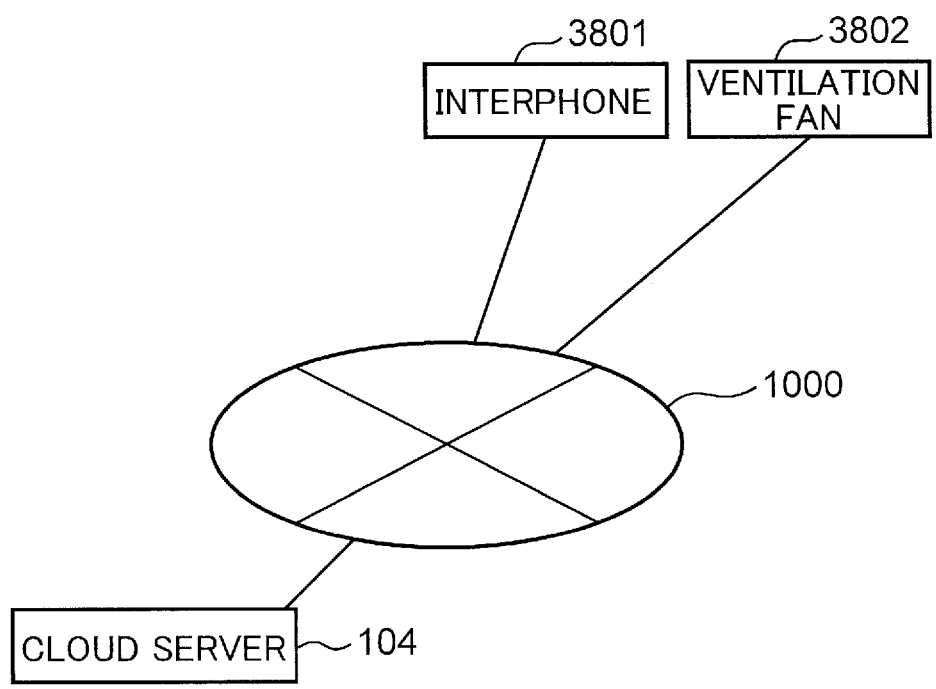
FIG. 39 is a diagram showing the configuration of the information providing system in the fourth example related to the second service mode and the third service mode.

The information providing system of this embodiment is now explained with reference to FIG. 39. FIG. 39 is a diagram showing the configuration of the information providing system in the fourth example related to the second service mode and the third service mode.

The information providing system shown in FIG. 39 comprises at least an interphone 3801 including a communication function, a ventilation fan 3802 including a communication function, and the cloud server 104. With this information providing system, when a visitor is detected by the interphone 3801, the power of the ventilation fan 3802 is automatically turned ON to start ventilation. It is thereby possible to realize a state where the indoor air pressure becomes lower than the outdoor air pressure when the door is opened/closed, and air will flow into the home when the door is opened. In other words, it is possible to alleviate the visitor from smelling the scent in the room upon opening the door, and alleviate the worries of the resident who feels uncomfortable about the scent of the main entrance.

With this information providing system, for example, the interphone 3801 sends a detection signal to the cloud server 104 via the network 1000 at the timing that the visitor rings the doorbell of the interphone 3801. The cloud server 104 determines the operation (starting ventilation) of the ventilation fan 3802 which operates in coordination with the operation of the ringing of the doorbell of the interphone 3801 based on the retained appliance coordinated operation database. Subsequently, the cloud server 104 sends an instruction signal to the ventilation fan 3802 for starting the ventilation. The plurality of appliances connected to a network can thereby coordinate with each other to provide value to the user.

Moreover, the interphone 3801 may also directly send an instruction signal to the ventilation fan 3802 via the intercom installed in the room. Note that the intercom is connected to the interphone 3801, and outputs the visitor's image and voice acquired by the interphone 3801. Moreover, the intercom is communicably connected to the cloud server 104 via the network 1000.

Here, the cloud server 104 can provide a more user-friendly service to the user by determining which ventilation fan 3802 should be operated by assessing the positional relationship of the rooms where the ventilation fans 3802 are installed based on the method of detecting the positional relationship of the rooms described in embodiment 1.

For example, when the user wishes to actively ventilate the air of the main entrance, the cloud server 104 operates the ventilation fan 3802 that is installed in a room that is close to the door of the main entrance. Moreover, when the user does not wish the visitor to hear the sound of the ventilation fan 3802, the cloud server 104 operates the ventilation fan 3802 that is installed in a room that is fair from the door of the main entrance.

Fifth Example Relating to Second Service Mode and Third Service Mode

Figure 40:
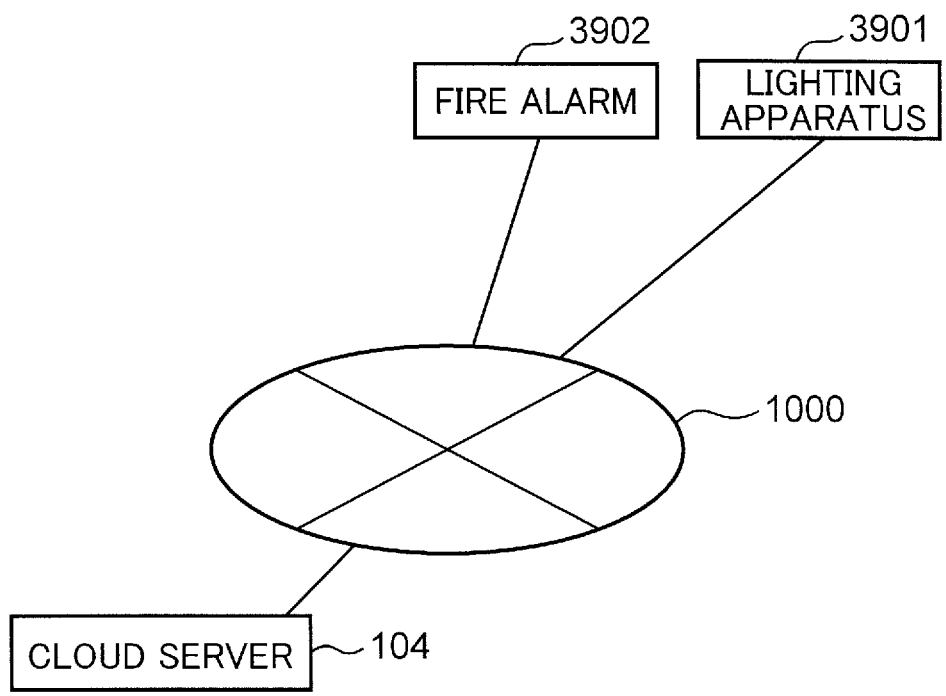
FIG. 40 is a diagram showing the configuration of the information providing system in the fifth example related to the second service mode and the third service mode.

The information providing system of this embodiment is now explained with reference to FIG. 40. FIG. 40 is a diagram showing the configuration of the information providing system in the fifth example related to the second service mode and the third service mode.

The information providing system shown in FIG. 40 comprises at least a fire alarm 3902 including a communication function, a lighting apparatus 3901 including a communication function, and the cloud server 104. With this information providing system, when a person is detected by the fire alarm 3902, the power of the lighting apparatus 3901 is automatically turned ON. It is thereby possible to automatically light only the lighting apparatus 3901 of the room where that person exists, and power-saving is enabled without having to trouble the user.

With this information providing system, for example, a heat sensor-type fire alarm 3902 sends a detection signal to the cloud server 104 via the network 1000 at the timing that the person is detected. The cloud server 104 determines the operation (starting lighting) of the lighting apparatus 3901 which operates in coordination with the detection of the person by the fire alarm 3902 based on the retained appliance coordinated operation database. Subsequently, the cloud server 104 sends an instruction signal to the lighting apparatus 3901 for starting the lighting. The plurality of appliances connected to a network can thereby coordinate with each other to provide value to the user.

Moreover, the fire alarm 3701 may also directly send the lighting instruction signal to the lighting apparatus 3901 via the network 1000.

Moreover, when it is detected by the fire alarm 3902 that no person exists in the room, the cloud server 104 desirably turns OFF the lighting apparatus 3901. It is thereby possible to prevent the lighting apparatus from being unintentionally left ON while the resident is absent, and power-saving is thereby enabled.

Moreover, similarly, when it is detected by the fire alarm 3902 that the resident is sleeping, the cloud server 104 desirably turns OFF the lighting apparatus 3901. It is thereby possible to prevent the lighting apparatus from being unintentionally left ON while the resident is sleeping, and power-saving is thereby enabled.

Moreover, upon turning OFF the lighting apparatus of the room when the resident is absent or when the resident is sleeping as described above, the cloud server 104 desirably switches the power of other appliances such as the TV and the air-conditioner to OFF or a power-saving mode. It is thereby possible to more effectively perform power-saving.

Moreover, here, while the fire alarm 3902 is used for detecting whether a person is absent or a person is sleeping, this may also be detected with a motion sensor that is installed in an air-conditioner or a lighting apparatus, or detected using other means.

Moreover, a motion sensor does not necessarily have to be used, and, for example, the cloud server 104 may also turn OFF the power of the other appliances such as the air-conditioner and the lighting apparatus in the same room upon being notified that the power of the TV has been turned OFF without any operation by the user. In the foregoing case, while there will a delay until the OFF state of the power is determined, the system can be built less expensively.

Moreover, the fire alarm 3902 desirably comprises a power supply unit. It is thereby possible to realize a fire alarm 3902 without requiring a battery, inexpensively, and which does not need to be replaced for a long period of time.

Moreover, the fire alarm 3902 desirably has the same body shape as the lighting apparatus. It is thereby possible to avoid any new wiring work for supplying power.

Note that, in this embodiment, the cloud server 104 desirably identifies that the lighting apparatus 3901 and the fire alarm 3902 exist in the same room based on the method of detecting the appliances in the same room described in embodiment 1. It is thereby possible to turn on the lighting apparatus of a room that requires lighting only when necessary.

While the information providing system and the information providing method in this embodiment were explained above, the configurations described in this specification are merely examples, and it goes without saying that the present invention may be variously modified to the extent that such modification does not deviate from the gist of this invention.

Moreover, in the respective embodiments, the information providing system desirably comprises an information terminal connected to the network 1000. In other words, the communication unit 311 of the cloud server 104 sends information for confirming an intention of the user to the user's portable terminal before the control signal is sent to the second appliance which operates in coordination with the first appliance. For example, when controlling a separate appliance according to the operating condition of a certain appliance, it is possible to obtain the user's permission for controlling the separate appliance, and the appliances can be controlled more in line with the user's wishes. For example, in the case of embodiment 2, before suspending the operation of the dishwasher upon being notified that the power of the AV system has been turned ON, it is possible to confirm with the user regarding whether the operation of the dishwasher may be suspended (through use of the information terminal).

Moreover, the information providing system desirably sets in advance, based on initialization or the like using the information terminal, whether the respective appliances are to be operated in coordination. It is thereby possible to avoid confirming with the user each time a separate appliance is controlled according to the operating condition of a certain appliance.

Moreover, regardless of whether initialization is performed, the information providing system desirably enables the user to set in advance whether to implement the confirmation process with the user using the information terminal. It is thereby possible to control appliances with even less trouble on the user's side.

Moreover, the setting of whether to operate the appliances in coordination may be made differently for each user, and preferably enables the detection of the position of users as described in embodiment 1. It is thereby possible to control the apparatuses in line with the wishes of the respective users.

Embodiment 3

Embodiment 3 explains examples of the services that are provided to the user to use respective appliances by using the information that has been detected in the information providing system described in embodiment 1. Note that embodiment 3 is merely an example, and does not limit the services that can be provided by the information providing system described in embodiment 1.

Appliance user information (fifth information) relating to the user of the respective appliances is obtained by the appliance position detection unit 2003 and the user position detection unit 2004 described in embodiment 1.

Figure 41:
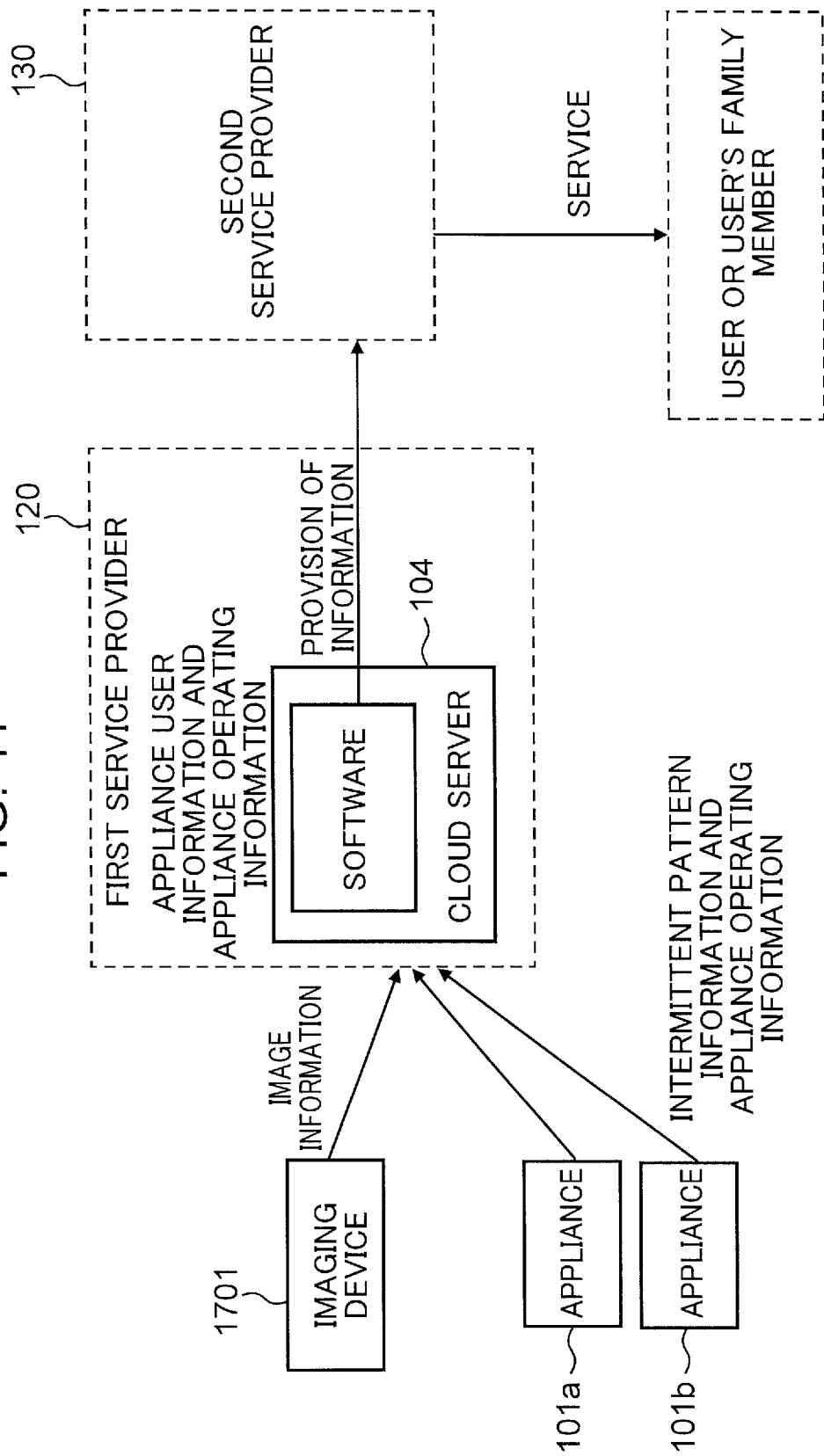
FIG. 41 is a diagram showing the service mode in which the service provider receives image information from the imaging device, and receives appliance operating information and intermittent pattern information from the respective appliances installed in the same room.

FIG. 41 is a diagram showing the service mode in which the service provider receives image information from the imaging device, and receives appliance operating information and intermittent pattern information from the respective appliances installed in the same room. As shown in FIG. 41, the first service provider 120 receives image information from the imaging device 1701, and receives appliance operating information indicating the operating condition of the appliance and the intermittent lighting pattern of the light source from the respective appliances 101a, 101b installed in the same room. The first service provider 120 determines the appliance user based on the received image information and intermittent pattern information, and provides the determined appliance user information and the received appliance operating information to the user or the second service provider 130.

Moreover, the appliance user information may also be acquired from the thermal radiation distribution measuring device in substitute for the imaging device as described in embodiment 1.

Moreover, while not shown, the service mode may also be such that the roles of the first service provider 120 and the second service provider 130 are performed by a single service provider.

The second service provider 130 and the user may acquire the appliance user information, and confirm the appliance user information via a display device such as a display. Moreover, a smartphone or a PC may be used as the terminal comprising a display device.

Here, the second service provider 130 can provide the following services to the appliance user based on the appliance operating information and the appliance user information.

(1) When a user A uses a rice cooker in a rice porridge mode, the second service provider 130 (pharmaceutical manufacturer A) distributes, for example, an advertisement of a cold medicine to the user A. The user A can thereby receive an advertisement that is required more by the user A.

Here, the appliance 101a is the rice cooker and the appliance operating information is the rice porridge mode, the appliance user is the user A, and the second service provider 130 is the pharmaceutical manufacturer A.

(2) When a user B frequently uses a coffee maker, the second service provider 130 (supermarket A) distributes an advertisement of coffee beans to the user B. The user B can thereby receive an advertisement that is of more interest to the user B. Here, the appliance 101a is the coffee maker, the appliance operating information is the appliance use history (appliance use frequency), the appliance user is the user B, and the second service provider 130 is the supermarket A.

In the foregoing case, it would be desirable for the respective users to be able to select whether the first service provider 120 should provide the appliance usage information to the second service provider 130, and whether to thereby receive the various services from the second service provider 130. The respective users can thereby receive services that are required by each of the users.

Moreover, the second service provider 130 can provide the following services to the family members of the appliance user based on the appliance operating information and the appliance user information.

(3) When a user C is watching a cartoon program A on TV by preference, the second service provider 130 (manufacturer of goods related to the cartoon program A) can make a pitch to a user D, who is a family member of the user C, to give goods related to the cartoon program A as a gift to the user C. The user D can thereby make the user C happy. Here, the appliance 101a is the TV, the appliance operating information is the viewing program information (cartoon program A), the appliance user is the user C, and the second service provider 130 is the manufacturer of goods related to the cartoon program A.

(4) When a user E uses a rice cooker in a rice porridge mode, the second service provider 130 (hospital A) examines a user F, who is a family member of the user E, by giving consideration to the information that there is a sick person within the family when the user F visits the hospital for a medical examination. The user F can thereby receive a more appropriate diagnosis. Here, the appliance 101a is the rice cooker, the appliance operating information is the rice porridge mode, the appliance user is the user E, and the second service provider 130 is the hospital A.

Moreover, in the example of (3) above, the user D may also receive the appliance usage information of the user C directly from the first service provider 120 without going through the second service provider 130.

Moreover, it would be desirable for the user C to be able to select to which family member one's own appliance usage information may be provided. This will realize an information providing method that enables superior privacy protection within the family.

Moreover, desirably, only the service (proposal of giving a gift or appropriate medical examination) from the second service provider 130 is provided to the user D or the user F, and the appliance usage information (viewing program information or rice porridge mode) is not disclosed to the user D or the user F. It is thereby possible to realize an information providing method that enables even more superior privacy protection within the family.

Moreover, the appliance usage information may be disclosed to the user D or the user F, and the user D or the user F can thereby utilize the family's appliance usage information more diversely.

As shown in this embodiment, by providing both information relating to the appliance user in the home and the appliance operating information to the second service provider 130, the appliance user (user) and family members of that appliance user can enjoy more desirable services.

(Service Type)

The technologies explained in the foregoing aspects can be realized, for example, by the following types of cloud services. Nevertheless, the types of cloud services for realizing the technologies explained in the foregoing aspects are not limited to these types of cloud services.

(Service Type 1: Company-Owned Data Center-Type Cloud Service)

Figure 42:
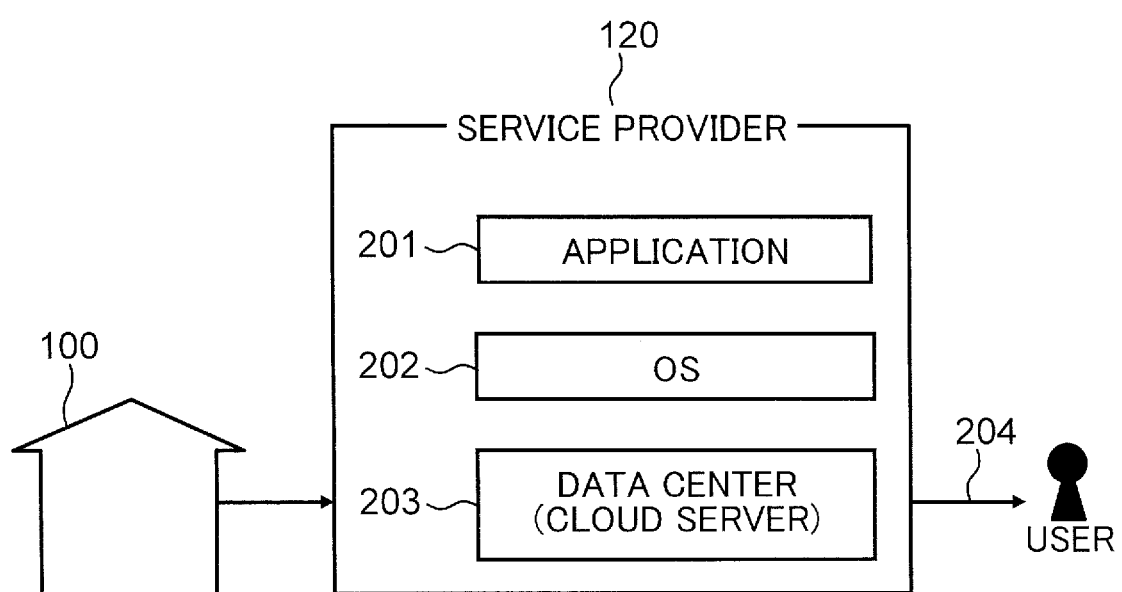
FIG. 42 is a diagram showing the overall image of the service provided by the information providing system in service type 1 (company-owned data center-type cloud service).

FIG. 42 is a diagram showing the overall image of the service provided by the information providing system in service type 1 (company-owned data center-type cloud service). With this service type, the service provider 120 acquires information from the group 100, and provides the service to the user. With this service type, the service provider 120 functions as the data center operating company. In other words, the service provider comprises the cloud server 111 for managing big data. Accordingly, the data center operating company does not exist.

With this service type, the service provider 120 operates and manages the data center (cloud server) 203. Moreover, the service provider 120 manages the operating system (OS) 202 and the application 201. The service provider 120 provides the service by using the OS 202 and the application 201 that are being managed by the service provider 120 (arrow 204).

(Service Type 2: IaaS-Based Cloud Service)

Figure 43:
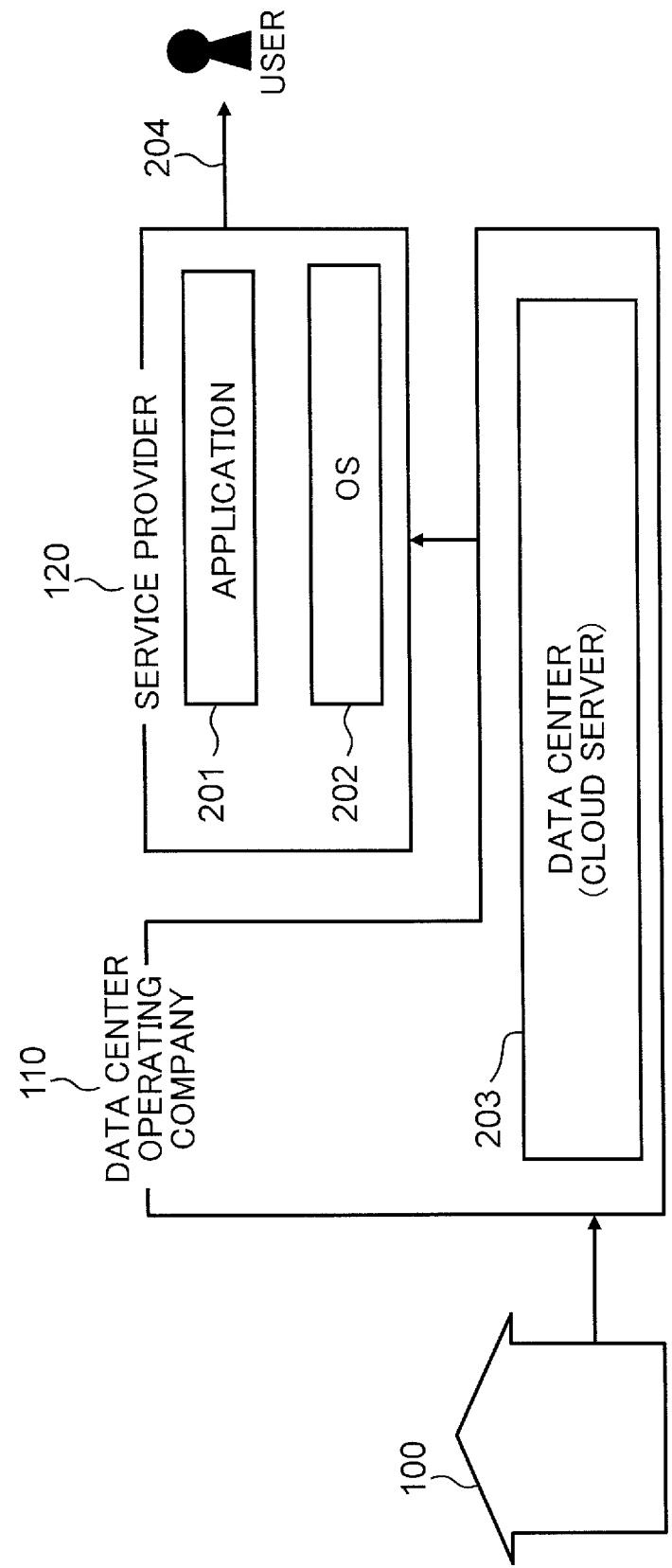
FIG. 43 is a diagram showing the overall image of the service provided by the information providing system in service type 2 (IaaS-based cloud service).

FIG. 43 is a diagram showing the overall image of the service provided by the information providing system in service type 2 (IaaS-based cloud service). Here, "IaaS" is the abbreviation for Infrastructure-as-a-Service, and is a cloud service providing model that provides the infrastructure itself for building and operating the computer system as a service via the internet.

With this service type, the data center operating company 110 operates and manages the data center (cloud server) 203. Moreover, the service provider 120 manages the OS 202 and the application 201. The service provider 120 provides the service by using the OS 202 and the application 201 that are being managed by the service provider 120 (arrow 204).

(Service Type 3: PaaS-Based Cloud Service)

Figure 44:
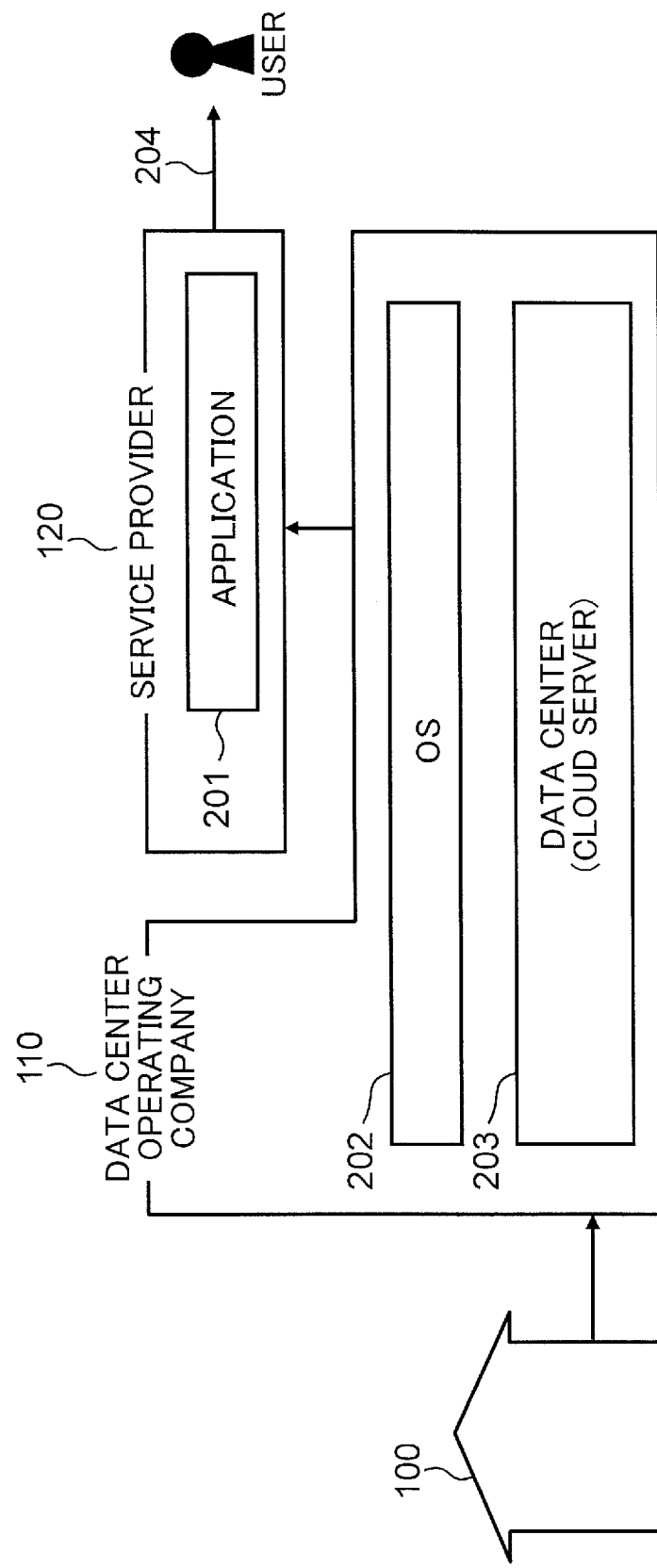
FIG. 44 is a diagram showing the overall image of the service provided by the information providing system in service type 3 (PaaS-based cloud service).

FIG. 44 is a diagram showing the overall image of the service provided by the information providing system in service type 3 (PaaS-based cloud service). Here, "PaaS" is the abbreviation for Platform-as-a-Service, and is a cloud service providing model that provides the platform to become the foundation for building and operating the software as a service via the internet.

With this service type, the data center operating company 110 manages the OS 202, and operates and manages the data center (cloud server) 203. Moreover, the service provider 120 manages the application 201. The service provider 120 provides the service by using the OS 202 that is being managed by the data center operating company 110 and the application 201 that is being managed by the service provider 120 (arrow 204).

(Service Type 4: SaaS-Based Cloud Service)

Figure 45:
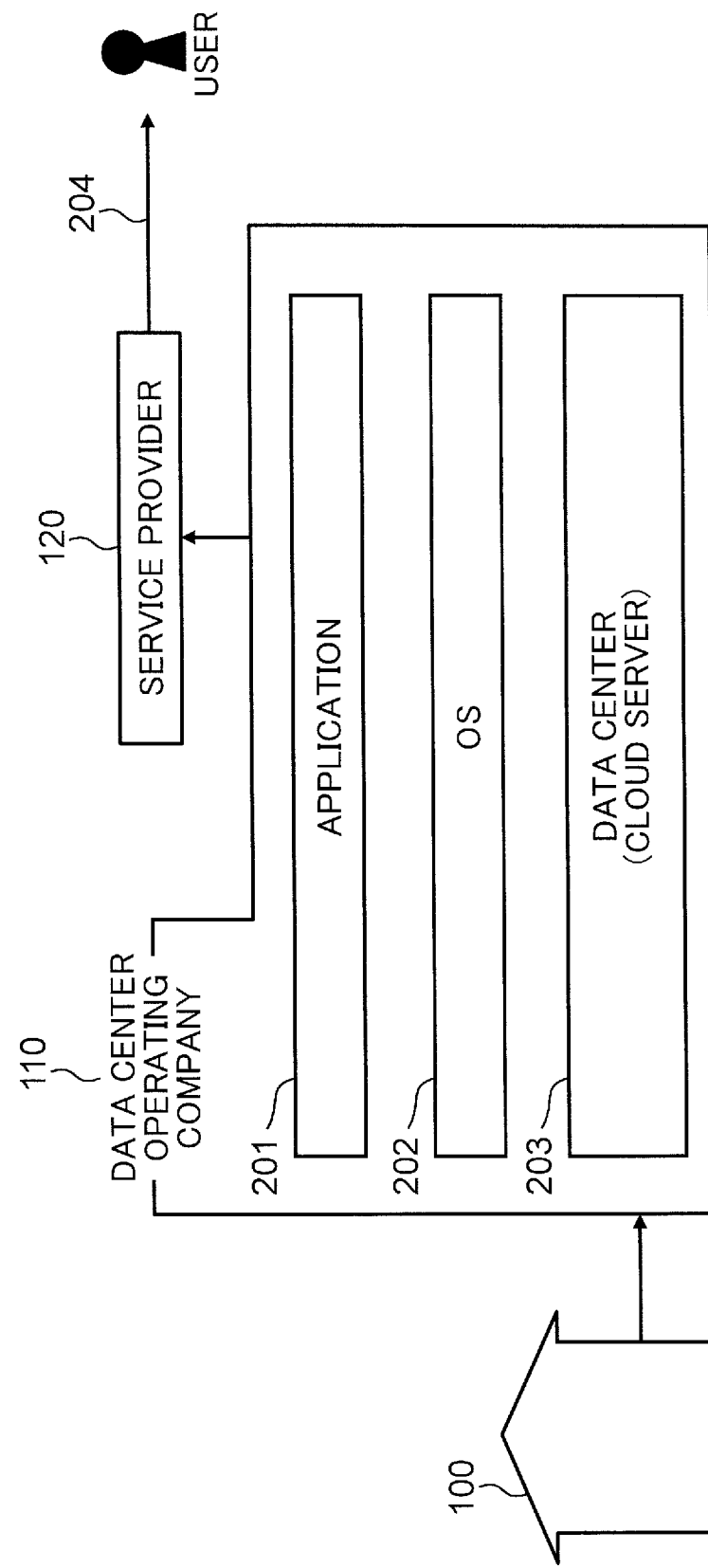
FIG. 45 is a diagram showing the overall image of the service provided by the information providing system in service type 4 (SaaS-based cloud service).

FIG. 45 is a diagram showing the overall image of the service provided by the information providing system in service type 4 (SaaS-based cloud service). Here, "SaaS" is the abbreviation for Software-as-a-Service. The SaaS-based cloud service is a cloud service providing model having a function, for example, which enables a user such as a company or an individual that does not have a data center (cloud server) to use, via a network such as the internet, the application provided by the platform provider that has a data center (cloud server).

With this service type, the data center operating company 110 manages the application 201, manages the OS 202, and operates and manages the data center (cloud server) 203. Moreover, the service provider 120 provides the service by using the OS 202 and the application 201 that are being managed by the data center operating company 110 (arrow 204).

Accordingly, in all of the foregoing types of cloud services, the service provider 120 provides the service. Moreover, for example, the service provider or the data center operating company may independently develop the OS, application or the database of big data, or outsource such development to a third party.

INDUSTRIAL APPLICABILITY

The information providing method and the information providing apparatus according to the present invention can provide highly user-friendly services based on information relating to the installation site of appliances which are connected to a network and located within the same home or the location of the user within the same home, and the present invention is effective as an information providing method and an information providing apparatus for controlling appliances connected to a network.

The invention claimed is:

1. An information providing method for use in an information providing apparatus connected to a plurality of appliances via network, the method comprising:
    receiving a signal indicating that an acquisition of a voice of a user by a terminal, the terminal being connected via the network and being configured to acquire the voice of the user;
    specifying one or more sound generators installed in an area where the terminal for acquiring the voice of the user is installed and each generating sound in accordance with an operation, by referring to a list of one or more appliances that are installed in a same area among the plurality of appliances; and
    outputting a control signal for lowering volume of the sound generated in the area from at least one sound generator of the one or more sound generators to the at least one sound generator of the one or more sound generators;
    receiving position specifying information specifying a location of the plurality of appliances in the area and specifying a location of the user in the area;
    determining when a distance between the location of the at least one sound generator and the location of the user in the area indicates a predetermined value or greater based on the received position specifying information; and
    keeping the control signal from being output when the distance is determined to indicate the predetermined value or greater.

2. The information providing method according to claim 1, wherein
    the at least one sound generator represents an AV system.

3. The information providing method according to claim 2, wherein
    the control signal is a signal for lowering a volume of the sound output in the area from the AV system.

4. The information providing method according to claim 1, wherein
    the at least one sound generator represents a dishwasher.

5. The information providing method according to claim 4, wherein
    the control signal is a signal for suspending an operation of the dishwasher.

6. The information providing method according to claim 4, wherein
    the control signal is a signal for turning off a power of the dishwasher.

7. The information providing method according to claim 1, wherein:
    the position specifying information includes an image within the area captured by an imaging device; and
    the location of the plurality of appliances in the area is specified and the location of the user in the area is specified based on the captured image.

8. The information providing method according to claim 1, wherein:
    the position specifying information includes a thermal radiation distribution within the area measured with a thermal radiation distribution measuring device; and
    the location of the plurality of appliances in the area is specified and the location of the user in the area is specified based on the measured thermal radiation distribution.

9. The information providing method according to claim 1, wherein
    the control signal is determined by referring to a coordinated operation database for associating and storing an operation of one appliance among the plurality of appliances and an operation of another appliance that operates in coordination with the one appliance.

10. The information providing method according to claim 1, wherein
    the list is created by receiving environmental information of respective installation sites of the plurality of appliances, and determining whether or not the plurality of appliances are installed in the same area based on the received environmental information.

11. The information providing method according to claim 10, wherein:
    the environmental information includes information relating to a time that the plurality of appliances have detected a change in light; and
    one or more appliances, among the plurality of appliances, in which the time that the change in light has been detected is the same are determined as appliances that are installed in the same area.

12. The information providing method according to claim 11, wherein:
    a plurality of light sources respectively disposed in a plurality of areas within a building are each lit according to a predetermined lighting pattern; and
    one or more appliances, among the plurality of appliances, for which the same lighting pattern has been detected are determined as appliances that are installed in the same area.

13. The information providing method according to claim 10, wherein:
   the environmental information includes information relating to a time that the plurality of appliances have detected a change in sound; and
   one or more appliances, among the plurality of appliances, in which the time that the change in sound has been detected is the same are determined as appliances that are installed in the same area.

14. The information providing method according to claim 13, wherein:
   a mobile appliance that moves between a plurality of areas within a building is caused to output sound;
   the environmental information includes information relating to a time that the plurality of appliances have detected a change in the sound output by the mobile appliance; and
   one or more appliances, among the plurality of appliances, in which the time that the change in sound has been detected is the same are determined as appliances that are installed in the same area.

15. The information providing method according to claim 10, wherein:
   the environmental information includes information relating to a time that the plurality of appliances have detected a change in temperature; and
   one or more appliances, among the plurality of appliances, in which the time that the change in temperature has been detected is the same are determined as appliances that are installed in the same area.

16. An information providing apparatus connected to a plurality of appliances via network, comprising:
   a processor which is caused to:
      receive a signal indicating an acquisition of a voice of a user by a terminal, the terminal being connected via the network and being configured to acquire the voice of the user;
      specify one or more sound generators installed in an area where the terminal for acquiring the voice of the user is installed and each generating sound in accordance with an operation, by referring to a list of one or more appliances that are installed in the same area among the plurality of appliances;
      output a control signal for lowering volume of the sound generated in the area from at least one sound generator of the one or more sound generators to the at least one sound generator of the one or more sound generators;
      receive position specifying information specifying a location of the plurality of appliances in the area and specifying a location of the user in the area;
      determine when a distance between the location of the at least one sound generator and the location of the user in the area indicates a predetermined value or greater based on the received position specifying information; and
      keep the control signal from being output when the distance is determined to indicate the predetermined value or greater.

\* \* \* \* \*